(12) United States Patent
Dutronc et al.

(10) Patent No.: US 9,853,799 B2
(45) Date of Patent: Dec. 26, 2017

(54) RADIO COMMUNICATIONS SYSTEM AND METHOD BASED ON TIME TWISTED WAVES

(71) Applicant: EUTELSAT S A, Paris (FR)

(72) Inventors: Jacques Dutronc, Paris (FR); Antonio Saitto, Paris (FR)

(73) Assignee: EUTELSAT S A, Paris (FR)

( * ) Notice: Subject to any disclaimer, the term of this patent is extended or adjusted under 35 U.S.C. 154(b) by 33 days.

(21) Appl. No.: 15/033,453

(22) PCT Filed: Oct. 29, 2014

(86) PCT No.: PCT/IB2014/002607
§ 371 (c)(1),
(2) Date: Apr. 29, 2016

(87) PCT Pub. No.: WO2015/068036
PCT Pub. Date: May 14, 2015

(65) Prior Publication Data
US 2016/0277173 A1    Sep. 22, 2016

(30) Foreign Application Priority Data

Nov. 5, 2013  (WO) .................. PCT/IB2013/003156

(51) Int. Cl.
*H04W 4/00* (2009.01)
*H04L 5/04* (2006.01)
*H04W 72/04* (2009.01)

(52) U.S. Cl.
CPC .......... *H04L 5/04* (2013.01); *H04W 72/0446* (2013.01)

(58) Field of Classification Search
CPC ............................. H04L 5/04; H04W 72/0446
See application file for complete search history.

(56) References Cited

U.S. PATENT DOCUMENTS

2013/0177009 A1*  7/2013  Ashrafi ................. H04L 5/04
                                                                370/343

FOREIGN PATENT DOCUMENTS

EP      2 639 993 A2    9/2013
GB      2 410 130 A     7/2005
(Continued)

OTHER PUBLICATIONS

International Search Report as issued in International Patent Application PCT/IB2014/002607, dated Mar. 11, 2015.
(Continued)

*Primary Examiner* — Afshawn Towfighi
(74) *Attorney, Agent, or Firm* — Pillsbury Winthrop Shaw Pittman LLP

(57) ABSTRACT

A radio communications method, includes carrying out, by a transmitter: generating or receiving digital symbols to be transmitted; generating, every S digital symbols generated/received (with S integer higher than three), a corresponding multi-mode digital signal; generating a multi-frame digital signal comprising successive, non-overlapped time frames, each of which has the predefined time length and carries a respective multi-mode digital signal generated; and transmitting a radio frequency signal carrying the multi-frame digital signal. The radio communications method further includes carrying out, by a receiver: receiving the radio frequency signal transmitted by the transmitter; processing the received radio frequency signal to obtain a corresponding incoming digital signal; performing, on the basis of the incoming digital signal, carrier synchronization, clock synchronization, and frame synchronization; and extracting, on the basis of the carrier, clock and frame synchronizations.

19 Claims, 34 Drawing Sheets

(56) References Cited

FOREIGN PATENT DOCUMENTS

| WO | WO 2012/084039 A1 | 6/2012 |
| WO | WO 2014/016655 A1 | 1/2014 |
| WO | WO 2015/067987 A1 | 5/2015 |

OTHER PUBLICATIONS

Mohammadi, S.M., et a., "Orbital angular momentum in radio—a system study," IEEE Transactions on Antennas and Propagation, vol. 58, No. 2, 2010, pp. 565-572.

Tamburini, F., et al., "Encoding many channels in the same frequency through radio vorticity: first experimental test," arXiv.org, 2011, 17 pages.

Min, J., et al., "Synchronization Techniques for a Frequency-Hopped Wireless Transceiver," Vehicular Technology Conference, 1996, Mobile Technology for the Human Race, IEEE, vol. 1, pp. 183-187.

\* cited by examiner

RADIO COMMUNICATIONS SYSTEM AND METHOD BASED ON TIME TWISTED WAVES

CROSS-REFERENCE TO RELATED APPLICATIONS

This is the U.S. National Stage of PCT/IB2014/002607, filed Oct. 29, 2014, which in turn claims priority to International Patent Application No. PCT/IB2013/003156, filed Nov. 5, 2013, the entire contents of all applications are incorporated herein by reference in their entireties.

TECHNICAL FIELD OF THE INVENTION

The present invention relates, in general, to a radio communications system and method, namely a system and a method for implementing communications at Radio Frequency (RF) (including frequencies from a few KHz to hundreds of GHz) with increased transmission capacity.

In particular, the present invention concerns a radio communications system and method based on twisted waves in time domain for increasing transmission capacity.

The present invention can be advantageously exploited, in general, in all kinds of radio communications, and, in particular, in satellite communications and terrestrial wireless communications, such as the ones based on Long Term Evolution (LTE) and/or Worldwide Interoperability for Microwave Access (WiMAX) standards.

BACKGROUND ART

In consideration of Orbital Angular Momentum (OAM) potentialities of increasing transmission capacity and since RF spectrum shortage problem is deeply felt in radio communications sector, recently a lot of experimental studies have been carried out on the use of OAM states, or modes, at RF (also known as radio vortices) in order to try to enhance RF spectrum reuse.

In this connection, reference may, for example, be made to:

Mohammadi S. M. et al., "*Orbital Angular Momentum in Radio—A System Study*", IEEE TRANSACTIONS ON ANTENNAS AND PROPAGATION, IEEE SERVICE CENTER, PISCATAWAY, N.J., US, vol. 58, no. 2, 1 Feb. 2010, pages 565-572, which shows that standard antennas arranged in circular arrays can be used to generate RF beams carrying OAM;

Tamburini F. et al., "*Encoding many channels in the same frequency through radio Vorticity: first experimental test*", arXiv.org, 12 Jul. 2011, Ithaca, N.Y., USA, which experimentally shows that it is possible to propagate and use the properties of twisted non-monochromatic incoherent radio waves to simultaneously transmit several radio channels on one and the same frequency by encoding them in different (and, thence, orthogonal) OAM states (even without using polarization or dense coding techniques);

GB 2 410 130 A, which discloses a planar phased array antenna for transmitting and receiving OAM radio vortex modes, which antenna comprises a circular array of cavity backed axial mode spiral antenna elements whose phase is controlled such that the phase of each antenna element changes sequentially about the array; and WO 2012/084039 A1, which discloses a transmit antenna arrangement comprising N antenna elements arranged along a circumference with an angular separation of α degrees between neighboring antenna elements, the antenna arrangement comprising an OAM encoder arranged to receive N input signals for transmission, indexed from M=-(N-1)/2 up to M=(N-1)/2 for odd N and from M=-(N-2)/2 up to N/2 for even N; the OAM encoder connecting each input signal to each antenna element and giving each input signal M at each antenna element a phase shift of M*α relative to the phase of the same input signal M at an adjacent antenna element; wherein two or more antenna elements are directional, have their directivity in the same direction, and have an antenna aperture higher than, or equal to, 5λ, where λ is the wavelength of the N input signals.

From a mathematical perspective, the transmission of an OAM mode (or state) at a single RF (i.e., by using a pure tone) implies that the electrical field on the radiating aperture can be represented as:

$$F(\rho,\phi) = F(\rho) e^{jk\phi},$$

where $\rho$ and $\phi$ are the cylindrical coordinates on the radiating aperture, j is the imaginary unit, and k is a positive or negative integer.

The radiated field can be represented in the far zone as:

$$E(\vartheta, \varphi) = \frac{1}{R} \int\int_S F(\rho, \phi) e^{-j2\pi \frac{\rho}{\lambda} \sin(\vartheta)\cos(\varphi-\phi)} \rho\, d\rho\, d\phi,$$

where $\vartheta$ and $\phi$ are the spherical coordinates in the far field, R denotes the radius of the sphere centered on the radiating aperture, S denotes the integration surface used at reception side, and λ denotes the wavelength used.

As is known, due to intrinsic characteristics of OAM, an OAM mode transmitted at a single RF (i.e., by using a pure tone) is affected by a phase singularity which creates a null at the bore-sight direction, thereby resulting that $$E(0,0)=0.$$

In order for said phase singularity to be compensated, the integration surface S used at reception side should be sized so as to include the crown peak generated by the OAM mode.

In particular, the integration surface S used at reception side should be different for each OAM mode and, considering the sampling theorem applied to the radiating antenna, should have an area given by:

$$\Delta S = \Delta\Omega R^2 = 2\left(\frac{\lambda}{D}R\right)^2,$$

where D denotes the diameter of the radiating antenna.

Therefore, the price to be paid with pure OAM modes transmitted by using pure tones (i.e., single radiofrequencies) is that the dimensions of the equivalent receiving antenna depend on the distance R from, and on the diameter D of, the transmitting antenna.

This solution is impractical for satellite communications, where the aperture efficiency and the size of the antennas are very critical issues. For example, in geostationary-satellite-based communications in Ka band, for a ground antenna having a diameter D of about 9 m, the diameter of the receiving ring on board the geostationary satellite should be of the order of 50 Km, thereby resulting impractical.

Thence, in view of the foregoing, the main criticality in using radio vorticity in practical systems is that the orthogonality between OAM modes depends on the size of antennas, on the distance between the transmitting and receiving antennas, and on the need for the receiving antenna to operate as an interferometer basis (as, for example, disclosed in the aforesaid papers "*Orbital Angular Momentum in Radio—A System Study*" and "*Encoding many channels in the same frequency through radio Vorticity: first experimental test*", in GB 2 410 130 A and in WO 2012/084039 A1). These constraints result in OAM-based radio communication systems which are inefficient and unusable for very long distances such as the ones involved in satellite communications.

Moreover, further criticalities in the use of radio vorticity for satellite communications are represented by the need of an extremely accurate mutual pointing of the transmitting and receiving antennas, and by the unfeasibility of the geometry for Earth-satellite configurations due to the criticality of the positioning of the receiving antennas (or the receiving antenna elements).

A solution to the aforesaid technical problems is provided in the International Application No. PCT/IB2012/056804 filed on 28 Nov. 2012 in the name of EUTELSAT S. A. and concerning a multidimensional space modulation technique for transmitting and/or receiving radio vortices at frequencies ranging from a few KHz to hundreds of GHz. Specifically, the multidimensional space modulation technique according to the International Application PCT/IB2012/056804 allows to transmit and/or receive orthogonal RF OAM modes in one and the same direction (i.e., the bore-sight direction) and to overcome, at the same time, the aforesaid technical problems caused by OAM phase singularity at the bore-sight direction, thereby allowing the use of radio vortices also for long-distance radio communications, such as satellite communications.

In particular, the multidimensional space modulation according to the International Application PCT/IB2012/056804 is actually a phase modulation applied to signals to be transmitted at RF such that to result in orthogonal radio vortices along the bore-sight direction. Therefore, the modulation according to the International Application PCT/IB2012/056804 is called multidimensional space modulation because it allows orthogonal RF OAM modes to be transmitted and/or received in one and the same direction, namely the bore-sight direction, wherein each OAM mode represents a specific space channel along the bore-sight direction, which specific space channel is orthogonal to all the other space channels represented by the other OAM modes.

In order for the multidimensional space modulation according to the International Application PCT/IB2012/056804 to be understood, attention is drawn, by way of example, to the fact that, as is known, a twisted RF signal having, or carrying, the OAM mode m=+1 is characterized by only one clockwise rotation of 360° of the Poynting vector around the propagation axis per period T and, thence, it can be generated by transmitting, for example by means of four ring-arranged transmitting antenna elements, RF signals associated with phases of 0°, 90°, 180°, and 270° clockwise distributed among said four ring-arranged transmitting antenna elements. Instead, the International Application PCT/IB2012/056804 proves that it is possible and convenient, in order to transmit at RF the OAM mode m=+1 and, at the same time, to solve the problem caused by OAM phase singularity at the bore-sight direction, to exploit only one antenna transmitting the four different phases 0°, 90°, 180°, and 270° at different times (or at different frequencies) with a time step of T'=T/4. This possibility increases the efficiency of the transmitting and receiving configuration, which can work regardless of the elementary antenna element spacing in an antenna array.

From a conceptual perspective, according to the International Application PCT/IB2012/056804, in order to manage OAM rotation, namely in order to control the speed of rotation of an RF OAM mode about the bore-sight direction, a supplementary phase modulation is introduced, which leaves only a residue of the OAM twist and keeps the OAM signature in a limited bandwidth. This residual rotation achieved by means of the supplementary phase modulation allows a signal having a proper bandwidth to be orthogonal to another signal having a different rotation (multiple of the minimum one). Therefore, an RF twisted wave can be transmitted by means of a modulated waveform and can be received by an antenna operating in the complex conjugate mode. The received signal is equal to the transmitted one, apart from standard attenuation and transmission and reception gains in a time period $T_{mod}$. The bandwidth increase does not prevent the transmission of plane waves (i.e., the OAM mode m=0), but limits the number of OAM modes at different central frequencies in the available bandwidth. The multidimensional space modulation according to PCT/IB2012/056804 allows to use a standard antenna in place of a phased array antenna, since the used signals are native orthogonal.

It is important to underline the fact that the generation of RF OAM modes by means of the multidimensional space modulation according to PCT/IB2012/056804 allows to drastically simplify the antenna design. In fact, the antenna does not need to take memory at the period of the carrier frequency of the phase between elements $f_0=1/T_0$. This duty is performed by the sampling frequency of the twisted waves, which is at least 3 times the signal bandwidth; therefore the phase shift assigned to the sampling is already orthogonal in time; it follows that the antenna can be a standard one without the need of using a phased array configuration on either the antenna aperture, or, in case of a reflector antenna, the focal plane. Therefore, the multidimensional space modulation according to PCT/IB2012/056804 can be exploited in satellite communications by using already existing satellite and ground antennas.

In order for the multidimensional space modulation according to PCT/IB2012/056804 to be better understood, reference is made to FIG. 1, which shows a functional block diagram of a transmitting system (denoted as whole by 1), which is disclosed in PCT/IB2012/056804 and which exploits the aforesaid multidimensional space modulation for transmitting radio vortices at frequencies ranging from a few KHz to hundreds of GHz.

In particular, the transmitting system 1 comprises:
a signal generation section 10 designed to generate
  a first digital signal $s_0(t)$ carrying an information stream, having a given sampling period $T_0$ and occupying a given frequency bandwidth W centered on a predefined frequency $f_0$, and
  up to 2N second digital signals $s_m(t)$, with −N≤m≤+N and N≥1 (for the sake of illustration simplicity in FIG. 1 only signals $s_{+1}(t)$, $s_{-1}(t)$, $s_{+N}(t)$ and $s_{-N}(t)$ are shown), each carrying a respective information stream, having a respective sampling period $T_m=4|m|T_0$ (or $T_m=3|m|T_0$) and occupying a respective frequency bandwidth W/4|m| (or W/3|m|) centered on said predefined frequency $f_0$ (which can, conveniently, be an Intermediate Frequency (IF) thereby resulting that the first and second digital signals are IF digital signals);
a device 100 for generating OAM modes, which is coupled with said signal generation section 10 to receive the first and second digital signals generated by the latter, and which is designed to apply, to each second digital signal $s_m(t)$ received from the signal generation section 10, a respective space modulation associated with a respective OAM mode m so as to generate a corresponding modulated digital signal carrying said respective OAM mode m, having the given sampling period $T_0$, and occupying the given frequency bandwidth W, and provide an output digital signal $s_{out}(t)$ based on the modulated digital signals and on the first digital signal $s_0(t)$ received from the signal generation section 10; and an RF transmission section 1000, which is coupled with the device 100 to receive therefrom the output digital signal $s_{out}(t)$ and which is designed to transmit at predefined radio frequencies the output digital signal $s_{out}(t)$ by means of a single antenna (which is not shown in FIG. 1 for the sake of illustration simplicity and which can be also a reflector antenna with a single feed) or an antenna array (which is not shown in FIG. 1 for the sake of illustration simplicity and which can be also a multi-feed reflector antenna), thereby transmitting an overall RF signal carrying said first digital signal $s_0(t)$ by means of a plane wave, and said second digital signals $s_m(t)$, each by means of a corresponding radio vortex having the respective OAM mode m.

The aforesaid predefined radio frequencies can conveniently range from a few KHz to hundreds of GHz depending on the specific application for which the overall transmitting system 1 is designed.

Conveniently, the signal generation section 10 can be a signal generation section of a transmitting system for satellite communications (such as a transmitting system of a feeder link Earth station, of a satellite, or of a ground apparatus for satellite communications), or of a device for wireless communications, such as LTE-based communications.

Accordingly, the RF transmission section 1000 can conveniently be an RF transmission section of a transmitting system for satellite communications (such as a transmitting system of a feeder link Earth station, of a satellite, or of a ground apparatus for satellite communications), or of a device for wireless communications, such as LTE-based communications.

Additionally, FIG. 2 shows in greater detail the device 100 for generating OAM modes, which device 100 comprises 2N OAM mode generation modules. In particular, FIG. 2 shows, for the sake of illustration simplicity, only:

an OAM mode generation module 110 for generating OAM mode m=+1;

an OAM mode generation module 120 for generating OAM mode m=−1;

an OAM mode generation module 130 for generating OAM mode m=+N; and an OAM mode generation module 140 for generating OAM mode in m=−N.

In detail, a generic OAM mode generation module for generating OAM mode m is operable to apply to a respective second digital signal $s_m(t)$ received from the signal generation section 10 a respective space modulation associated with said OAM mode m so as to generate a corresponding space-modulated digital signal $sms_m(t)$ carrying said OAM mode m, having the given sampling period $T_0$, and occupying the whole given frequency bandwidth W centered on said predefined frequency $f_0$.

More in detail, the generic OAM mode generation module for generating the OAM mode m is operable to:

receive a synchronization signal $synch_m$ (not shown in FIG. 2 for the sake of illustration clarity) indicating the given sampling period $T_0$ and, conveniently, also the sampling period $T_m$ of the respective second digital signal $s_m(t)$ received from the signal generation section 10; and apply the respective space modulation to said respective digital signal $s_m(t)$ by digitally interpolating said respective second digital signal $s_m(t)$ on the basis of the received synchronization signal $synch_m$ so as to generate a corresponding digitally-interpolated signal having the given sampling period $T_0$;

applying to the digitally-interpolated signal a respective digital phase modulation associated with said OAM mode in such that to generate a corresponding phase-modulated signal carrying said OAM mode m with a predefined OAM mode rotation speed; and digitally filtering the phase-modulated signal thereby obtaining a filtered signal which represents the aforesaid space-modulated digital signal $sms_m(t)$.

For example, the OAM mode generation module 110 is conveniently configured to:

receive, from the signal generation section 10, the second digital signal $s_{+1}(t)$ and a synchronization signal $synch_{+1}$ indicating the given sampling period $T_0$ and, conveniently, also the sampling period $T_{+1}=4T_0$ (or $T_{+1}=3T_0$) of the second digital signal $s_{+1}(t)$;

digitally interpolate the second digital signal $s_{+1}(t)$ by outputting, for each digital sample of said second digital signal $s_{+1}(t)$, four corresponding digital samples with time step (i.e., time distance) $T_0$, thereby generating a corresponding digitally-interpolated signal having the given sampling period $T_0$;

apply to each set of four digital samples obtained by means of the digital interpolation digital phase shifts related to the OAM mode +1 with the predefined OAM mode rotation speed (namely, digital phase shifts related to phase values 0, $\pi/2$, $\pi$ and $3\pi/2$) so as to generate a corresponding set of four phase-shifted digital samples, which corresponding set of four phase-shifted digital samples carries said OAM mode +1 with the predefined OAM mode rotation speed;

digitally filter each set of four phase-shifted digital samples obtained by means of the digital phase shifting so as to output a corresponding set of four filtered digital samples; and combine the sets of four filtered digital samples obtained by means of the digital filtering into a single filtered signal which represents the space-modulated digital signal $sms_{+1}(t)$.

Accordingly, the OAM mode generation module 120 is conveniently configured to:

receive, from the signal generation section 10, the second digital signal $s_{-1}(t)$ and a synchronization signal $synch_{-1}$ indicating the given sampling period $T_0$ and, conveniently, also the sampling period $T_{-1}=4T_0$ (or $T_{-1}=3T_0$) of the second digital signal $s_{-1}(t)$;

digitally interpolate the second digital signal $s_{-1}(t)$ by outputting, for each digital sample of said second digital signal $s_{-1}(t)$, four corresponding digital samples with time step (i.e., time distance) $T_0$, thereby generating a corresponding digitally-interpolated signal having the given sampling period $T_0$;

apply to each set of four digital samples obtained by means of the digital interpolation digital phase shifts related to the OAM mode −1 with the predefined OAM mode rotation speed (namely, digital phase shifts related to phase values 0, $3\pi/2$, $\pi$ and $\pi/2$) so as to generate a corresponding set of four phase-shifted digital samples, which corresponding set of four phase-shifted digital samples carries said OAM mode −1 with the predefined OAM mode rotation speed;

digitally filter each set of four phase-shifted digital samples obtained by means of the digital phase shifting so as to output a corresponding set of four filtered digital samples; and combine the sets of four filtered digital samples obtained by means of the digital filtering into a single filtered signal which represents the space-modulated digital signal $sms_{-1}(t)$.

The OAM mode generation modules for generating higher-order OAM modes (i.e., with $|m|>1$) operate, mutatis mutandis, conceptually in the same way as the OAM mode generation modules 110 and 120.

Moreover, again with reference to FIG. 2, the device 100 further comprises:

a combining module 150 operable to combine the first digital signal $s_0(t)$ received from the signal generation section 10 and all the space-modulated digital signals $sms_m(t)$ generated by the OAM mode generation modules into a corresponding combined digital signal $s_c(t)$; and a transmission filtering module 160, which is operable to digitally filter the combined digital signal $s_c(t)$ by means of a predefined transmission filter such that to adjust the signal bandwidth to the bandwidth of transmission radio channel (i.e., the specific radio channel used in transmission) so as to reduce Inter-Symbol Interference (ISI), thereby obtaining a corresponding output digital signal $s_{out}(t)$; wherein the transmission filtering module 160 is coupled with the RF transmission section 1000 to provide the latter with the output digital signal $s_{out}(t)$.

For example, in case of (free-space) satellite communications on a radio channel having the given frequency bandwidth W, the transmission filter can be a predefined root raised cosine filter adapted to said given frequency bandwidth W.

As for reception, reference is made to FIG. 3, which shows a functional block diagram of a receiving system (denoted as whole by 2), which is disclosed in PCT/IB2012/056804 and which exploits the aforesaid multidimensional space modulation for receiving radio vortices at frequencies ranging from a few KHz to hundreds of GHz.

In particular, the receiving system 2 comprises:

an RF reception section 2000, which is designed to receive signals at predefined radio frequencies by means of a single antenna (which is not shown in FIG. 3 for the sake of illustration simplicity and which can be also a reflector antenna with a single feed) or an antenna array (which is not shown in FIG. 3 for the sake of illustration simplicity and which can be also a multi-feed reflector antenna), and which is designed to obtain an incoming digital signal $u_{in}(t)$ on the basis of the received signals;

a device 200 for demodulating OAM modes, which is coupled with said RF reception section 2000 to receive the incoming digital signal $u_{in}(t)$ therefrom, and which is designed to process said incoming digital signal $u_{in}(t)$ so as to output useful signals (in FIG. 3 useful signals $u_0(t)$, $u_{+1}(t)$, $u_{-1}(t)$, $u_{+N}(t)$ and $u_{-N}(t)$ outputted by the device 200 are shown); and a signal processing section 20, which is coupled with said device 200 to receive the useful signals outputted by the latter and which is designed to process said useful signals.

The aforesaid predefined radio frequencies can conveniently range from a few KHz to hundreds of GHz depending on the specific application for which the overall receiving system 2 is designed.

Conveniently, the RF reception section 2000 can be an RF reception section of a receiving system for satellite communications (such as a receiving system of a feeder link Earth station, of a satellite, or of a ground apparatus for satellite communications), of a device for wireless communications (such as LTE-based communications), of a radar system, of a Synthetic Aperture Radar (SAR) system, or of a radio astronomy receiving system.

Accordingly, the signal processing section 20 can conveniently be a signal processing section of a receiving system for satellite communications (such as a receiving system of a feeder link Earth station, of a satellite, or of a ground apparatus for satellite communications), of a device for wireless communications (such as LTE-based communications), of a radar system, of a SAR system, or of a radio astronomy receiving system.

Additionally, FIG. 4 shows in greater detail the device 200 for demodulating CAM modes. In particular, as shown in FIG. 4, the device 200 comprises a reception filtering module 210, which is operable to digitally filter the incoming digital signal $u_{in}(t)$ by means of a predefined reception filter such that to equalize the incoming digital signal $u_{in}(t)$ with respect to reception radio channel (i.e., the specific radio channel used in reception) and, conveniently, also with respect to transmission filter (i.e., the specific filter used in transmission), thereby obtaining a corresponding filtered incoming digital signal $u_f(t)$.

For example, in case of (free-space) satellite communications on a radio channel having the given frequency bandwidth W, wherein the transmission filter is a predefined root raised cosine filter adapted to said given frequency bandwidth W, the reception filter can be the complex conjugate of said predefined root raised cosine filter so as to reduce ISI.

Additionally, again with reference to FIG. 4, the device 200 further comprises a digital oversampling module 220 operable to digitally oversample the filtered incoming digital signal $u_f(t)$ on the basis of a predefined oversampling period $T_{over}$, thereby outputting a corresponding set of digital samples.

For example, in case the receiving system 2 is configured to receive the RF signals transmitted by the transmission system 1, the predefined oversampling period $T_{over}$ can conveniently be equal to $T_0/Q$, wherein $T_0$ is the given sampling period previously introduced in connection with the transmission system 1, and Q denotes an integer higher than one.

Furthermore, again with reference to FIG. 4, the device 200 comprises also a processing module 230 configured to:

provide a linear system of M equations (where M denotes an integer higher than one) relating
  the set of digital samples outputted by the digital oversampling module 220
  to X unknown digital values (where X denotes an integer higher than one and lower than M) of useful signals associated, each, with a respective predefined OAM mode m with a predefined OAM mode rotation speed;

wherein said linear system of M equations relates the set of digital samples outputted by the digital oversampling module 220 to the X unknown digital values through first predefined parameters related to the predefined OAM modes with the predefined OAM mode rotation speed, and second predefined parameters related to the predefined reception filter, to the reception radio channel and, conveniently, also to the transmission filter;

compute the X digital values by solving the linear system of M equations; and digitally generate and output the useful signals (for example the useful signals $u_0(t)$, $u_{+1}(t)$, $u_{-1}(t)$, $u_{+N}(t)$ and $u_{-N}(t)$ shown in FIG. 4) on the basis of the corresponding digital values computed.

In this connection, it is important to underline the fact that, in order to extract the useful signals (i.e., in order to solve the linear system of M equations thereby computing the X digital values, and, thence, to generate and output the useful signals), the processing module 230 is conveniently configured to operate as a generalized matched filter which exploits one or more mathematical processing techniques, such as the pseudo-inverse technique.

Moreover, it is also important to underline the fact that the oversampling operation performed by the digital oversampling module 220 allows to increase redundancy of the linear system of M equations (i.e., it allows to obtain a number M of independent equations higher and higher than the number X of the unknown digital values), thereby allowing to find more robust solutions to said linear system of M equations.

Furthermore, the better the characterization of the OAM modes and of the radio channel in the linear system of M equations, the more robust the resolution of said linear system of M equations. Specifically, an increase of the number of first and second predefined parameters used in the linear system of M equations allows to increase redundancy of said linear system of M equations (i.e., it allows to obtain a number M of independent equations higher and higher than the number X of the unknown digital values), thereby allowing to optimize the resolution of, i.e., to find optimum solutions to, said linear system of M equations in terms of energy per bit to noise power spectral density ratio $E_b/N_0$.

In case the receiving system 2 is configured to receive the RF signals transmitted by the transmission system 1, the first predefined parameters are related to the sampling periods $T_0$ and $T_m$ previously introduced in connection with the device 100, and to the digital phase shifts applied by the OAM mode generation modules of the device 100 to the digital samples of the digitally-interpolated signals.

Moreover, again in case the receiving system 2 is configured to receive the RF signals transmitted by the transmission system 1, the useful signals generated and outputted by the processing module 230 (such as the signals $u_0(t)$, $u_{+1}(t)$, $u_{-1}(t)$, $u_{+N}(t)$ and $u_{-N}(t)$ shown in FIG. 4) are the digital signals transmitted by said transmission system 1 by means of the plane wave and the several radio vortices (namely the signals $s_0(t)$, $s_{+1}(t)$, $s_{-1}(t)$, $s_{+N}(t)$ and $s_{-N}(t)$ shown in FIGS. 1 and 2).

Preferably, the device 100 for generating OAM modes and the device 200 for demodulating OAM modes are implemented by means of Field-Programmable Gate Array (FPGA), Application-Specific Integrated Circuit (ASIC), and Software Defined Radio (SDR) technologies.

Finally, according to a further aspect of the International Application PCT/IB2012/056804, an overall radio communication system including both the transmission system 1 and the receiving system 2 is preferably designed to:

monitor interference experienced by the radio vortices transmitted; and, if the interference experienced by a radio vortex carrying a given digital signal $s_m(t)$ by means of a given OAM mode m meets a given interference-related condition (for example, if it exceeds a given interference level), start using an OAM mode m* different from the given OAM mode m for transmitting the information stream previously carried by said given digital signal $s_m(t)$ by means of said given OAM mode m, and stop using said given OAM mode m.

In case said further aspect of PCT/IB2012/056804 is used for satellite communications, it is possible to mitigate jammer, since said further aspect of PCT/IB2012/056804 allows to reject a jammed OAM mode. Moreover, said further aspect of PCT/IB2012/056804 can be used also in combination with other anti-jamming capabilities of the receiving system.

OBJECT AND SUMMARY OF THE INVENTION

The Applicant has carried out an in-depth study in order to develop a practical, efficient mode for carrying out the multidimensional space modulation disclosed in the International Application PCT/IB2012/056804, and this in-depth study has led the Applicant to develop a new, inventive system and method for transmitting and receiving signals at Radio Frequency (RF) (including frequencies from a few KHz to hundreds of GHz) with increased transmission capacity.

Therefore, an object of the present invention is that of providing a system and a method for transmitting and receiving RF signals with increased transmission capacity.

This and other objects are achieved by the present invention in so far as it relates to a method and a system for radio communications, as defined in the appended claims.

In particular, the present invention relates to a radio communications method, that comprises carrying out, by a transmitter, the following steps:

a) generating or receiving digital symbols to be transmitted, said digital symbols having a given symbol rate associated with a corresponding symbol period;

b) generating, every S digital symbols generated/received, a corresponding multi-mode digital signal, which has a predefined time length shorter than S times the symbol period, has a predefined bandwidth larger than the Nyquist bandwidth corresponding to the given symbol rate, and carries said S digital symbols by means of orbital angular momentum modes comprising a main mode, that is an orbital angular momentum mode with topological charge equal to zero and that carries P of said S digital symbols, and one or more twisted modes carrying the other S-P digital symbols, wherein each twisted mode is an orbital angular momentum mode with a respective topological charge different than zero and is time-shifted with respect to the main mode;

c) generating a multi-frame digital signal comprising successive, non-overlapped time frames, each of which has the predefined time length and carries a respective multi-mode digital signal generated; and d) transmitting a radio frequency signal carrying the multi-frame digital signal;

wherein S is an integer higher than three, and P is an integer higher than zero and lower than S.

Moreover, the radio communications method according to the present invention further comprises carrying out, by a receiver, the following steps:

e) receiving the radio frequency signal transmitted by the transmitter;

f) processing the received radio frequency signal so as to obtain a corresponding incoming digital signal;

g) performing on the basis of the incoming digital signal
carrier synchronization thereby recovering frequency and/or phase carrier used by the transmitter to generate the multi-mode digital signals,
clock synchronization thereby recovering the symbol rate and sampling time instants of the multi-mode digital signals generated by the transmitter, and
frame synchronization thereby detecting successive, non-overlapped portions of the incoming digital signal corresponding to the successive, non-overlapped time frames of the multi-frame digital signal generated by the transmitter; and h) extracting, on the basis of the carrier, clock and frame synchronizations performed, the S digital symbols respectively carried by each detected incoming digital signal portion by means of the orbital angular momentum modes.

Conveniently, each twisted mode is time-shifted with respect to the main mode by a respective time amount related to said twisted mode.

Preferably, the orbital angular momentum modes comprise a plurality of twisted modes, each of which is time-shifted with respect to the main mode and to any other twisted mode.

Conveniently, for each multi-mode digital signal generated by the transmitter:
the main mode carries the P digital symbols by means of main mode time samples with sampling period equal to the symbol period; and
the twisted mode/modes carries/carry the other S-P digital symbols by means of twisted mode time samples, wherein each twisted mode carries one or more respective digital symbols of said S-P digital symbols by means of respective twisted mode time samples with sampling period equal to the symbol period.

Preferably, the orbital angular momentum modes comprise 2N twisted modes, each identified by a respective topological-charge-related index n, that is an integer comprised between −N and +N and different than zero (N being an integer higher than zero). Moreover, for each multi-mode digital signal generated by the transmitter:
the main mode carries the P digital symbols by means of P main mode time samples with sampling period equal to the symbol period, P being equal to $2^{N+1}+1$; and
each twisted mode n
carries $2^{N-|n|}$ respective digital symbol(s) by means of $2^{N+1}$ respective twisted mode time samples with sampling period equal to the symbol period, and
is time-shifted with respect to the main mode by a respective time amount equal to $T/2^{|n|}$.

Conveniently, each multi-mode digital signal is generated by the transmitter by using a predefined. Gaussian filter such that to cause said multi-mode digital signal to have the predefined bandwidth larger than the Nyquist bandwidth corresponding to the given symbol rate.

Preferably, the multi-frame digital signal generated by the transmitter comprises:
a preamble intended to enable the receiver to perform frame synchronization; and
a sequence of successive, non-overlapped time frames carrying, each, a respective multi-mode digital signal generated by the transmitter.

Conveniently, the method step g) includes performing the carrier synchronization by means of a phased-locked loop. Again conveniently, the method step g) includes performing the carrier synchronization by means of a Costas loop.

Preferably, the method step g) includes performing the clock synchronization by implementing an early-late synchronization technique. Again preferably, the method step g) includes performing the clock synchronization by means of an early-late synchronization device based on digital phased-locked loop. More preferably, the method step g) includes performing the clock synchronization by carrying out:
an initial rough early-late synchronization on the basis of the incoming digital signal; and
a fine early-late tracking on the basis of the frame synchronization performed.

Conveniently, the method step g) includes performing the clock synchronization by:
recovering, on the basis of the incoming digital signal, the symbol rate and sampling time instants of the main mode of the multi-mode digital signals generated by the transmitter; and
recovering, from the detected symbol rate and sampling time instants of the main mode, sampling time instants of the twisted mode/modes of the multi-mode digital signals generated by the transmitter.

Preferably, all the multi-mode digital signals generated by the transmitter have one and the same predefined time sampling structure resulting from one and the same predefined time arrangement of time samples of the orbital angular momentum modes in each multi-mode digital signal; moreover, the method step g) includes performing the frame synchronization by detecting successive, non-overlapped portions of the incoming digital signal having said predefined time sampling structure.

Finally, the present invention relates also to:
a radio communications system designed to carry out the aforesaid radio communications method;
a transmitter and a receiver designed to carry out, respectively, the steps a), b), c) and d), and the steps e), f), g) and h) of the aforesaid radio communications method; and
software program products for implementing respectively, the steps a), b), c) and d), and the steps e), f), g) and h) of the aforesaid radio communications method.

BRIEF DESCRIPTION OF THE DRAWINGS

For a better understanding of the present invention, preferred embodiments, which are intended purely by way of non-limiting example, will now be described with reference to the attached drawings (all not to scale), where.

DETAILED DESCRIPTION OF PREFERRED EMBODIMENTS OF THE INVENTION

Figure 1:
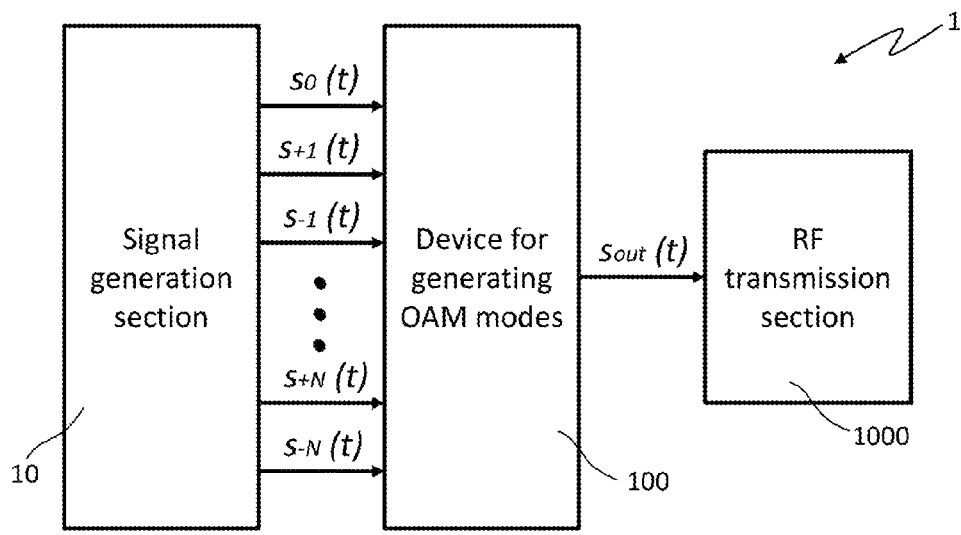
FIG. 1 schematically illustrates a transmitting system for transmitting radio vortices according to the background art.
Figure 2:
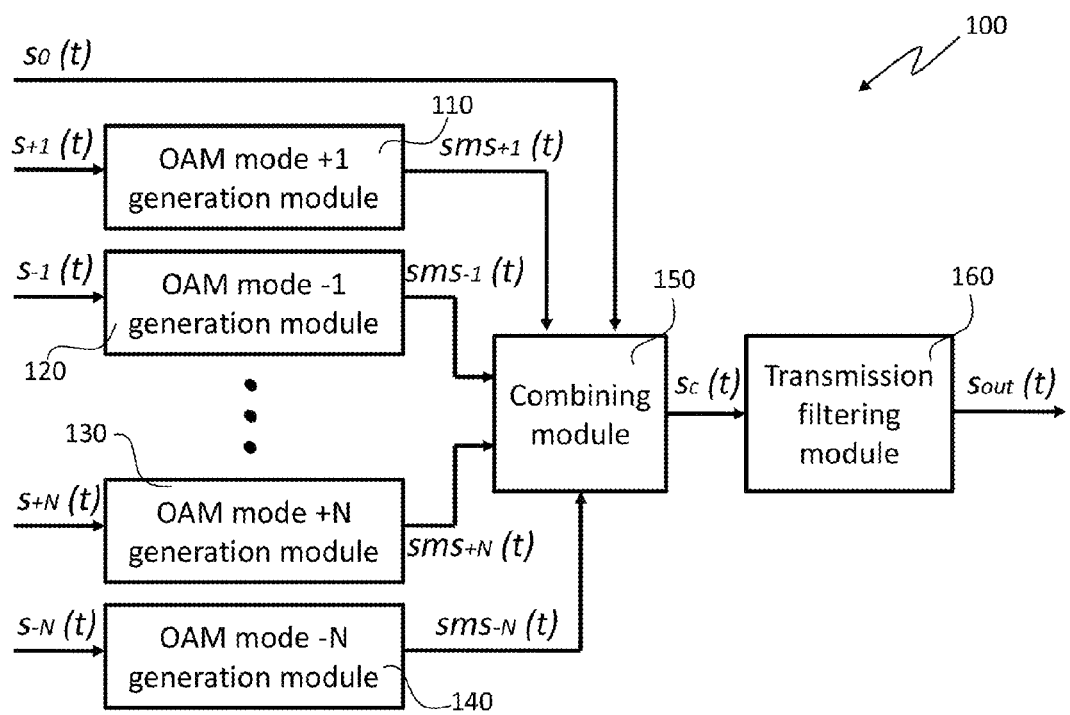
FIG. 2 schematically illustrates a device for generating OAM modes, which device is exploited by the transmitting system shown in FIG. 1.
Figure 3:
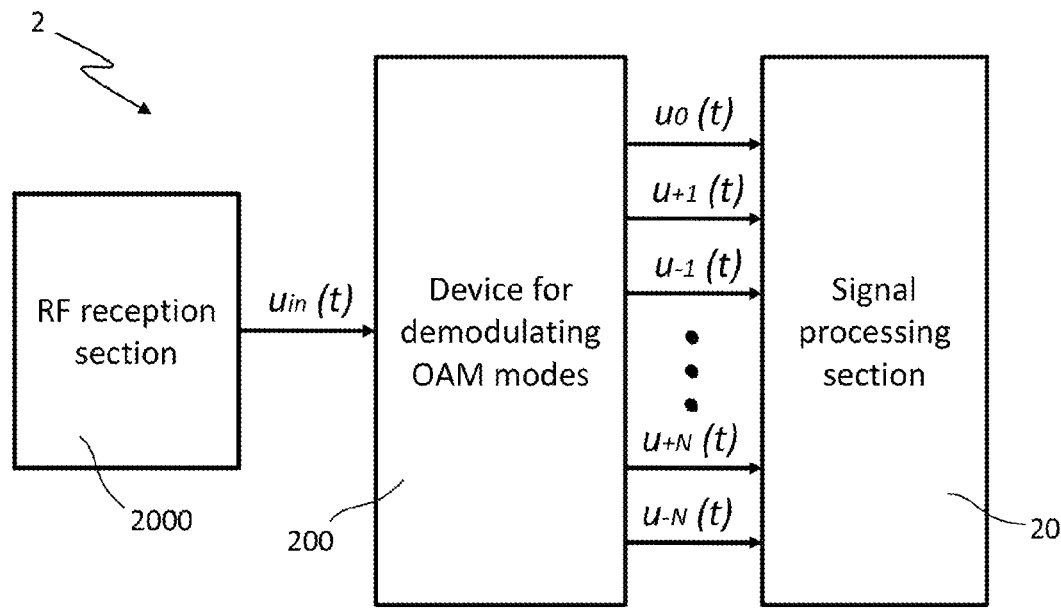
FIG. 3 schematically illustrates a receiving system for receiving radio vortices according to the background art.
Figure 4:
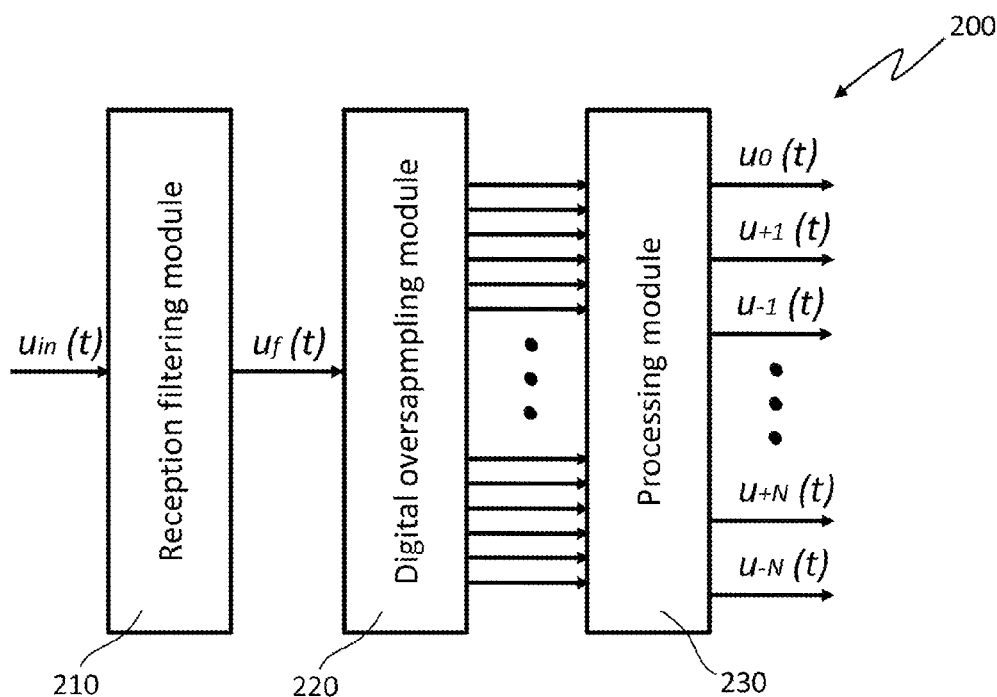
FIG. 4 schematically illustrates a device for demodulating OAM modes, which device is exploited by the receiving system shown in FIG. 3.

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown and described, but is to be accorded the widest scope consistent with the principles and features disclosed herein and defined in the appended claims.

In the following, for the sake of description simplicity, the expressions "twisted modes/signals/waves" will be used to denote orbital angular momentum modes with topological charge different than zero, and the expressions "main/conventional/traditional mode/signal" will be used to denote the orbital angular momentum mode with topological charge equal to zero.

International Application No. PCT/IB2013/003156 (whose content is herewith enclosed by reference) filed on 5 Nov. 2013 in the name of EUTELSAT S. A. discloses the feasibility of increasing transmission capacity at Radio Frequency (RF) (including frequencies from a few KHz to hundreds of GHz) by exploiting a proper approximation in time domain of the Hilbert transform of digital analytical signals, wherein said approximation of the Hilbert transform is obtained by using twisted waves, specifically orthogonal harmonic modes.

In particular, PCT/IB2013/003156 describes a radio communications system, which comprises a transmitter and a receiver, wherein the transmitter is configured to:
  generate or receive digital symbols having a given symbol rate associated with a corresponding symbol period;
  generate, every S digital symbols generated/received, a respective multi-mode digital signal, which has a predefined time length shorter than S times the symbol period, which is sampled with a predefined sampling rate higher than the symbol rate, and which carries said S digital symbols by means of a plurality of orthogonal time harmonic modes comprising
    a main mode which is a real harmonic mode and carries P of said S digital symbols, and
    one or more twisted modes carrying the other S-P digital symbols, each twisted mode being a complex harmonic mode time-shifted by half the symbol period with respect to the main mode (wherein S is an integer higher than three and P is an integer lower than S); and
  transmit a radio frequency signal carrying a sequence of the generated multi-mode digital signals.

Moreover, the receiver of the radio communications system according to PCT/IB2013/003156 is configured to:
  receive the radio frequency signal transmitted by the transmitter;
  process the received radio frequency signal so as to obtain a corresponding incoming digital signal; and
  extract, from successive, non-overlapped portions of the incoming digital signal sampled with the predefined sampling rate, the S digital symbols respectively carried by each incoming digital signal portion by means of the orthogonal harmonic modes; wherein each of the successive, non-overlapped portions of the incoming digital signal has the predefined time length.

Preferably, the transmitter according to PCT/IB2013/003156 is configured to generate a multi-mode digital signal carrying S digital symbols by:
  allocating P of the S digital symbols to the main mode by providing, for each of said P digital symbols, a corresponding complex value which represents said digital symbol and is related to the main mode;
  allocating each of the other S-P digital symbols to a corresponding twisted mode by providing, for each of said S-P digital symbols, a corresponding complex value which represents said digital symbol and is related to the twisted mode to which said digital symbol is allocated;
  computing, by using a predefined transmission matrix, M multi-mode complex values related to M successive time instants which, within the predefined time length, are separated by half the symbol period, wherein M is an integer equal to or higher than S, and wherein the predefined transmission matrix relates
    the S complex values representing the S digital symbols and related to the harmonic modes
    to the M successive time instants
    through complex coefficients each of which is related to a respective harmonic mode and to a respective time instant; and
  generating a multi-mode digital signal having the predefined time length and sampled with the predefined sampling rate on the basis of the M multi-mode complex values computed.

Again preferably, the receiver according to PCT/IB2013/003156 is configured to extract the S digital symbols carried by an incoming digital signal portion having the predefined time length and sampled with the predefined sampling rate by:
  extracting, from said incoming digital signal portion, M multi-mode complex values related to M successive time instants which are, within the predefined time length, separated by half the symbol period;
  computing, by using a reception matrix derived from the predefined transmission matrix, S complex values representing the S digital symbol carried by said incoming digital signal portion by means of the orthogonal harmonic modes, wherein said reception matrix relates
    the M extracted multi-mode complex values related to the M successive time instants
    to the S complex values to be computed
    through complex coefficients each of which is related to a respective harmonic mode and to a respective time instant; and
  determining the S digital symbols represented by the S complex values computed.

Conveniently, the receiver according to PCT/IB2013/003156 is designed to operate as a generalized matched filter and the reception matrix used by said receiver is derived from the predefined transmission matrix through a generalized inversion technique.

More conveniently, according to PCT/IB2013/003156, the predefined transmission matrix is such that the matrix resulting from the multiplication of the transpose of said predefined transmission matrix and said predefined transmission matrix has a determinant different from zero, and the reception matrix is derived from the predefined transmission matrix through a pseudo-inverse technique.

More and more conveniently, according to PCT/IB2013/003156, the reception matrix is computed on the basis of the following formula:

$$[[GMF]] = ([[A]]^T [[A]])^{-1} [[A]]^T,$$

where $[[GMF]]$ denotes the reception matrix, $[[A]]$ denotes the predefined transmission matrix, $[[A]]^T$ denotes the transpose of the predefined transmission matrix, and $([[A]]^T [[A]])^{-1}$ denotes the operation of inversion of the matrix resulting from the multiplication of the transpose of the predefined transmission matrix and the predefined transmission matrix.

Preferably, according to PCT/IB2013/003156, the main mode comprises, within the predefined time length, P samples with sampling period equal to the symbol period, the twisted modes comprise, within the predefined time length, P−1 samples with sampling period equal to the symbol period, each twisted mode is time-shifted by half the symbol period with respect to the time main mode, and said M successive time instants, which, within the predefined time length, are separated by half the symbol period, are the sampling times of the main mode and of the twisted modes, thereby resulting that M=2P−1.

More preferably, according to PCT/IB2013/003156, the harmonic modes comprise 2N twisted modes each of which carries a respective Orbital Angular Momentum (OAM) mode and has a respective topological-charge-related index n comprised between −N and +N, wherein N is an integer higher than one; moreover, the main mode carries $P=2^{N+1}+1$ digital symbols and each twisted mode having topological-charge-related index n carries $2^{N-n+1}$ digital symbols, thereby resulting that $M=2^{N+2}+1$ and $S=2^{N+2}-1$.

Conveniently, according to PCT/IB2013/003156, the predefined sampling rate depends at least on the predefined time length of each multi-mode digital signal and of each of the successive, non-overlapped portions of the incoming digital signal.

More conveniently, according to PCT/IB2013/003156, the predefined time length is equal to P times the symbol period.

More and more conveniently, according to PCT/IB2013/003156, the predefined sampling rate is determined on the basis of the following formula:

$$CR = \frac{2P+u}{2P} \cdot \frac{1}{T},$$

where CR denotes said predefined sampling rate, T denotes the symbol period, and u denotes a digital-vestigial-component-related parameter whose value is an integer and depends at least on the predefined time length.

For a better understanding of the present invention, in the following several important concepts disclosed in PCT/IB2013/003156 will be presented.

The introduction of a time interval for generating additional degrees of freedom can be regarded as a method equivalent to the introduction of an imaginary signal in the same baseband of a real signal. In fact, the imaginary part of a signal can be considered a shift in time of the signal itself.

In a way similar to the traditional analytical signals, the baseband can be translated, i.e., shifted, to the positive frequency axis by half the bandwidth and, by doing so, the real and the imaginary signals become both real and share one and the same bandwidth. The main difference with respect to the traditional analytical signals is that, in order for these two signals to be extracted, it is necessary to use a processing involving a time frame longer than the one used for analytical signals (for which the time frame is reduced to one symbol).

This methodology can be regarded as similar to interferometry, but, instead of using multiple points in "physical space", it uses multiple points in "time space".

Due to this similarity the procedure applied to generate the additional channels has been called multidimensional space modulation, where the "modulated space" is the "time space".

Considering multiple time points implies the possibility of working with time-shifted signals, i.e., imaginary signals (since an imaginary signal is equivalent to a signal shifted in time).

Hilbert transform is then used to derive a procedure for generating additional independent signals in one and the same bandwidth and is approximated by using orthogonal twisted waves carrying additional symbols.

A good representation of a time twisted wave signal requires a bandwidth slightly larger than the minimum one defined by Nyquist and, for each pair of twisted modes ±n, a respective sample sequence properly time-spaced.

Conveniently, a practical system based on time twisted waves can use only the modes n=0,±1,±2, thereby achieving a potential frequency reuse close to 1.7/1.9 (depending on conditions assumed for the signal-to-noise (S/N) ratio and on the roll off factor assumed).

Anyway, there are some implementation-related aspects which are to be carefully considered. In particular, a first aspect is the need to keep the reference sampling frequency; therefore, it is necessary to have more samples than the minimum number achievable with a twice oversampling; for example, if modes up to n=±2 are used, the time frame includes 9 symbols of the main mode oversampled by a factor 2 thereby resulting 18 symbol samples; in order to keep memory of the even/odd relation, it is necessary to add a digital vestigial component, i.e., to introduce in the same time frame 19 filter samples (which corresponds to a bandwidth increase of about 6.6%), that is equivalent to use a larger 3 dB bandwidth for a Gaussian filter.

Moreover, a second aspect is the use, for each mode, of a time sequence capable of generating, with respect to the other modes, the possibility of operating between an even and an odd component, i.e., capable of defining a reference frequency with respect to which the mode spectrum has this even/odd symmetry; to this end, it is convenient to define, for each mode, a frequency shift capable of satisfying this need; in particular, this frequency shift is given by:

$$f_n = \frac{nB}{2},$$

with a time sequence of $$\frac{4n}{B}$$

(where n denotes the considered mode, and B denotes the reciprocal of the symbol period T). In time domain this frequency shift corresponds to a sampling shift of $$\frac{T}{2n}.$$

Figure 5:
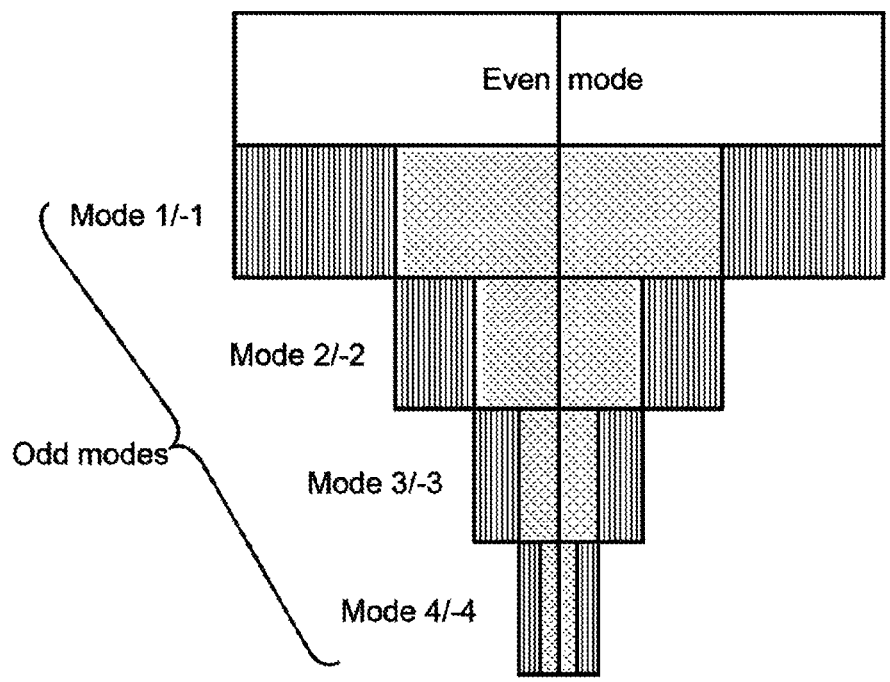
FIG. 5 schematically illustrates an example of time twisted mode frequency reference layout.

In this respect, reference is made to FIG. 5, which schematically shows an example of time twisted mode frequency reference layout wherein mode spectra have the aforesaid even/odd symmetry with respect to a reference frequency.

By using a time frame according to the foregoing, the symbols associated with (i.e., carried by) the different modes can be represented on a two-dimensional plane with the sampling time as abscissa and the frequency band (or the phase) as ordinate, i.e., on a time-band plane. In this respect, reference is made to FIG. 6, which schematically shows multidimensional time frame representation on time-band plane wherein even and odd properties of said multidimensional time frame are outlined.

Figure 6:
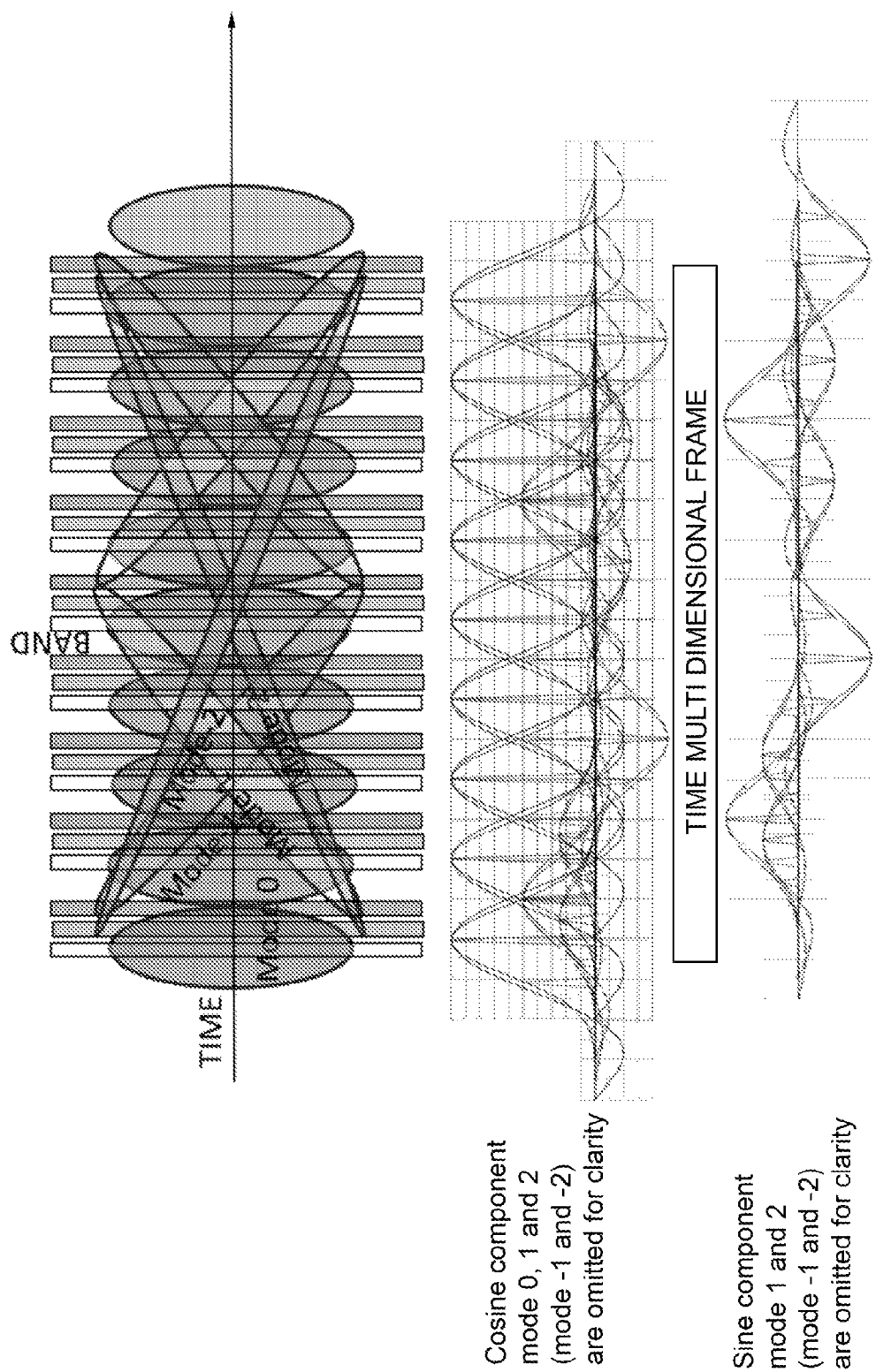
FIG. 6 schematically illustrates an example of multidimensional time frame representation on time-band plane along with even and odd properties of said multidimensional time frame.

In particular, the signal generation resulting from the example shown in FIG. 6 has the following features:
- as for main mode n=0, conventional symbol generation is performed with symbol rate 1/T and sampling at kT (with k equal to 0, 1, 2, 3, . . . , 8); in particular, the main mode n=0 carries 9 symbol complex values (real and imaginary components for any kind of digital modulation);
- as for modes n=±1, a two-complex-symbol generation is performed for each mode with symbol rate 1/(4T) and sampling at (2k'−1)T/2 (with k' equal to 1, 2, 3, . . . , 8); in particular, a total of 4 symbol complex values is carried by modes n=±1; and
- as for modes n=±2, one-complex-symbol generation is performed for each mode with symbol rate 1/(16T) and sampling
  at (2k'−1)T/2, as disclosed in PCT/IB2013/003156,
  or, according to a preferred embodiment of the present invention, at (4k'−3)T/4.

In particular, a total of 2 symbol complex values is carried by modes n=±2.

Thence, from reception perspective, 9+4+2=15 complex unknowns are to be determined for each received time frame.

As for sample shape for a time frame/sequence, one and the same filter can be used for the symbols associated with all the modes. Each mode is approximated by a sequence of repetition of one and the same symbol value properly phase-shifted the number of times necessary to complete a full $2\pi$ period.

Due to the mix of the real and imaginary signals in one and the same frequency band, it is necessary to receive a full time frame before determining the symbol values. This feature can be regarded as equivalent to interferometry techniques which take simultaneously into account a set of different directions in physical space.

Let us consider having the same energy per symbol for all the modes, then a generic pulse sequence can be conveniently rearranged considering that the maximum amplitude associated with the even samples (i.e., at kT) is associated with the full energy, while the maximum amplitude associated with the odd samples (i.e., at (2k'−1)T/2 and/or at (4k'−3)T/4) is divided, for each mode n, by a respective factor that is $$2^{\frac{n+2}{2}}.$$

More in general, let us consider using up to mode ±N. Then, the number of symbols carried by the main mode n=0 every time frame is $P=2^{N+1}+1$, the number of symbols carried by the modes n=±1 every time frame is $2^N$, the number of symbols carried by the modes n=±2 every time frame is $2^{N-1}$, the number of symbols carried by the generic modes n=±i every time frame is $2^{N-i+1}$, and the number of symbols carried by the modes n=±N every time frame is $2^{N-N+1}=2$.

Therefore, the overall number S of symbols carried by all the modes every time frame is:

$$S=2^{N+2}-1.$$

Moreover, the size of the time frame is $(2^{N+1}+1)T$, and $(2^{N+2}+1)$ represents the minimum number of independent equations necessary, at reception side, to compute the complex values of the S symbols carried by the time frame under processing.

Anyway, in order to sample the twisted modes (i.e., the modes with n≠0) at their maxima, the number of equations increases according to the following relation:

$$(2^{N+2}+1) \rightarrow \left[\left(1+\frac{N(N+1)}{2}\right)2^{N+1}+1\right].$$

Taking into consideration an approximation of the double-bandwidth Hilbert transform based on twisted modes n=0, ±1,±2, there results that, at reception side, the number of complex unknowns to be computed (i.e., the number S of the symbol complex values carried by the time frame under processing) is 9+4+2=15, and the number of complex equations to be solved is 33.

In consideration of the use of time frames, it is convenient to adopt a signal organization architecture, i.e., a reference system, useful to detect the signal structure at the reception side. In fact, as previously explained, each time frame has a time length of $(2^{N+1}+1)T$ (where N identifies the highest twisted modes used, or, equivalently, is the topological charge of the highest twisted modes used), and is to be identified at reception side. Therefore, it is convenient that the overall transmitted signal carries information on frame synchronization in addition to the symbol clock.

In general, the present invention relates to a very efficient mode for carrying out the radio communications method according to PCT/IB2013/003156.

In particular, a first aspect of the present invention relates to the use of a specific filter, namely a Gaussian filter, for transmitting and receiving the time twisted waves such that to have only one time reference to be selected in transmission and to be recovered in reception.

In fact, the use of a raised cosine filter is non-optimum, due to the use of two different reference times:
- a first one, namely the symbol period T, used for generating, each time frame, a multi-mode digital time signal carrying S symbols by means of main mode time samples at kT and twisted mode time samples at (2k'−1)T/2 and/or at (4k'−3)T/4; and
- a second one, namely a sampling period 1/CR lower than the symbol period T (i.e., corresponding to a sampling rate CR higher than the symbol rate 1/T), used for sampling the multi-mode digital time signal so as to increase the bandwidth, namely so as to have a bandwidth slightly larger than the minimum one defined by Nyquist.

Instead, the use of a Gaussian filter gives much more freedom in the selection of the two reference times, or rather enables:
- only one time reference to be used, namely a sampling period coinciding with the symbol period T; and,
- nevertheless, a bandwidth slightly larger than the minimum one defined by Nyquist to be obtained.

In particular, it is possible to simplify the twisted wave generation by considering that there is no defined condition between the shape of the filter and the sampling time.

Figure 7:
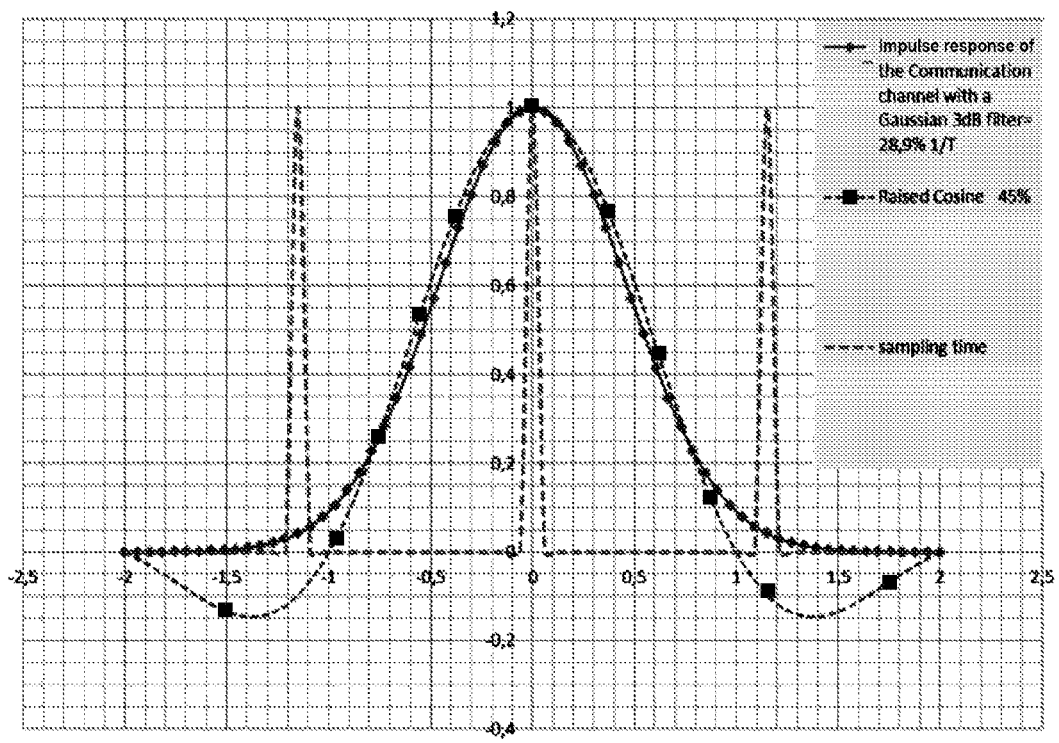
FIGS. 7 and 8 schematically illustrate comparisons between the use of raised cosine filtering and the use of Gaussian filtering (according to an aspect of the present invention) for generating time twisted waves.

With reference to FIG. 7, which shows a comparison between a Gaussian filter and raised cosine filter used for twisted modes, it is worth noting that two different aspects have to be managed with the raised cosine filter, namely the time function of the filter and the sampling time, that have to be different with the latter larger than the former one (in the case shown in FIG. 5 the ratio between the time function of the raised cosine filter and the sampling time is 1.15). In addition, the roll-off factor has to be optimized for the best performance of the generalized matched filter used at reception side.

Instead, by using a Gaussian filter, only one parameter has to be defined with respect to the sampling time, i.e., the 3 dB bandwidth of the Gaussian filter itself. This implies a much better performance in terms of bandwidth, and the selection of one single time reference.

Figure 8:
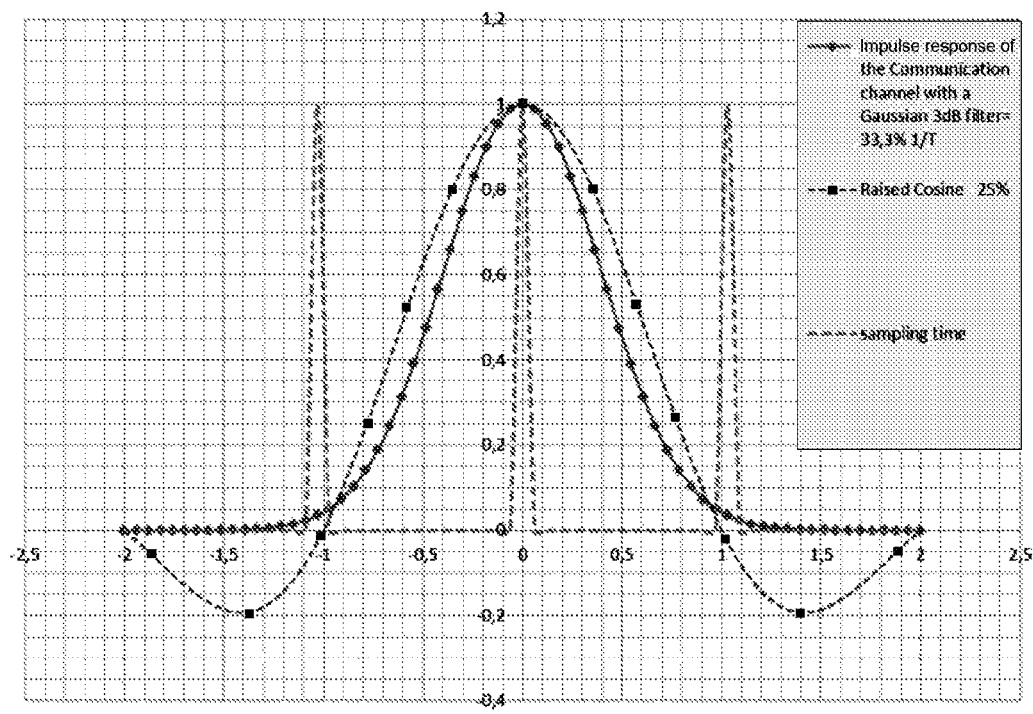

From FIG. 8, which shows a further comparison between a Gaussian filter and raised cosine filter used for twisted modes, it can be noted that, if the 3 dB bandwidth of the Gaussian filter is set to 33.3% instead of 28.9% (as shown in FIG. 7) with the sampling time at 1.15, the overall behaviour is the same. The bandwidth increase of this solution is about 6.6% of the standard solution for a raised cosine filter with a 25% roll-off.

The advantage in using Gaussian filtering instead of traditional raised cosine filtering for time twisted waves is essentially due to RF frame structure, which does not need the strong limiting condition on the zero position of the filter's time response.

Moreover, a second aspect of the present invention relates to frame synchronization.

In particular, this second aspect of the present invention relates to the fact that there is no need for the transmitted signal to periodically repeat the frame start (as it is typically done at the beginning of a frame in a Time-Division Multiplexing (TDM) stream, or with the preambles used in Time Division Multiple Access (TDMA)).

In fact, similarly to carrier recovery, a portion of the sequence can be used for recovering frame synchronization, but there is no need to modify the incoming signal structure, since it is sufficient to have a portion of the flow carrying no meaningful information (in case of loss during the communication some information could be lost). The architecture of this recovery frames with the frames carrying information can be called Twisted Wave Super Frame (TWSF), or simply Super Frame (SF).

Figure 9:
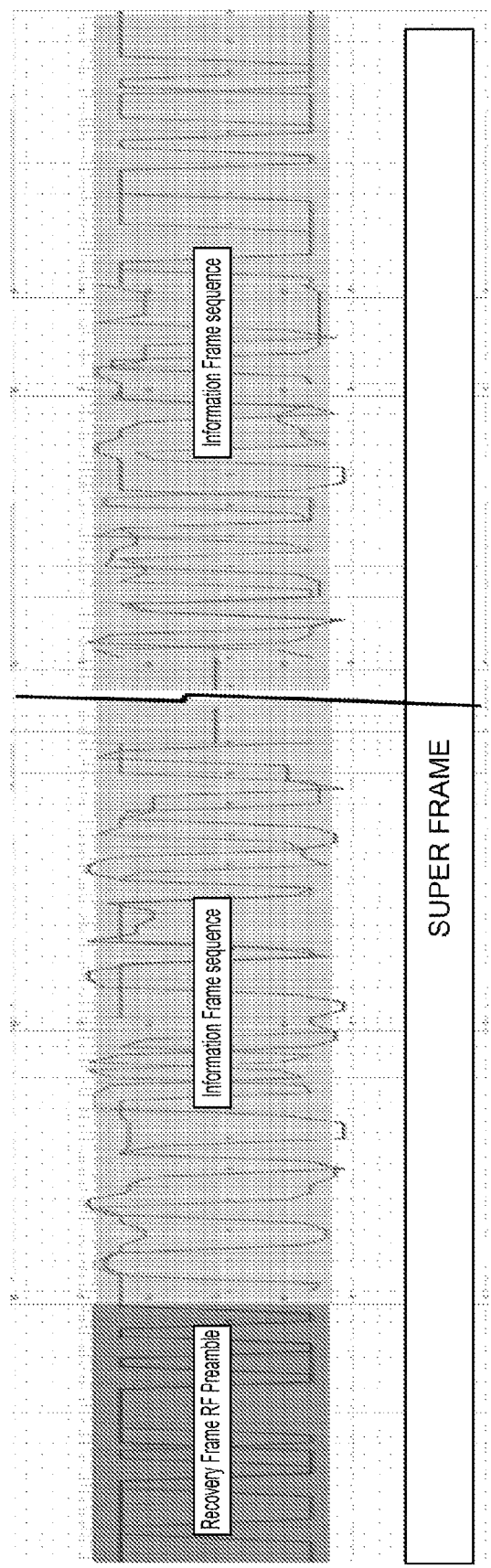
FIG. 9 schematically illustrates an example of twisted wave super frame structure according to a further aspect of the present invention, which twisted wave super frame structure includes a preamble for frame synchronization recovery and a sequence of time frames carrying meaningful information.

In this respect, FIG. 9 shows an example of TWSF structure according to said second aspect of the present invention, which TWSF structure includes:
  a preamble that carries no meaningful information and that is used for recovering frame synchronization at reception side; and
  a sequence of time frames following the preamble and carrying meaningful information.

Figure 10:
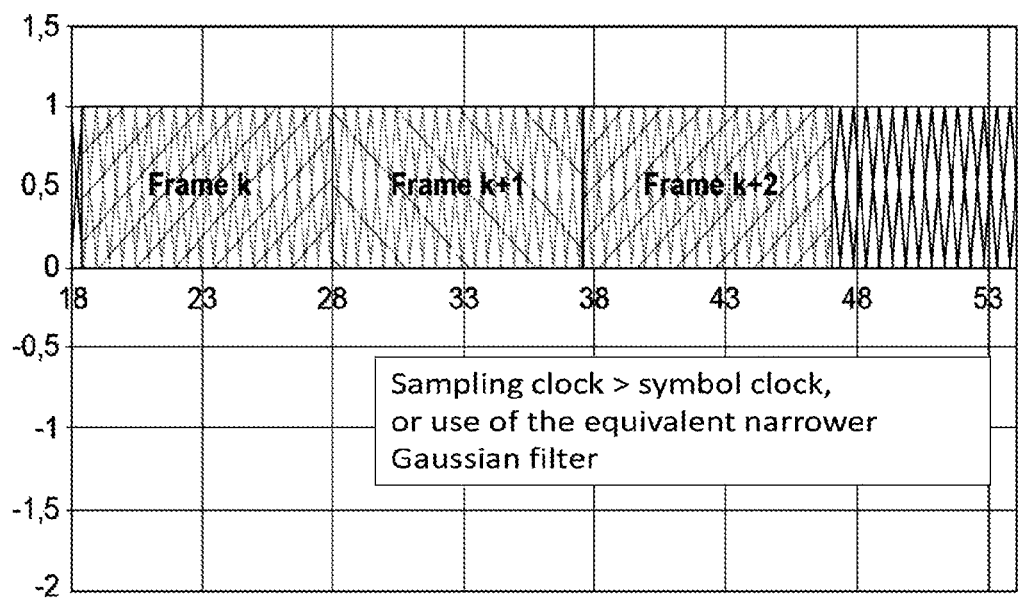
FIG. 10 schematically illustrates more in detail the sequence of time frames carrying meaningful information of FIG. 9.

Moreover, FIG. 10 shows in greater detail said sequence of time frames carrying meaningful information, which time frame sequence can be conveniently obtained by using:
  a sampling clock higher than the symbol clock. (in particular by using a raised cosine filter to generate the time twisted waves); or
  an equivalent narrower Gaussian filter according to the first aspect of the present invention, which Gaussian filter enables one and the same sampling and symbol clock to be used and, nevertheless, a bandwidth slightly larger than the minimum one defined by Nyquist to be obtained.

As previously told in short, if frame synchronization is lost, for any reason, during communication, the second aspect of the present invention (thanks to its frame synchronization recovery procedure which will be described in detail in the following and which does not necessarily need to be carried out on a synchronization preamble, but can be carried out on any portion of the incoming signal) enables the receiver to recover frame synchronization at any time only at the cost of losing some information.

Additionally, further aspects of the present invention relate to carrier, clock and frame structure recovery, at reception side, of the time twisted wave signals transmitted.

In fact, a key aspect for design and implementation of twisted wave signals is the capability to recover, at reception side, all the parameters necessary to correctly receive and demodulate the twisted waves. In particular, these parameters are mainly related to carrier and symbol clock recovery and tracking, and to "signal space geometry" recovery, namely correct detection of even/odd symmetry/anti-symmetry properties of the twisted waves.

In order for said further aspects of the present invention to be described in detail in the following, reference is made to FIG. 11, which shows a functional block diagram of a transmitting system (denoted as whole by 3) according to a preferred embodiment of the present invention.

Figure 11:
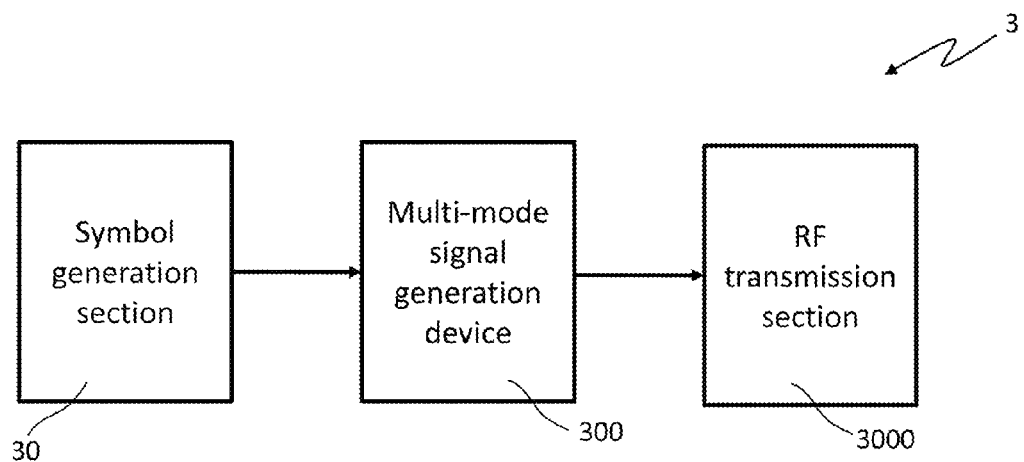
FIG. 11 schematically illustrates a transmitting system according to a preferred embodiment of the present invention.

In particular, as shown in FIG. 11, the transmitting system 3 comprises:
  a symbol generation section 30 configured to generate and output a digital symbol stream with symbol rate 1/T, or, equivalently, with symbol interval T;
  a multi-mode signal generation device 300, which is coupled with the symbol generation section 30 to receive the digital symbol stream outputted by the latter, and which is configured to generate and output, for each sequence of S (with S integer higher than three) digital symbols received from the symbol generation section 30, a respective multi-mode digital time signal carrying said S received digital symbols by means of an approximation of the Hilbert transform in time domain, which approximation is based on a time main mode and one or more time twisted modes, wherein
    the time main mode carries P (with P integer lower than S) of said S received digital symbols and is a real harmonic mode,
    the one or more time twisted mode(s) carries/carry the other S-P received digital symbols, each time twisted mode being a complex harmonic mode that is time-shifted with respect to the main mode (preferably, time twisted modes n=±1 are time-shifted by T/2 with respect to the main mode, time twisted modes n=±2 are time-shifted by T/4 with respect to the main mode, and generic time twisted modes n=±i are time-shifted by $T/2^i$ with respect to the main mode), and
    each multi-mode digital time signal generated and outputted by the multi-mode signal generation device 300 has a time length shorter than S times T and a frequency bandwidth larger than the symbol rate 1/T (i.e., larger than the Nyquist bandwidth 2/(2T)); and
  an RF transmission section 3000 which is coupled with the multi-mode signal generation device 300 to receive the multi-mode output signals outputted by the latter, and which is configured to transmit at predefined radio frequencies the received multi-mode output signals by means of a single antenna (which is not shown in FIG. 11 for the sake of illustration simplicity, and which can be also a reflector antenna with a single feed) or an antenna array (which is not shown in FIG. 11 for the sake of illustration simplicity, and which can be also a multi-feed reflector antenna).

Preferably, time twisted modes up to ±N are used and, as described in the foregoing and in the International Application PCT/IB2013/003156, each multi-mode digital time signal generated and outputted by the multi-mode signal generation device 300 has a time length equal to P times T (with $P=2^{N+1}+1$), carries $S=2^{N+2}-1$ digital symbols, and results from:

- a time main mode (with topological-charge-related index n=0), that carries $P=2^{N+1}+1$ digital symbols and comprises samples at kT (with k equal to 0, 1, 2, 3, ..., P−1); and
- time twisted modes (with topological-charge-related index n=±i different from zero) comprising samples at $[2^i k'-(2^i-1)]T/2^i$ (with k' equal, in this case, to 1, 2, 3, ..., P−1), each generic pair of time twisted modes n=±i carrying $2^{N-i+1}$ digital symbols.

Again preferably, the multi-mode signal generation device 300 is designed to generate each multi-mode digital time signal by using a Gaussian filter such that to cause said multi-mode digital time signal to have a frequency bandwidth larger than the symbol rate 1/T (i.e., larger than the Nyquist bandwidth 2/(2T)).

Again preferably, the transmitting system 3 is designed to transmit a sequence of multi-mode digital time signals by using a super frame structure which includes:

- a preamble that carries no meaningful information and that is intended to enable frame synchronization to be recovered at reception side; and
- a sequence of time frames following the preamble and carrying meaningful information, wherein each time frame carrying meaningful information is occupied by a respective multi-mode digital time signal.

Conveniently, the aforesaid predefined radio frequencies can range from a few KHz to hundreds of GHz depending on the specific application for which the transmitting system 3 is designed.

Moreover, the symbol generation section 30 can conveniently be a symbol generation section of a transmitting system for satellite communications (such as a transmitting system of a feeder link Earth station, of a satellite, or of a ground apparatus for satellite communications), or of a device for wireless communications, such as LTE-based or WiMAX-based communications.

Accordingly, the RF transmission section 3000 can conveniently be an RF transmission section of a transmitting system for satellite communications (such as a transmitting system of a feeder link Earth station, of a satellite, or of a ground apparatus for satellite communications), or of a device for wireless communications, such as LTE-based or WiMAX-based communications.

Conveniently, the symbol generation section 30 is designed to generate the digital symbol stream by performing several operations, such as the following operations (not necessarily all performed and not necessarily performed in the following sequence): information encoding (conveniently by performing one or more signal modulations), one or more frequency shifting operations, one or more analog-to-digital conversion operations, and one or more filtering operations.

Again conveniently, the RF transmission section 3000 can be designed to transmit at the predefined radio frequencies the multi-mode digital time signals by performing several operations, such as the following operations (not necessarily all performed and not necessarily performed in the following sequence): frequency up-shifting (in particular from Intermediate Frequency (IF) up to RF), one or more filtering operations, one or more digital-to-analog conversion operations, and power amplification.

Figure 12:
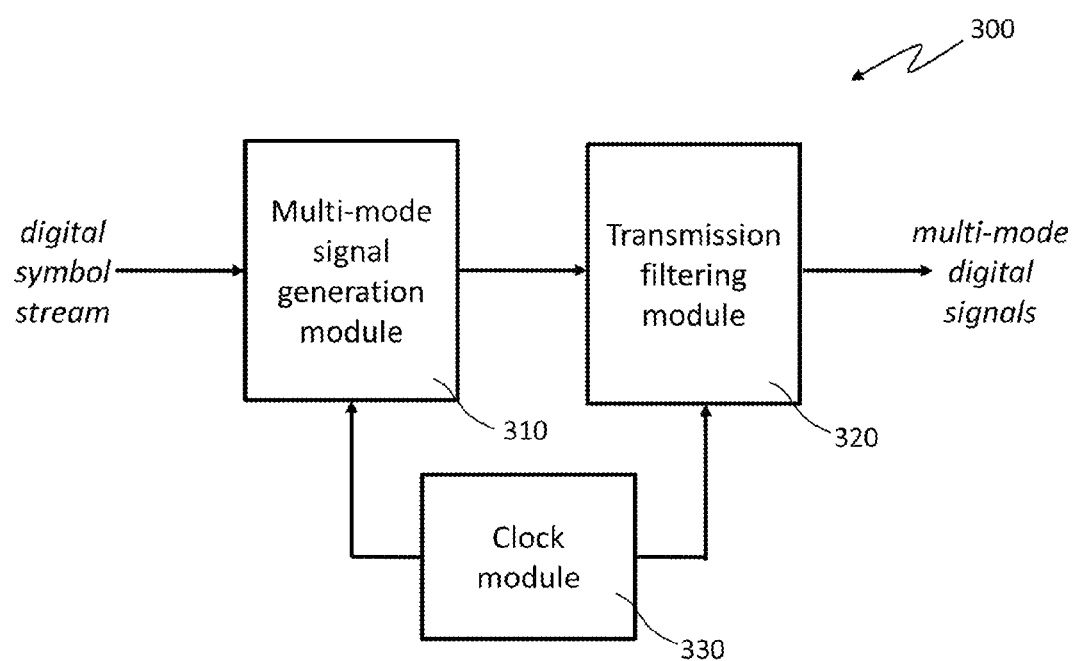
FIG. 12 schematically illustrates a multi-mode signal generation device exploited by the transmitting system of FIG. 11.

In order for the operation of the transmitting system 3 to be described in deeper detail, reference is further made to FIG. 12, which shows a more detailed functional block diagram of the multi-mode signal generation device 300.

In particular, as shown in FIG. 12, the multi-mode signal generation device 300 comprises:

- a multi-mode signal generation module 310, which is coupled with the symbol generation section 30 (not shown in FIG. 12 for the sake of illustration simplicity) to receive the digital symbol stream outputted by the latter, and which is configured, for each sequence of S digital symbols received from the symbol generation section 30, to
  - allocate P of the S received digital symbols to the time main mode by providing, for each of said P digital symbols, a corresponding complex value which represents said digital symbol and is related to the time main mode,
  - allocate each of the other S-P received digital symbols to a corresponding time twisted mode by providing, for each of said S-P digital symbols, a corresponding complex value which represents said digital symbol and is related to the time twisted mode to which said digital symbol is allocated,
  - compute M multi-mode complex values (with M≥S) related to M successive time instants, wherein the M multi-mode complex values are computed by using a predefined transmission matrix which relates the S complex values representing the S received digital symbols to the M successive time instants through M×S complex coefficients each of which is related to a respective time mode and to a respective time instant, and
  - generate, on the basis of the M computed multi-mode complex values, a multi-mode digital time signal;
- a transmission filtering module 320, which is
  - coupled with the multi-mode signal generation module 310 to receive the multi-mode digital time signals generated by the latter,
  - configured to digitally filter the received multi-mode digital time signals by means of a predefined transmission filter, preferably a predefined Gaussian filter, such that to cause said multi-mode digital time signals to have a frequency bandwidth larger than the symbol rate 1/T (i.e., larger than the Nyquist bandwidth 2/(2T)) and, conveniently, also such that to adjust multi-mode digital time signal bandwidth to the bandwidth of transmission radio channel (i.e., the specific radio channel used in transmission), and
  - coupled also with the RF transmission section 3000 (not shown in FIG. 12 for the sake of illustration simplicity) to provide the latter with the filtered multi-mode digital time signals; and
- a clock module 330 coupled with the multi-mode signal generation module 310 and the transmission filtering module 320 to provide them with a clock signal indicating the sampling rate of the multi-mode digital time signals.

Figure 13:
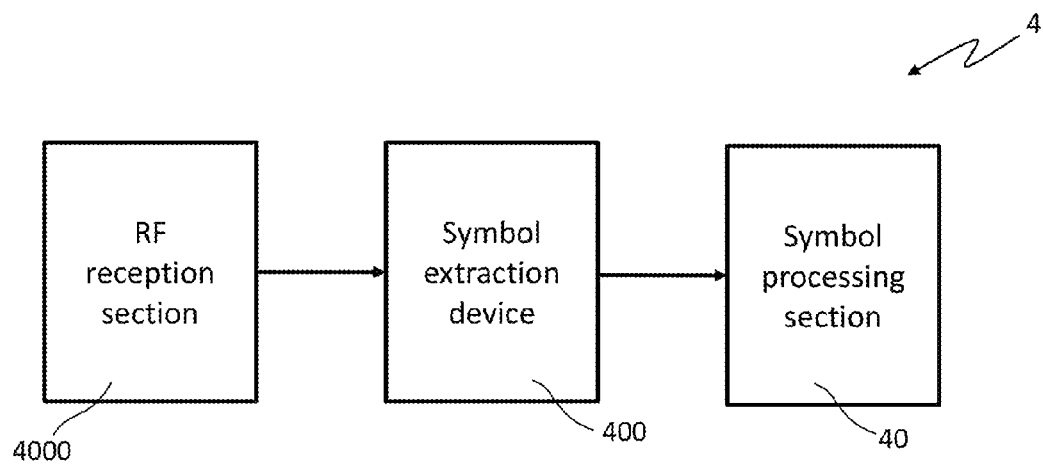
FIG. 13 schematically illustrates a receiving system according to a preferred embodiment of the present invention.

In order to analyze the operation at reception side, reference is made to FIG. 13, which shows a functional block diagram of a receiving system (denoted as whole by 4) according to a preferred embodiment of the present invention.

In particular, as shown in FIG. 13, the receiving system 4 comprises:

- an RF reception section 4000, which is designed to receive RF signals transmitted at the aforesaid predefined radio frequencies (which can range from a few KHz to hundreds of GHz depending on the specific application concerned) by the transmitting system 3; said RF reception section 4000 being designed to receive the RF signals by means of a single antenna (which is not shown in FIG. 13 for the sake of illustration simplicity and which can be also a reflector antenna with a single feed) or an antenna array (which is not shown in FIG. 13 for the sake of illustration simplicity and which can be also a multi-feed reflector antenna), and to process the received RF signals so as to obtain, on the basis of said received RF signals, an incoming digital time signal;

a symbol extraction device 400, which is coupled with said RF reception section 4000 to receive the incoming digital time signal therefrom, and which is designed to process said incoming digital time signal so as to
    extract the digital symbols carried by said incoming digital time signal, and
    output a stream of extracted digital symbols; and a symbol processing section 40, which is coupled with said symbol extraction device 400 to receive the stream of extracted digital symbols outputted by the latter, and which is designed to process said stream of extracted digital symbols.

The RF reception section 4000 can conveniently be an RF reception section of a receiving system for satellite communications (such as a receiving system of a feeder link Earth station, of a satellite, or of a ground apparatus for satellite communications), or of a device for wireless communications, such as LTE-based or WiMAX-based communications.

Accordingly, the symbol processing section 40 can conveniently be a symbol processing section of a receiving system for satellite communications (such as a receiving system of a feeder link Earth station, of a satellite, or of a ground apparatus for satellite communications), or of a device for wireless communications, such as LTE-based or WiMAX-based communications.

Conveniently, the RF reception section 4000 is designed to obtain the incoming digital time signal by performing several operations upon the received RF signals, such as the following operations (not necessarily all performed and not necessarily performed in the following sequence): low-noise amplification, one or more frequency down-shifting operations (in particular from RF down to IF), one or more filtering operations, and one or more analog-to-digital conversion operations.

Again conveniently, the symbol processing section 40 is designed to process the stream of extracted digital symbols by performing several operations, such as the following operations (not necessarily all performed and not necessarily performed in the following sequence): one or more filtering operations, one or more digital-to-analog conversion operations, one or more frequency shifting operations, and information decoding (conveniently by performing one or more signal demodulations).

Figure 14:
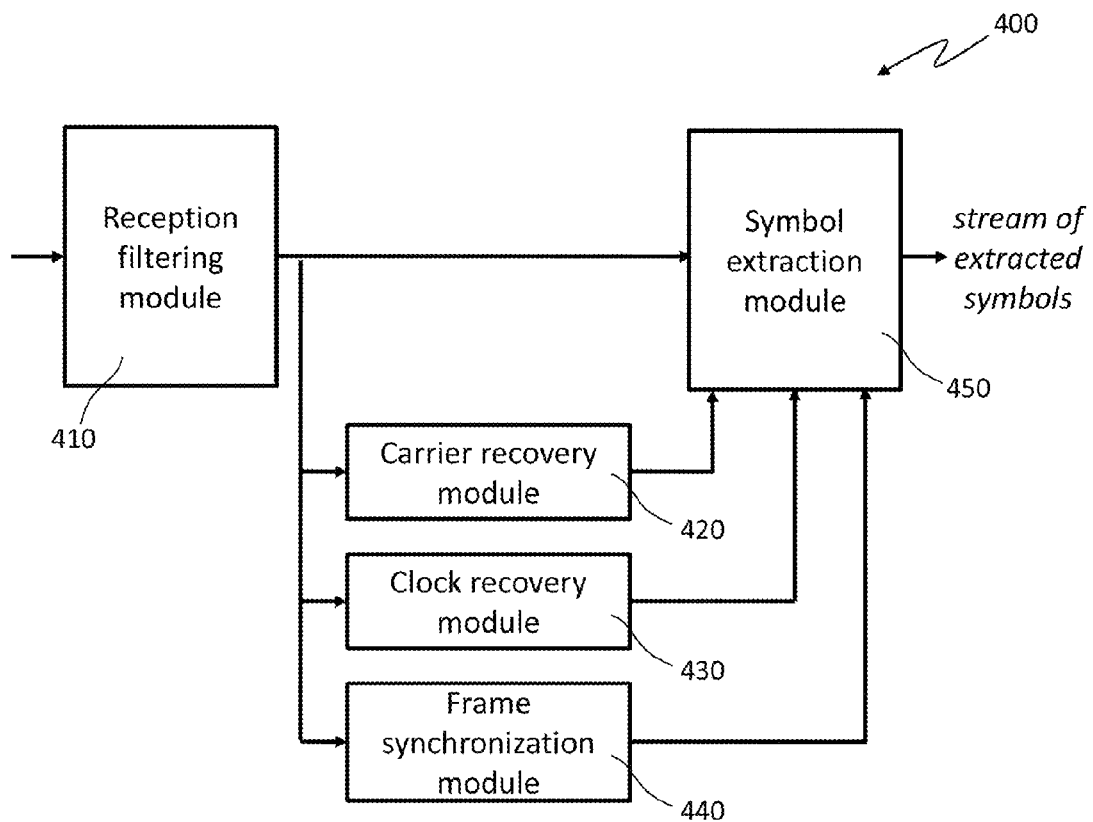
FIG. 14 schematically illustrates a symbol extraction device exploited by the receiving system of FIG. 13.

In order for the operation of the receiving system 4 to be described in deeper detail, reference is further made to FIG. 14, which shows a more detailed functional block diagram of the symbol extraction device 400.

In particular, as shown in FIG. 14, the symbol extraction device 400 comprises:

a reception filtering module 410, which is coupled with the RF reception section 4000 (not shown in FIG. 14 for the sake of illustration simplicity) to receive therefrom the incoming digital time signal, and which is configured to digitally filter the incoming digital time signal by means of a predefined reception filter, preferably a predefined Gaussian filter, which corresponds to the transmission filter used by the transmitting system 3 (in particular by the transmission filtering module 320), and which, conveniently, is such that to equalize the incoming digital time signal with respect to reception radio channel (i.e., the specific radio channel used in reception);

a carrier recovery module 420 which is coupled with the reception filtering module 410 to receive therefrom the filtered incoming digital time signal, and which is configured to
    recover, on the basis of the filtered incoming digital time signal, the carrier of the multi-mode digital time signals transmitted by the transmitting system 3, and
    output signals/data indicating the carrier;

a clock recovery module 430 which is coupled with the reception filtering module 410 to receive therefrom the filtered incoming digital time signal, and which is configured to
    recover, on the basis of the filtered incoming digital time signal, the symbol clock of the multi-mode digital time signals transmitted by the transmitting system 3, and
    output signals/data indicating the symbol clock; and a frame synchronization module 440 which is coupled with the reception filtering module 410 to receive therefrom the filtered incoming digital time signal, and which is configured to
    detect, on the basis of the filtered incoming digital time signal, the time frame structure of the multi-mode digital time signals transmitted by the transmitting system 3, and
    output signals/data indicating the time frame structure.

In this respect, it is worth noting again that the use of a Gaussian filter enables only one time reference to be used, namely the symbol clock, or rate, $1/T$ (or, equivalently the symbol period $T$), which, as previously explained, substantially coincides with the sampling rate (while the use of a Gaussian filter enables, nevertheless, a bandwidth slightly larger than the minimum one defined by Nyquist to be obtained). This fact implies a reduced complexity of the receiver 4, which need to recover, by means of the clock recovery module 430, only one time reference (i.e., the symbol clock), instead of two different time references (i.e., symbol clock plus sampling clock).

Preferably, as it will be described in detail in the following, the carrier recovery module 420 is configured to recover the carrier by means of a Phased-Locked Loop (PLL), in particular a Costas Loop, and the clock recovery module 430 is configured to recover the symbol clock by implementing an early-late synchronization; instead, the frame synchronization module 440 is a completely new module conceived for time twisted waves and its operation will be described in detail in the following.

Moreover, as shown in FIG. 14, the symbol extraction device 400 further comprises a symbol extraction module 450, which is coupled with:

the reception filtering module 410 to receive therefrom the filtered incoming digital time signal;

the carrier recovery module 420 to receive therefrom the signals/data indicating the carrier;

the clock recovery module 430 to receive therefrom the signals/data indicating the symbol clock; and the frame synchronization module 440 to receive therefrom the signals/data indicating the time frame structure.

The symbol extraction module 450 is configured to process, on the basis of the signals/data received from the carrier recovery module 420, the clock recovery module 430 and the frame synchronization module 440, successive, non-overlapped time frames of the filtered incoming digital time signal by determining, from each time frame processed, the S complex symbols respectively carried and by using a predefined reception matrix which is derived from the transmission matrix used by the transmitting system 3 (in particular by the multi-mode signal generation module 310).

Moreover, the symbol extraction module 450 is coupled also with the symbol processing section 40 to provide the latter with the stream of extracted symbols.

More in detail, the symbol extraction module 450 can be regarded as a generalized matched filter based on a reception matrix which is derived from the transmission matrix through a generalized inversion technique, such as the pseudo-inverse technique.

In particular, given a transmission matrix [[A]] such that det ([[A]]$^T$[A])≠0 (where [[A]]$^T$ denotes the transpose of the matrix [[A]]), thence the non-Hermitian reception matrix [[GMF]] is defined as:

$$[[GMF]]=([[A]]^T[[A]])^{-1}[[A]]^T.$$

In the following the aforesaid further aspects of the present invention related to carrier, clock and frame structure recovery at reception side will be described in detail.

With reference to a traditional system for synchronous radio communications, three features have to be taken into account:
 carrier synchronization;
 symbol/bit synchronization; and
 frame synchronization.

In particular, as for carrier synchronization, the receiver, in order to recover a signal without distortion, needs to estimate and compensate for frequency and phase differences between a received signal's carrier wave and the receiver's local oscillator for the purpose of coherent demodulation.

Once the frequency has been recovered, in digital systems it is important to recover symbol/bit synchronization. In fact, the output of the receiving filter must be sampled at the symbol rate and at the precise sampling time instants. Hence, a clock signal is required. The process of extracting this clock signal at the reception side is called symbol/bit synchronization.

Finally, in traditional systems frame synchronization is also required so as to enable the receiver to correctly process the time frames carrying, each, a respective group of symbols instead of every single symbol, such as a frame in TDM system. Similarly to symbol/bit synchronization, the process of extracting this clock signal is called frame synchronization.

In the case of time twisted waves, an additional frame is preferably used independently of the characteristics of the transmitted information stream, which additional frame is inserted at the beginning of the transmitted information stream. Twisted wave signals require an additional "geometrical frame", representing the symmetry space where it is possible to exploit the Hilbert transform advantage to increase the use of the bandwidth. In the following this type of frame is called Hilbert Frame Synchronization (HFS), which is distinguished from the traditional frame synchronization process, which will remain unchanged for each independent mode present in the twisted wave signal structure.

The synchronous signal has high noise-immunity and is reliable, and the generation of the synchronous signal does not consume much extra power, does not increase implementation complexity and involves few channel resources.

In order to keep a quasi-zero error at the steady state, a Phase-Locked Loop (PLL) is the solution, which can be used for traditional communication signals and for time twisted wave signals too.

The loop system is based on the possibility of measuring a phase difference between two signals. In general terms, phase recovery and tracking is performed using a Phase-Locked Loop (PLL).

As is known, a PLL is a negative feedback system where an oscillator signal is phase and frequency locked to a reference signal. In a suitable time frequency and phase errors produce a phase distortion, which is cancelled by phase aligning the internal clock with the input clock.

The clock is generally extracted from the received random data stream. The error signal is derived using a Phase-Frequency Detector (PFD).

The phase difference between the reference signal and the output signal is translated into two signals, one time-advanced and one delayed. The two signals control switches to steer current into, or out of, a capacitor, causing the voltage on the capacitor to increase or decrease. In each cycle, the time during which the switch is turned on is proportional to the phase difference, hence the charge delivered is dependent on the phase difference. The system is called Charge Pump.

The voltage on the capacitor is used to tune a Voltage-Controlled Oscillator (VCO), generating the desired output signal frequency.

The use of a charge pump naturally adds a pole at the origin in the loop transfer function of the PLL, since the charge-pump current is driven into a capacitor to generate a voltage V=I/sC.

The additional pole at the origin serves to integrate the error signal and causes the system to track the input with one more order. This signal controls, via a Loop Filter (LF), the VCO.

Summarizing, the PFD generates a digital pulse whose width is proportional to phase error, the Charge Pump converts the digital error pulse into an analogical error current, the LF integrates the error current thereby generating a control voltage for the VCO, the VCO generates a frequency proportional to the control voltage, and a frequency divider generates the clock used for sampling the signal.

Figure 15:
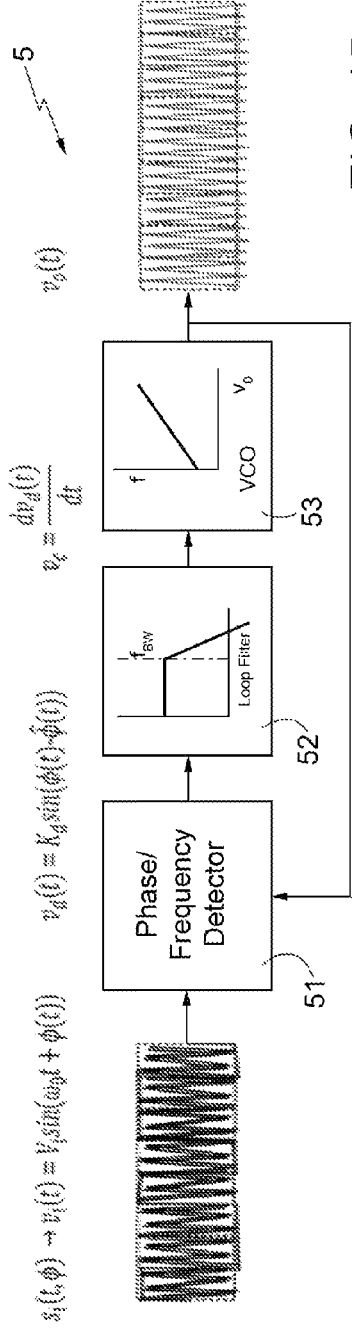
FIG. 15 schematically illustrates architecture of a traditional Phase-Locked Loop.

In this respect, FIG. 15 shows a functional block diagram of a traditional Phase-Locked Loop (PLL) 5, which includes:
 a Phase-Frequency Detector (PFD) 51;
 a Loop Filter (LF) 52, which is a low-pass filter and is coupled with the PFD 51; and
 a Voltage-Controlled Oscillator (VCO) 53, that is coupled with the LF 52 and whose output is provided, as a feedback, to the PFD 51.

The PFD 51 contains a multiplexer and a low-pass filter. The output signal is a function given by the instantaneous phase difference between the input signal carrier extracted from the input signal and the VCO signal:

$$v_d(t)=K_d \sin(\phi(t)-\hat{\phi}(t))=K_d \sin(\phi_e(t)-\hat{\phi}(t)).$$

Taking into consideration a transmitted signal based only on the main mode, this conventional signal can be represented, in a very general way, with its cosine and sine components, which represent, respectively, the in-phase component I and the quadrature component Q.

Once carrier, phase and clock have been recovered, the obtained signal has its in-phase component I that is orthogonal to the sine function of the analytical signal carrier and its quadrature component Q that is orthogonal to the cosine function of the analytical signal carrier. Therefore the easiest way to keep the right carrier, phase and clock is based on the convolution function between the components I and Q, and the sine and cosine components.

If there is no error, these convolutions are equal to zero. This property is valid for any choice of the sampling time, i.e., for any value of t and for an arbitrary convolution time period (as long as it is a multiple of the sampling period).

The above characteristic is due to the receiving matrix of the main mode signal, which is real. In the case of time twisted wave signals, the situation is more complicated due to the additional "time geometrical structure" created for allowing the presence of the Hilbert-transform-based signal. This geometrical structure is represented by the introduction of the Hilbert Frame, which implies the need of synchronizing this frame to enable the generalized matched filter to correctly operate.

As is known, some carrier recovery techniques are "direct extraction techniques", where the synchronization information is directly extracted from the received signal component. The most general method assumes that the carrier component has been already eliminated from the spectrum of the received modulated signal, then the carrier component can be extracted by performing nonlinear transformation or using a PLL with specific design.

Among direct carrier recovery architectures the Costas Loop has been selected for carrier recovery according to an aspect of the present invention. As is known, the Costas Loop is typically used for analytical digital signals for its intrinsic advantages. In the following it will be shown that the same loop is capable of operating independently of the presence of time twisted waves in addition to the main mode.

Figure 16:
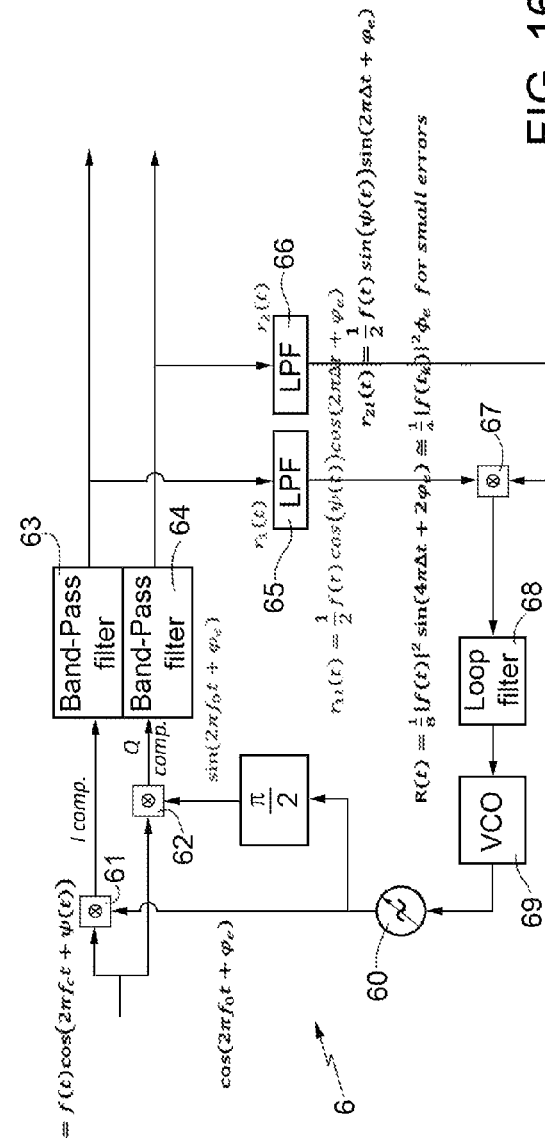
FIG. 16 schematically illustrates a Costas Loop for carrier recovery and tracking for time main mode signals and time twisted wave signals according to an embodiment of the present invention.

In this respect, FIG. 16 shows a functional block diagram of a Costas Loop 6 for carrier recovery and tracking for time main mode signals and time twisted wave signals according to an embodiment of the present invention.

In particular, as shown in FIG. 16, assuming that the Costas Loop 6 receives, as input, a time signal $s(t)=f(t)\cos(2\pi f_c t+\psi(t))$, then the in-phase component I and the quadrature component Q of this signal are extracted by means of two mixers 61 and 62 and these components I and Q are filtered, each, by a respective band-pass filter 63/64 and then by a respective low-pass filter 65/66, thereby obtaining the following two signals:

$$r_{1i}^+(t) = \frac{1}{2}f(t)e^{j(\psi(t))}\cos(2\pi\Delta_e t + \varphi_e), \text{ and}$$

$$r_{2i}^+(t) = \frac{1}{2}f(t)e^{j(\psi(t))}\sin(2\pi\Delta_e t + \varphi_e).$$

These two signals are multiplied each other (block 67 shown in FIG. 16), thereby obtaining a signal:

$$R(t) = \frac{1}{8}|f(t)|^2\sin(4\pi\Delta_e t + 2\varphi_e).$$

The signal R(t) is then provided, through a Loop Filter (LF) 68, to a Voltage-Controlled Oscillator (VCO) 69, whose output is supplied to an oscillator 60 which controls the mixers 61 and 62 thereby carrying out carrier recovery.

The signal R(t) depends on the signal power and on the residual error, but does not depend on the signal modulation. Therefore it can be used for both conventional (i.e., main mode) and twisted wave signals.

The main difference is that, in the case of twisted waves, the output $r_{1i}^+(t)=(½)f(t)e^{j(\psi(t))}$, when the error is recovered, is not directly associated with the modulated in-phase channel; in fact, it represents the sum of the main mode and the twisted modes at the time t (in order to detect all the modes the generalized matched filter is to be used).

As for carrier recovery performance, three types of performance can be considered:
 steady-state phase error;
 random phase error; and
 synchronization acquisition time and hold time.

The steady-state phase error depends on the narrowband filter, which is a tuned loop having a known Q value.

When the central frequency $f_0$ is different from the carrier frequency $f_c$, a steady-state phase error arises, which, for small $\Delta f=(f_c-f_0)$, results to be:

$$\Delta\varphi_e = 2Q\frac{f_c-f_0}{f_0} = \frac{f_c-f_0}{k_0},$$

where $k_0$ denotes the DC gain of the PLL.

By adjusting the DC gain value of the PLL, the steady-state phase error can be reduced to a minimum value, according to the system noise level.

Moreover, as for random phase error, let us assume a Gaussian distribution of the phase noise, which is usually a likely assumption for reasonably good signal-to-noise (S/N) ratios; accordingly, the phase noise power is:

$$f(\phi) = \frac{1}{\sigma_\phi\sqrt{2\pi}}e^{\frac{\phi^2}{2\sigma_\phi^2}},$$

where $\sigma_\phi$ is the phase jitter variance.

Taking into account that $$Q = \frac{\pi}{2}\frac{f_0}{B_n},$$

where $B_n$ is the Loop Filter bandwidth, the jitter variance can be expressed as:

$$\sigma_\phi = \sqrt{\frac{\pi N_0 f_0}{4QS}}.$$

Therefore the random phase noise and steady-state phase errors have opposite dependence on the Q value, and there is an optimum value of the Q value to be selected in accordance with the S/N ratio.

Figure 17:
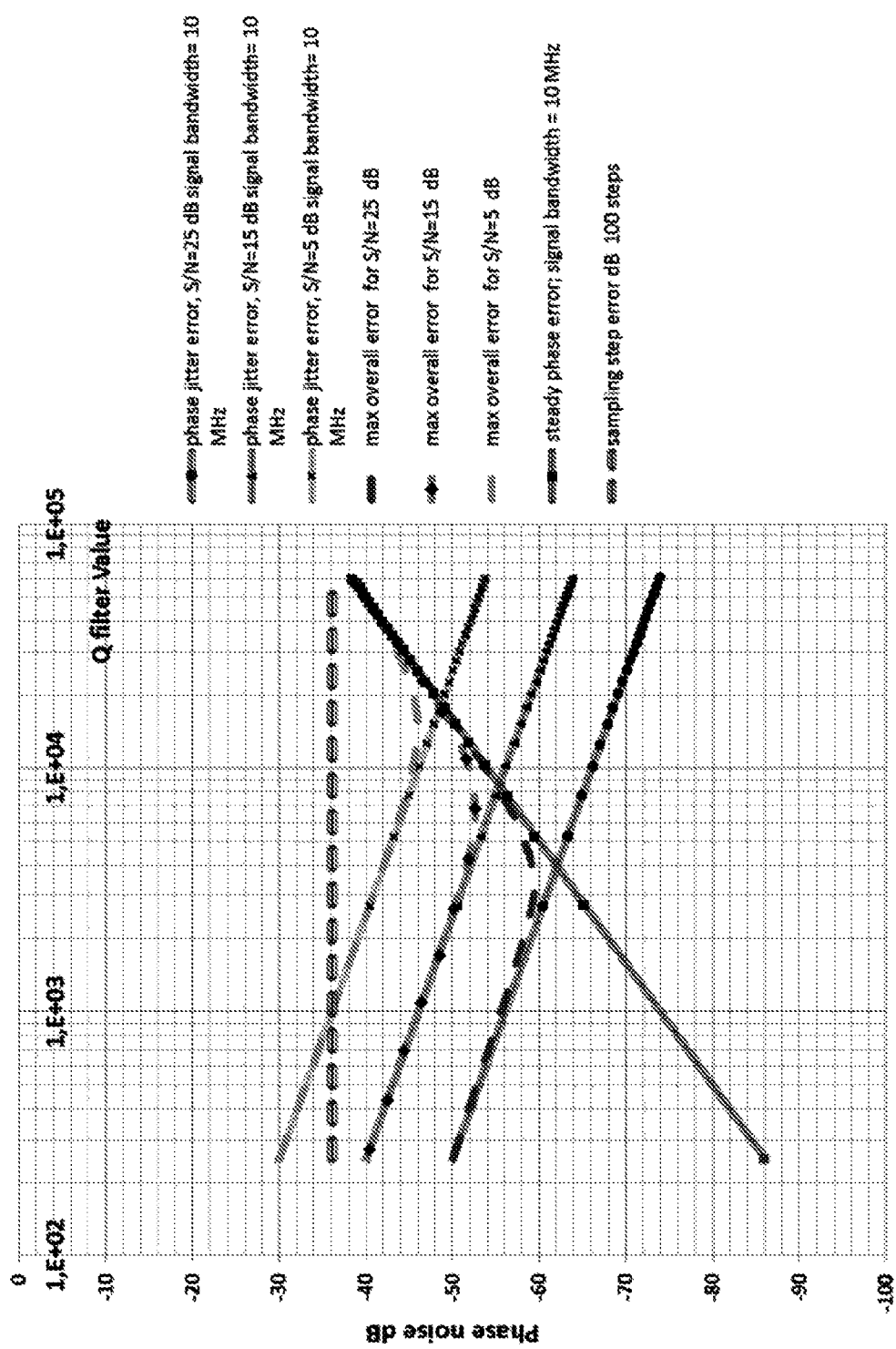
FIG. 17 schematically illustrates combination of steady-state phase error and phase jitter error in relation with symbol sampling time period stepping.

In practical terms, due to digitalization and time stepping usually adopted in current devices, these errors are included in the digitalization process as shown in FIG. 17, which schematically shows combination of steady-state phase error and phase jitter error in relation with symbol sampling time period stepping.

There are no main differences between twisted waves and conventional signal, as previously described; the only slightly advantage of the twisted wave signals is due to the fact that the overall signal noise is larger, due to the presence of additional symbols over the same time period and in the same bandwidth. The additional advantage is anyway small, for example of the order of 1 dB when using twisted modes ±1 and ±2 in addition to mode 0 (plane wave; i.e., the conventional signal).

Moreover, as for synchronization acquisition time and hold time, the synchronization acquisition time depends on the Q value of the filter and on the S/N ratio. In accordance with the S/N ratio an amplitude threshold k is defined, which determines a building time as $$t_S = \frac{Q}{\pi} \ln\left(\frac{1}{1-k}\right),$$

and a holding time as $$t_C = \frac{Q}{\pi} \ln\left(\frac{1}{k}\right).$$

Figure 18:
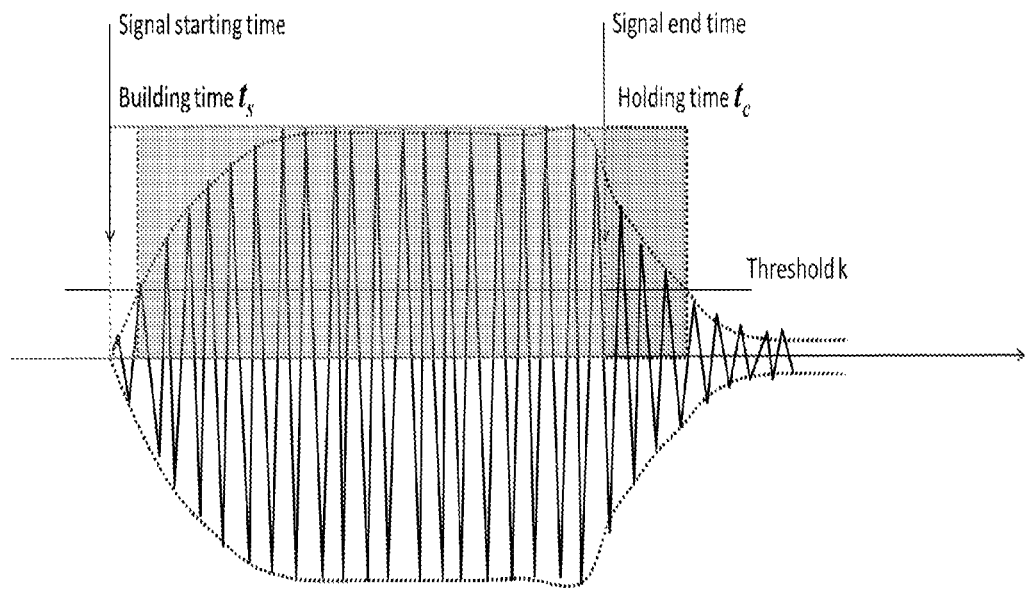
FIG. 18 schematically illustrates synchronization acquisition time and hold time.

In this respect, reference is made to FIG. 18, which shows building time $t_S$, holding time $t_C$ and the threshold k.

Figure 19:
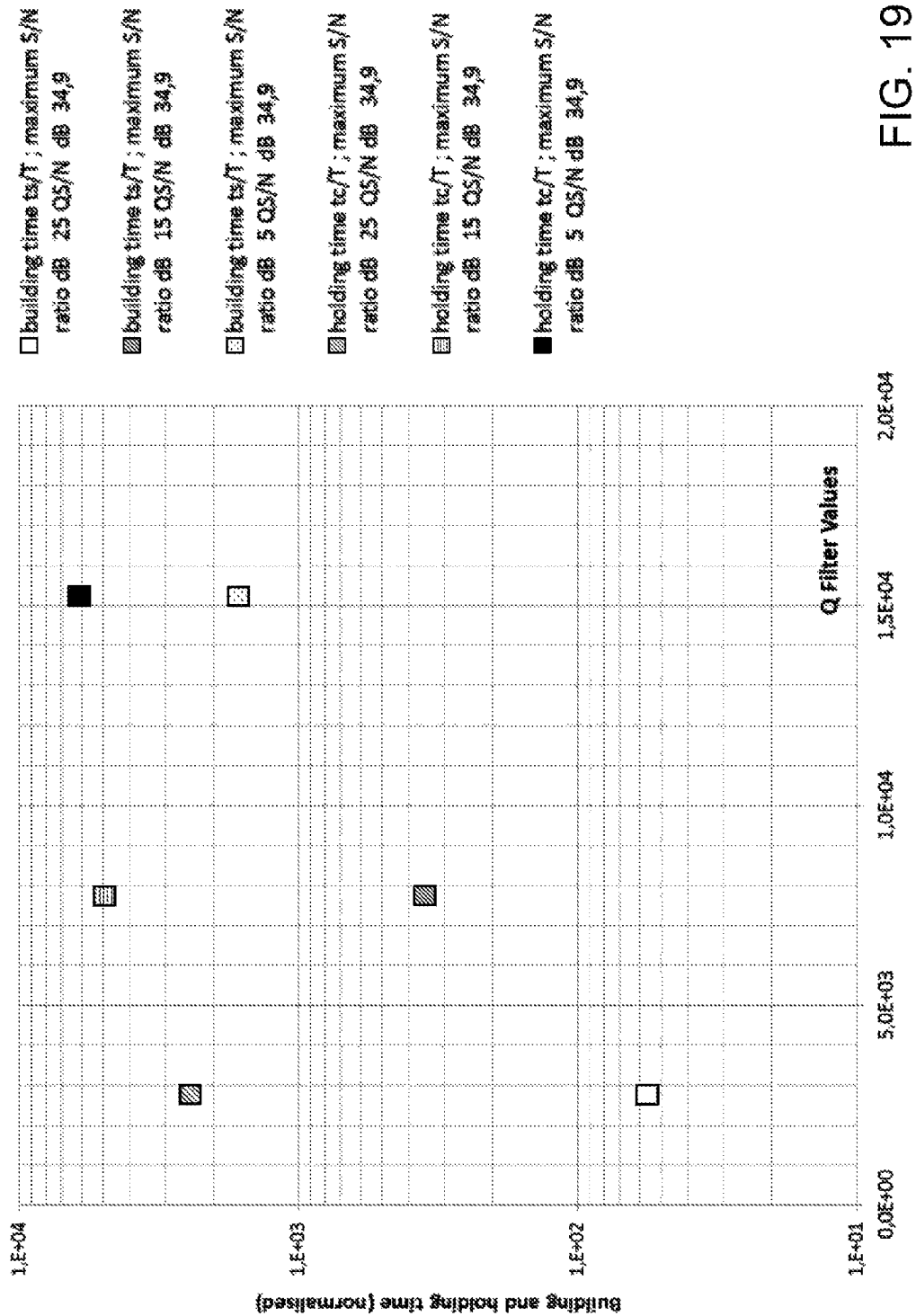
FIG. 19 schematically illustrates building and holding times as a function of the Q value of the filter used.

Assuming a threshold k allowing a maximum noise error lower than −35 dB, the building time $t_S$ and the holding time $t_C$ are shown in FIG. 19 as a function of the Q value of the filter (in FIG. 19 the S/N ratio being a parameter).

Twisted waves and conventional signals behave similarly, being the carrier recovery independent of the signal modulation.

In the conventional modulation transmission the outputs of the Costas Loop present the I and the Q components of the modulated signal. These components have to be sampled selecting the right symbol clock frequency and phase, in particular, with reference to the "Eye" properties, selecting the best aperture corresponding to the maximum signal and the minimum phase error positioning.

Figure 20:
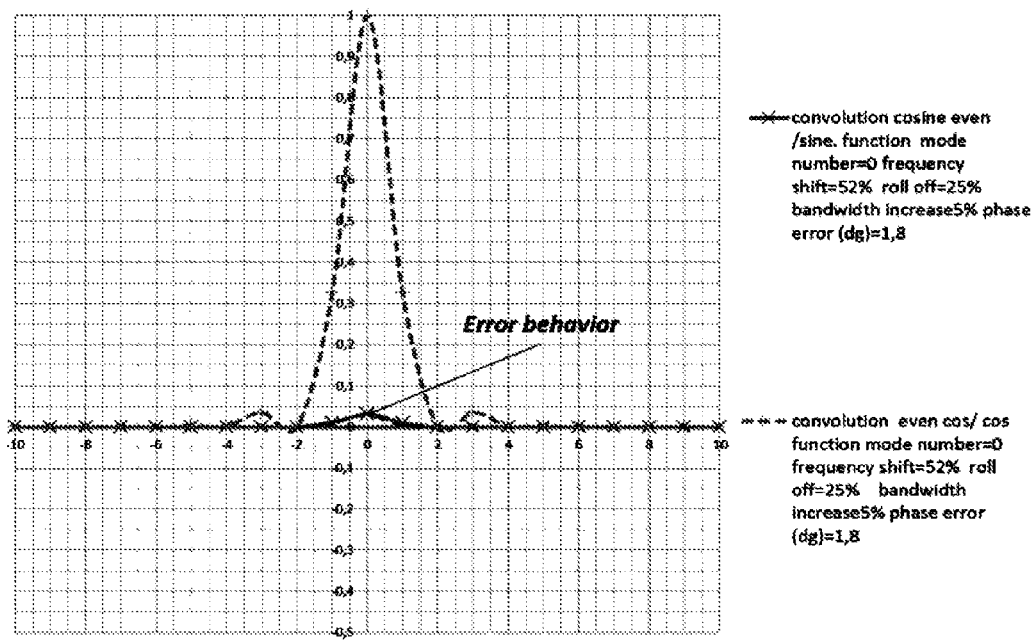
FIG. 20 shows an example of convolution between a main mode signal and a sampling clock function with a phase error of 1.8 degrees.

Assuming to a phase error of 1% on the sampling symbol clock, the characteristics of the convolution function between the signal and the clock (properly filtered by the signal bandwidth) are presented in FIG. 20, which shows an example of convolution between a conventional signal (i.e., main mode signal) and a sampling clock function with a phase error of 1.8 degrees.

The presence of the error depends only on the accuracy of the phase of the sampling clock. Once the phase error is zero, the cross-convolution is zero everywhere along the time axis. Therefore this characteristic implies that there is no need of ordering different pulses, but that each one is taking the error information.

Figure 21:
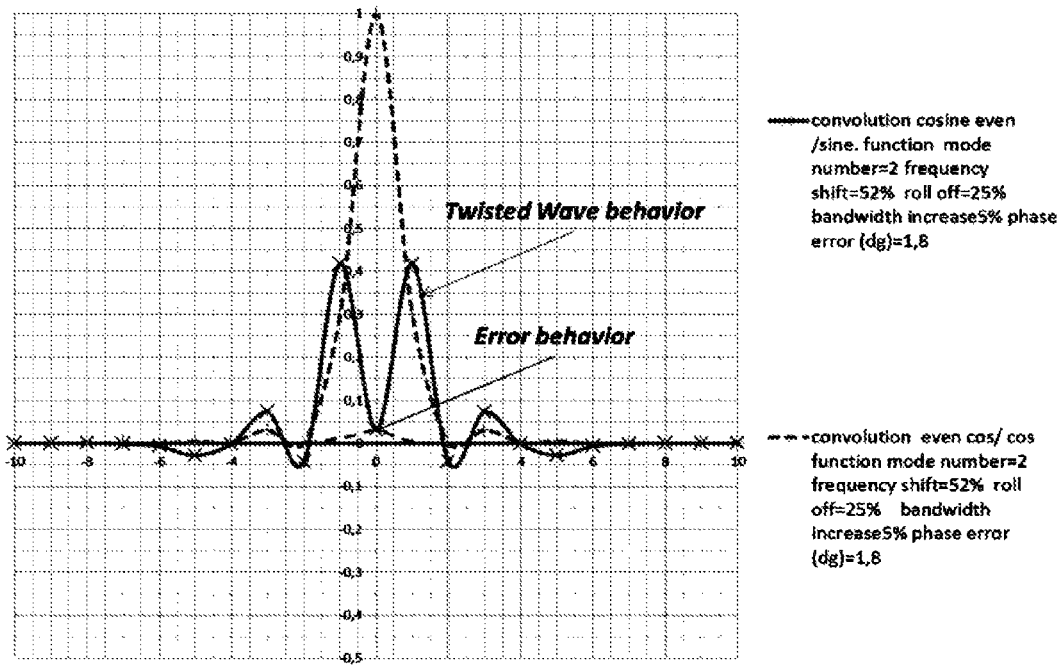
FIGS. 21 and 22 show examples of convolution between a twisted wave signal (with twisted modes up to n=±2) and a sampling clock function with phase errors of, respectively, 1.8 and zero degrees.

The situation is rather different in the twisted wave case. In fact, taking into consideration the first two modes present in the twisted wave signal, the convolution signal is presented in FIG. 21, which shows an example of convolution between a twisted wave signal (with twisted modes up to n=±2) and a sampling clock function with a phase error of 1.8 degrees. From FIG. 21 it is evident that the phase error is equal to the one of the conventional signal only close to the zero position of the time axis. This is due to the presence of a "geometrical" order among the pulses of the twisted waves that generates the symmetry and anti-symmetry conditions (even and odd components of the signal).

This condition of zero is the direct result of the Hilbert transform characteristics to be the "Cauchy main value" of the integral. In this case, in addition to the sampling clock, it is necessary to add the information on the right order sequence of the twisted wave symbols, i.e., their characteristics to be odd with respect to the Hilbert integration frame. This frame is called Radio Frequency Frame and is independent of the symbol modulation characteristics, but depends only on the Hilbert channel characteristics (i.e., the fact of being an odd signal with respect to a defined axis).

Figure 22:
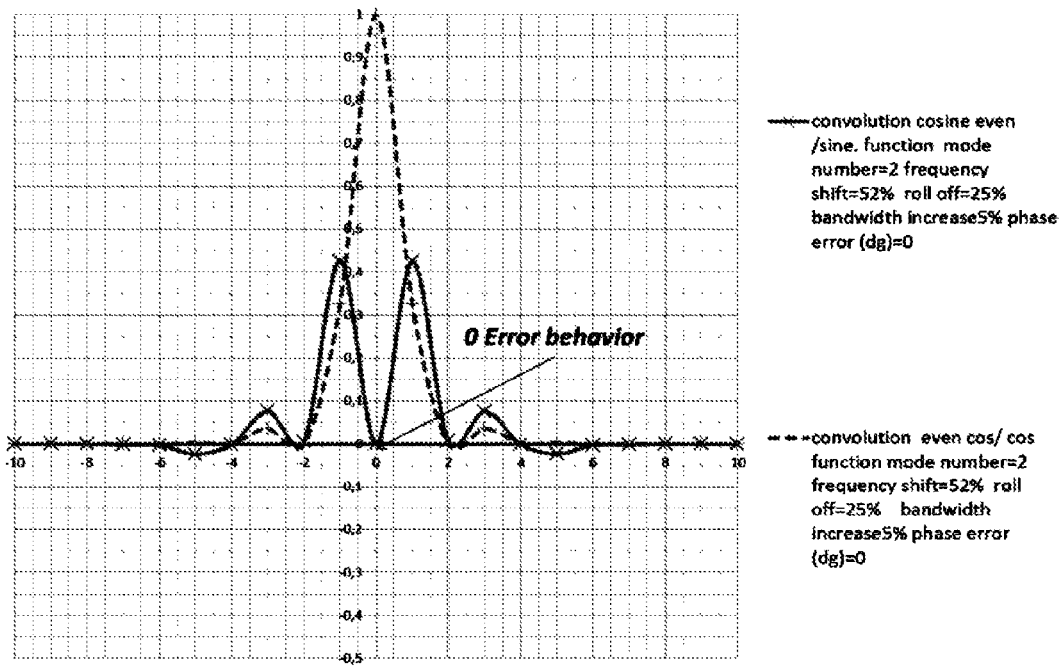

Furthermore, FIG. 22 shows an example of convolution between a twisted wave signal (with twisted modes up to n=±2) and a sampling clock function with a phase error of zero degrees.

The above implies that the search of the minimum can be conveniently organized taking into account the possible sequences, which are obtainable from the received signal.

As previously described, the output of the receiving filter is sampled periodically with the symbol rate and at the precise sampling times. This periodic sampling can be implemented by generating at the receiver a clock signal extracted directly from the received signal. This process is called symbol synchronization or time recovery. In order to optimize the transmitted power, the basic idea is that of exploiting the symmetry characteristics of the matched filter.

According to an aspect of the present invention early-late synchronization has been selected for symbol synchronization (i.e., for symbol clock recovery).

Figure 23:
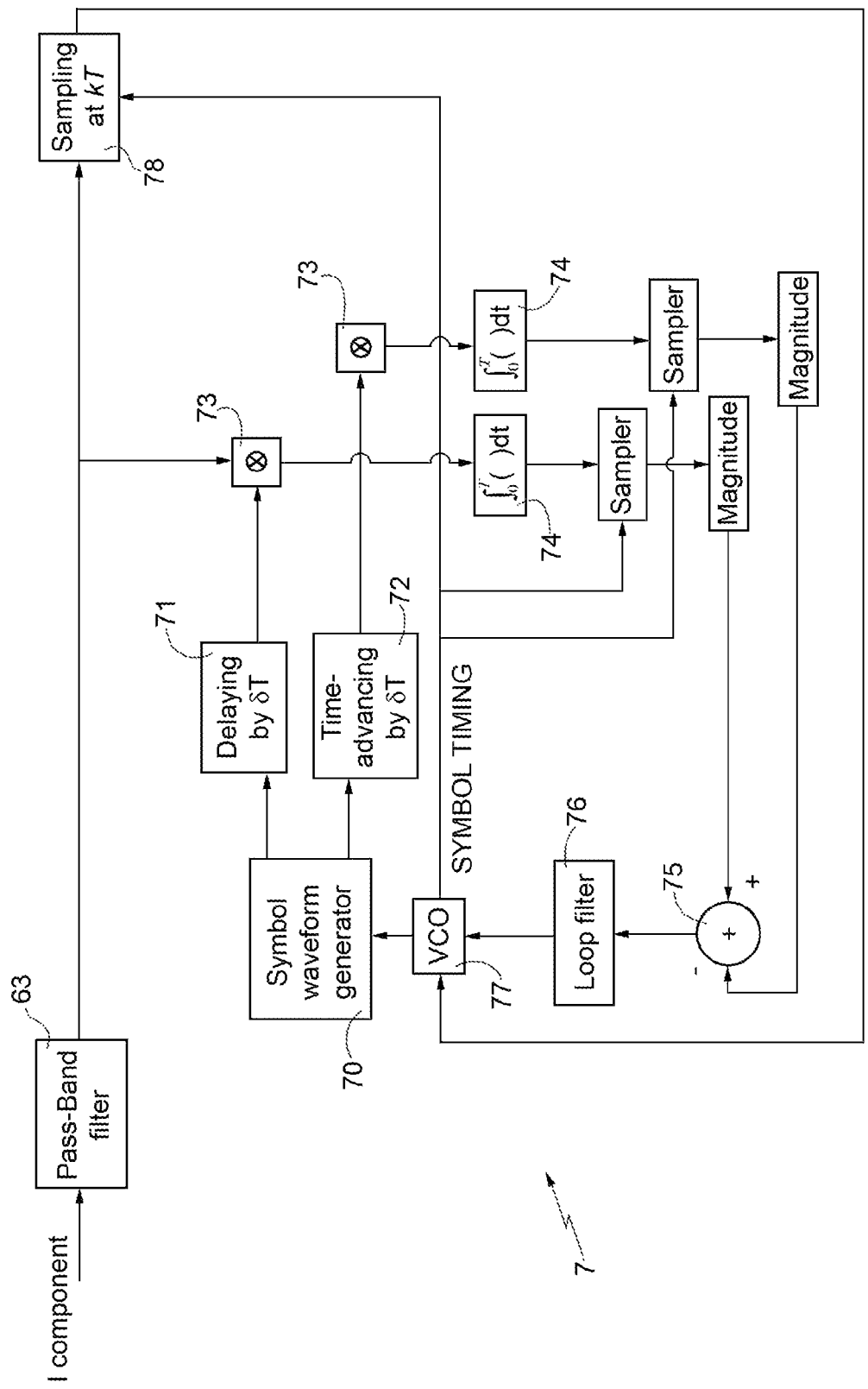
FIG. 23 schematically illustrates an early-late synchronizer for symbol clock recovery according to an embodiment of the present invention.

In this respect, FIG. 23 shows a functional block diagram of an early-late synchronizer 7 for symbol clock recovery according to an embodiment of the present invention. In particular FIG. 23, for the sake of illustration simplicity, relates only to early-late symbol synchronization applied to the in-phase component I, while it remains understood that the procedure implemented by the early-late synchronizer 7 and based on the in-phase component I (which procedure will be described in detail in the following) can be applied also to the quadrature component Q in order to obtain a better estimation of the sampling clock. Moreover, in connection with FIG. 23, it is important to draw the attention to the fact that the functional block diagram shown in FIG. 23 is directly and unambiguously understandable for a skilled person. Therefore, in order not to render the present description needlessly expatiatory, in the following some features and components shown in FIG. 23 will not be described since they are, as previously said, directly and unambiguously understandable for a skilled person.

In detail, as shown in FIG. 23, the early-late synchronizer 7 includes a symbol waveform generator 70 producing, in use, symbol timing waves, which are time-advanced and delayed by a quantity δT (blocks 71 and 72 shown in FIG. 23). These time-advanced and delayed signals are multiplied (blocks 73 shown in FIG. 23) by the in-phase component I (conveniently previously filtered by a band-pass filter, for example the band-pass filter 63 of the Costas Loop shown in FIG. 16 and previously described) and then integrated over a time period T (blocks 74 shown in FIG. 23). From the difference (block 75 shown in FIG. 23) between the two integrated signals it is obtained (through a Loop Filter (LF) 76) a signal for driving a Voltage-Controlled Oscillator (VCO) 77. Said VCO 77 receives, as input, also the in-phase component I (previously filtered by the band-pass filter 63) sampled with a given sampling rate (block 78 shown in FIG. 23), and provides an output symbol timing signal which is used to control the symbol waveform generator 70 and the sampling of the filtered in-phase component (block 78 shown in FIG. 23).

Figure 24:
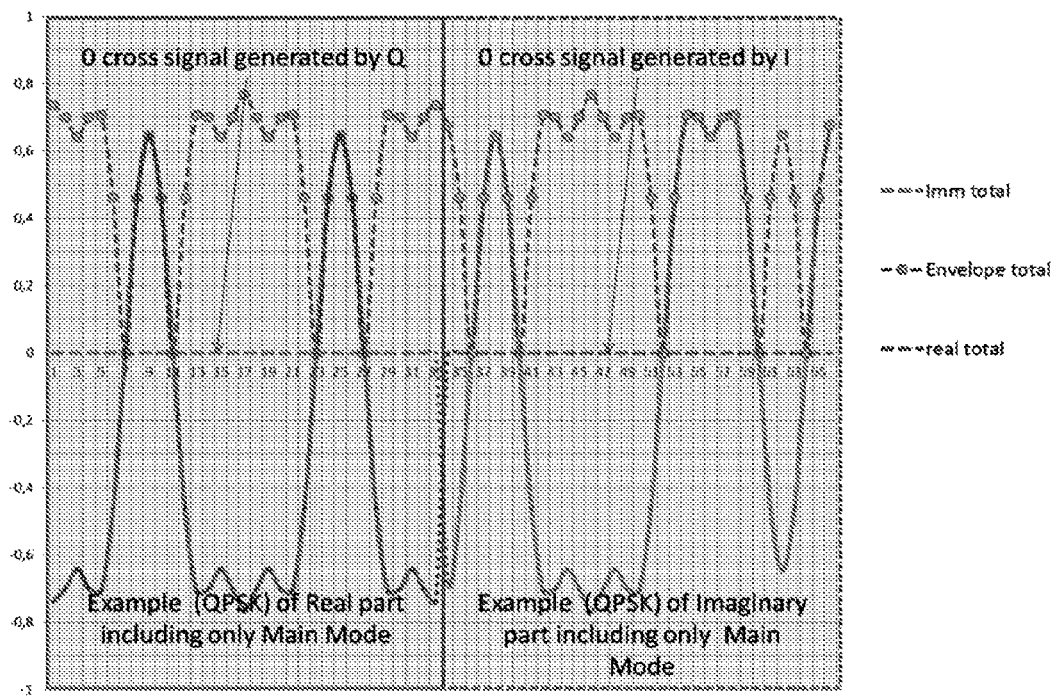
FIG. 24 shows an example of clock recovery performed by the early-late synchronizer of FIG. 23 on in-phase and quadrature components including only time main mode.

In this way it is possible to obtain a timing on both the components I and Q (which represents two independent flows that are, anyway, linked by the common generation at the transmission side). In this respect, FIG. 24 shows an example of these two flows (assuming that only the main mode is present). From FIG. 24 it is evident that, if correct sampling is performed, each one of the two signals produces a zero cross signal on the other one.

The correct timing is the result of the carrier recovery and the correct clock timing.

For each sampling time the result on the cross component is zero.

Figure 25:
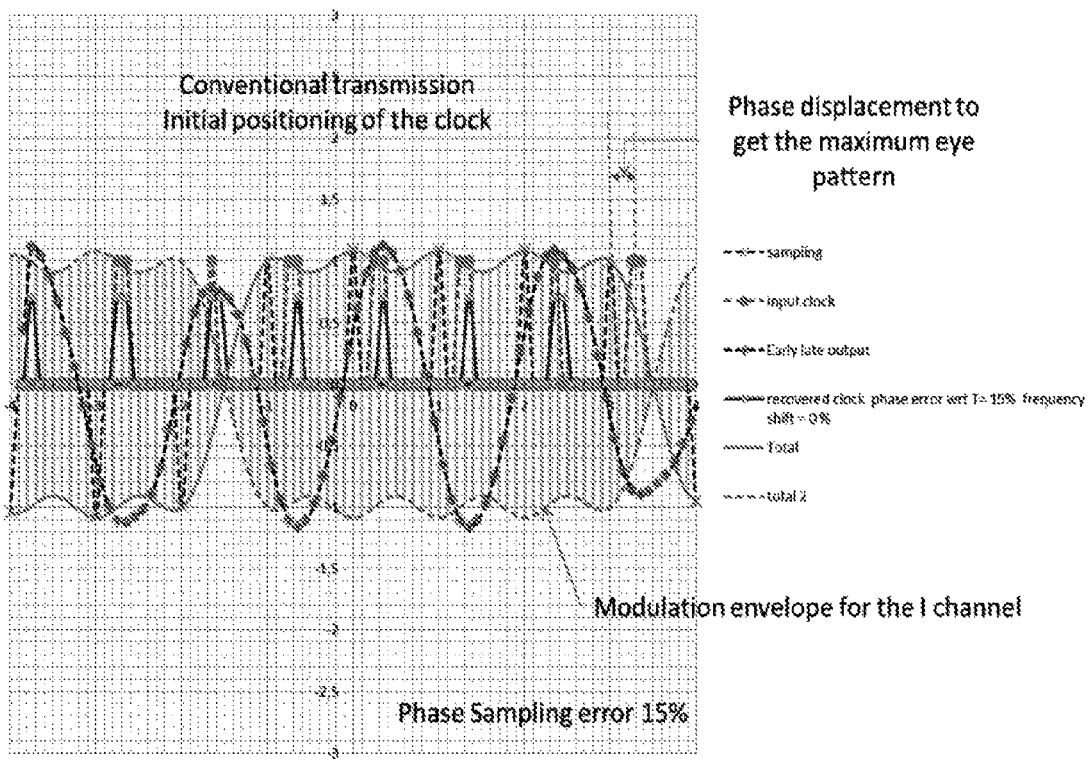
FIGS. 25 and 26 show examples of an output clock produced by the early-late synchronizer of FIG. 23 (assuming that only the main mode is present) along with corresponding transmission sampling times.

An example of the output clock initially generated by the early-late synchronizer 7 is shown in FIG. 25 (again assuming that only the main mode is present), where it is presented also the transmission sampling times, and the phase displacement to get the maximum signal value based on the Eye pattern.

Figure 26:
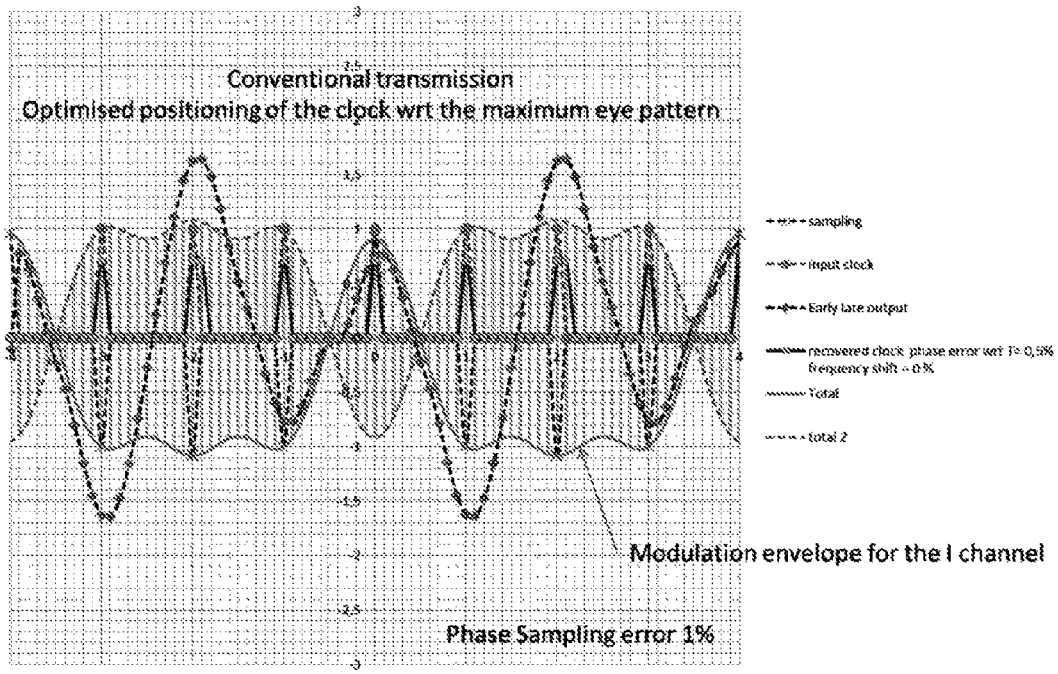

Assuming a residual phase error of the order of 0.5% corresponding to a phase quantization of ¹⁄₁₀₀, the final tracking situation is shown in FIG. 26. In this case the maxima are positioned exactly at the transmission sampling times. Therefore it is rather simple to get the correct timing positioning for each symbol time period.

The above condition corresponds to the absence of the contribution generated by the Hilbert channel. As a consequence there is no need of a multiple symbol RF frame to optimize the final sampling value.

Most of the current early-late synchronization devices exploit digital Phase-Locked Loops (DPLL) due to an easier implementation and a smaller cost with respect to analogical ones. Therefore, according to a different embodiment of the present invention, an early-late synchronizer based on a DPLL is used for symbol synchronization (i.e., for symbol clock recovery).

Figure 27:
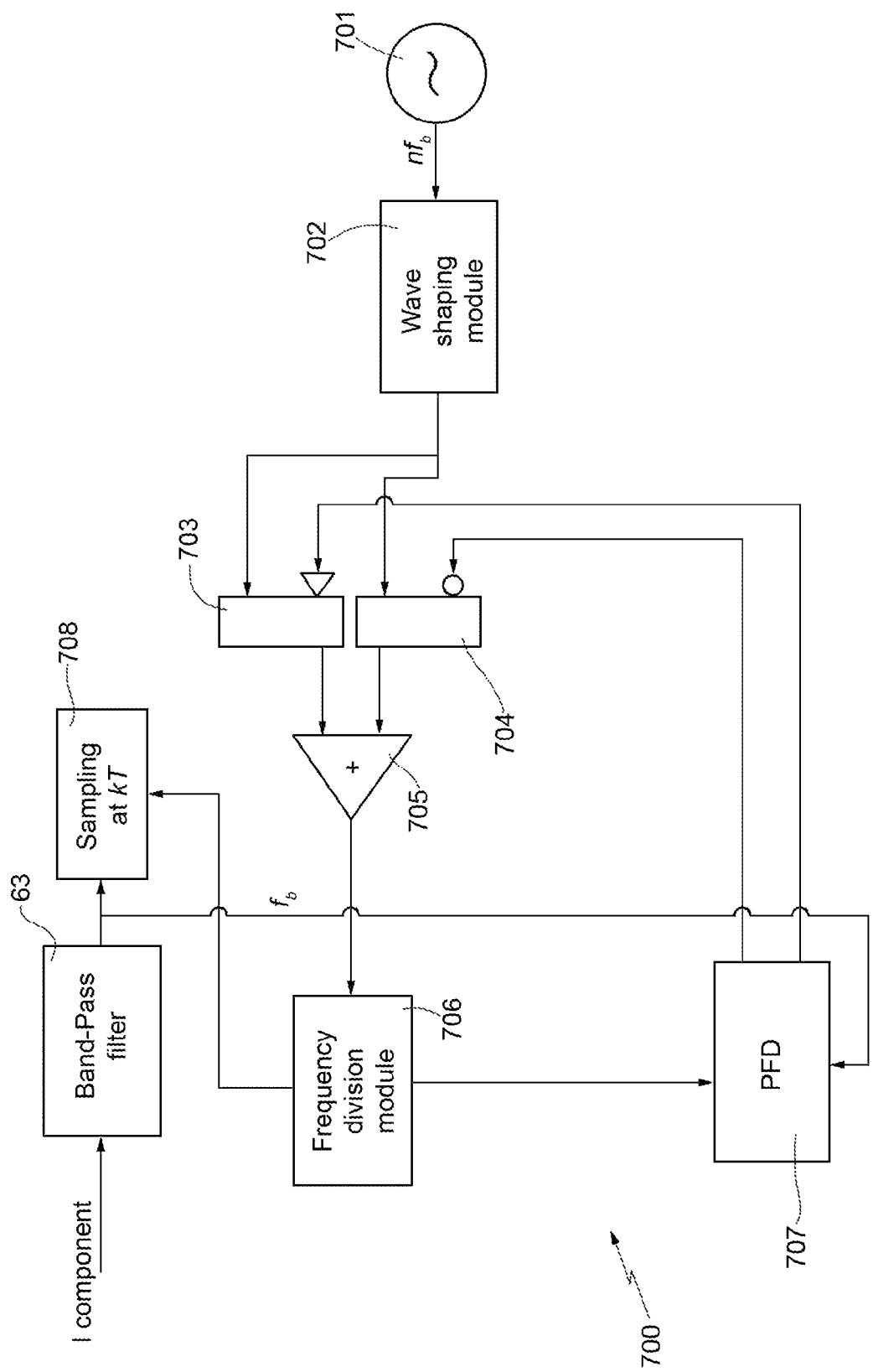
FIG. 27 schematically illustrates a further early-late synchronizer for symbol clock recovery according to a different embodiment of the present invention.

In this respect, FIG. 27 shows a functional block diagram of an early-late synchronizer 700 for symbol clock recovery according to said different embodiment of the present invention. In particular FIG. 27, for the sake of illustration simplicity, relates only to early-late symbol synchronization applied to the in-phase component I, while it remains understood that the procedure implemented by the early-late synchronizer 700 and based on the in-phase component I can be applied also to the quadrature component Q in order to obtain a better estimation of the sampling clock (as in the case of the early-late synchronizer 7). Moreover, in connection with FIG. 27, it is important to draw the attention to the fact that the functional block diagram shown in FIG. 27 is directly and unambiguously understandable for a skilled person. Therefore, in order not to render the present description needlessly expatiatory, in the following some features and components shown in FIG. 27 will not be described since they are, as previously said, directly and unambiguously understandable for a skilled person.

In detail, as shown in FIG. 27, the early-late synchronizer 700 includes:

a pulse generator 701;

a wave shaping module 702 coupled with the pulse generator 701 to receive therefrom the generated pulses and operable to shape the received pulses;

a time-advancing module 703 coupled with the wave shaping module 702 and operable to time-advance the shaped pulses received from the latter;

a delaying module 704 coupled with the wave shaping module 702 and operable to delay the shaped pulses received from the latter;

a counter (or adder) 705 coupled with the time-advancing module 703 and the delaying module 704 and operable to provide an output signal indicating a number of (or a sum of) the time-advanced and delayed pulses received, respectively, from said time-advancing module 703 and from said delaying module 704;

a frequency division module 706 coupled with the counter 705 to receive its output signal and operable to provides a symbol timing output on the basis of the output signal received from the counter 705; and a Phase-Frequency Detector (PFD) 707, which is designed to receive the symbol timing output from the frequency division module 706 and also the in-phase component I (conveniently previously filtered by a band-pass filter, for example the band-pass filter 63 of the Costas Loop shown in FIG. 16 and previously described), and which is operable to control the time-advancing module 703 and the delaying module 704 on the basis of the filtered in-phase component received and of the symbol timing output received from the frequency division module 706.

Moreover, the frequency division module 706 is operable to control the sampling of the filtered in-phase component (block 708 shown in FIG. 27).

The main difference with respect to the analogical early-late synchronizer 7 is that the operation of the early-late synchronizer 700 is based on the counted number of pulses, between the input signal and the reference one. Therefore, the phase error depends on the possibility of modifying the signal phase of a minimum quantity, said phase error being given by $$\varphi_e = \frac{2\pi}{n},$$

or, in terms of symbol period, $$\tau_e = \frac{T_b}{n},$$

where n denotes the number of phase steps.

The performance of the early-late synchronizer 700 mainly depends on this quantization parameter n. The minimum achievable error clearly depends on the quantization error, but also the synchronization building time.

The error with respect to the quantization value is given by $\tau_e/2$.

The synchronization building time is given by:

$$t_s = nT_b.$$

In order to keep the wished holding time $t_c$ it is convenient to keep:

$$n \le t_c f_b k \approx k \frac{t_c}{T_b},$$

where k depends on S/N and $f_b/2n$ is the maximum oscillator stability.

For the scope of this simplified analysis it is possible to consider an analogical PLL taking into account that Q and n have a very similar effect.

Figure 28:
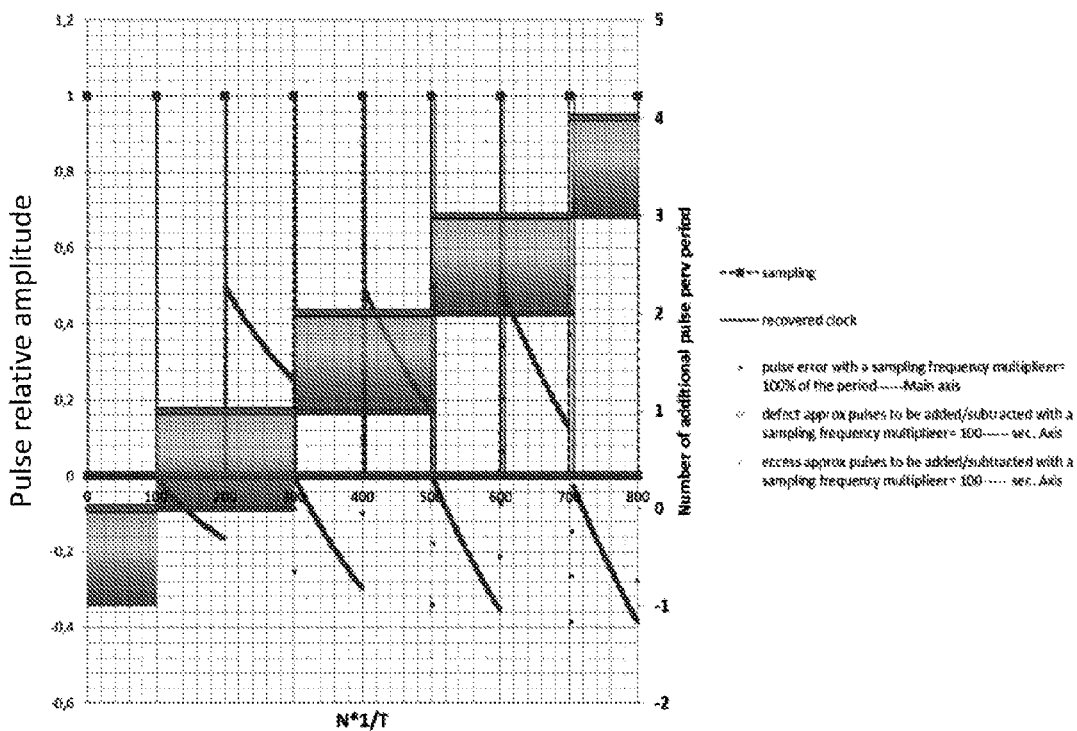
FIG. 28 shows a typical quantization error of a digital Phased-Locked Loop (PLL)

FIG. 28 shows an example of the typical error assuming 100 steps quantization in a symbol period and a negligible thermal noise.

Figure 29:
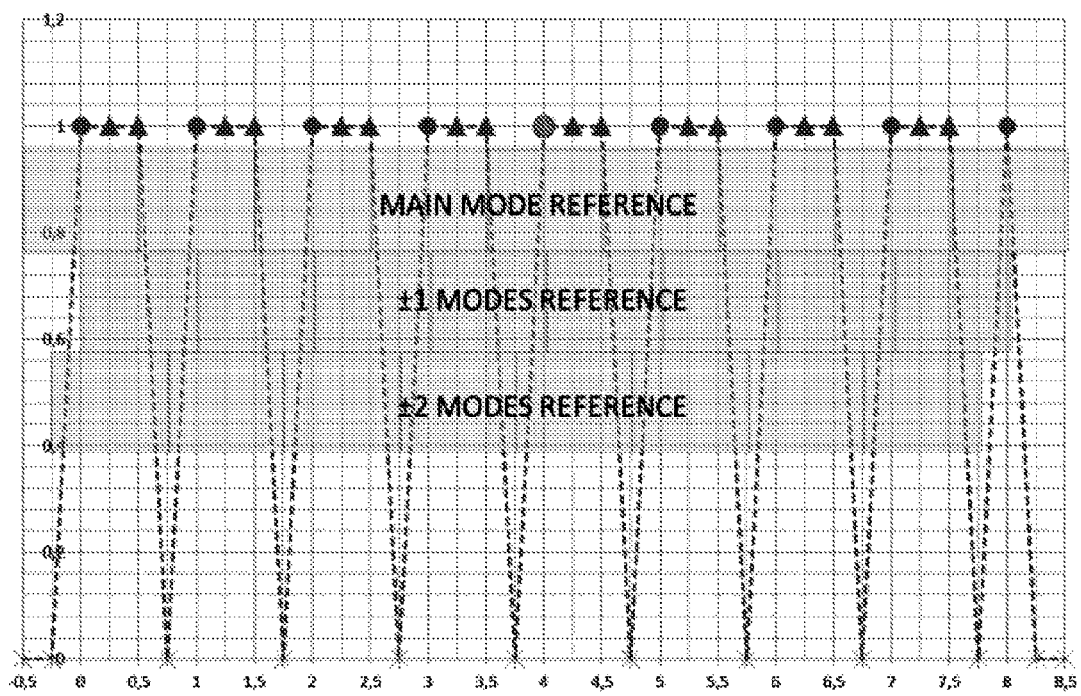
FIG. 29 shows an example of multidimensional time geometry arising from the use of time modes up to N=±2.

The early-late technique can be used also for twisted wave signals, but it has to be considered the presence of a non-zero cross component generated by the presence of twisted modes. It is, thence, convenient an additional information on the "geometry" of the Pulse frame structure. In this respect, FIG. 29 shows a simplified representation of the multidimensional time space arising from the use of modes up to N=±2. The RF frame is characterized by three axes:
- the first one represents the time main mode with independent pulses;
- the second one represents the first time twisted mode structure, where each set of four pulses carries one and the same information symbol (twisted modes 1 and −1); and
- the third one represents the second time twisted mode structure, where each set of eight pulses carries one and the same information symbol (twisted modes 2 and −2).

Figure 30:
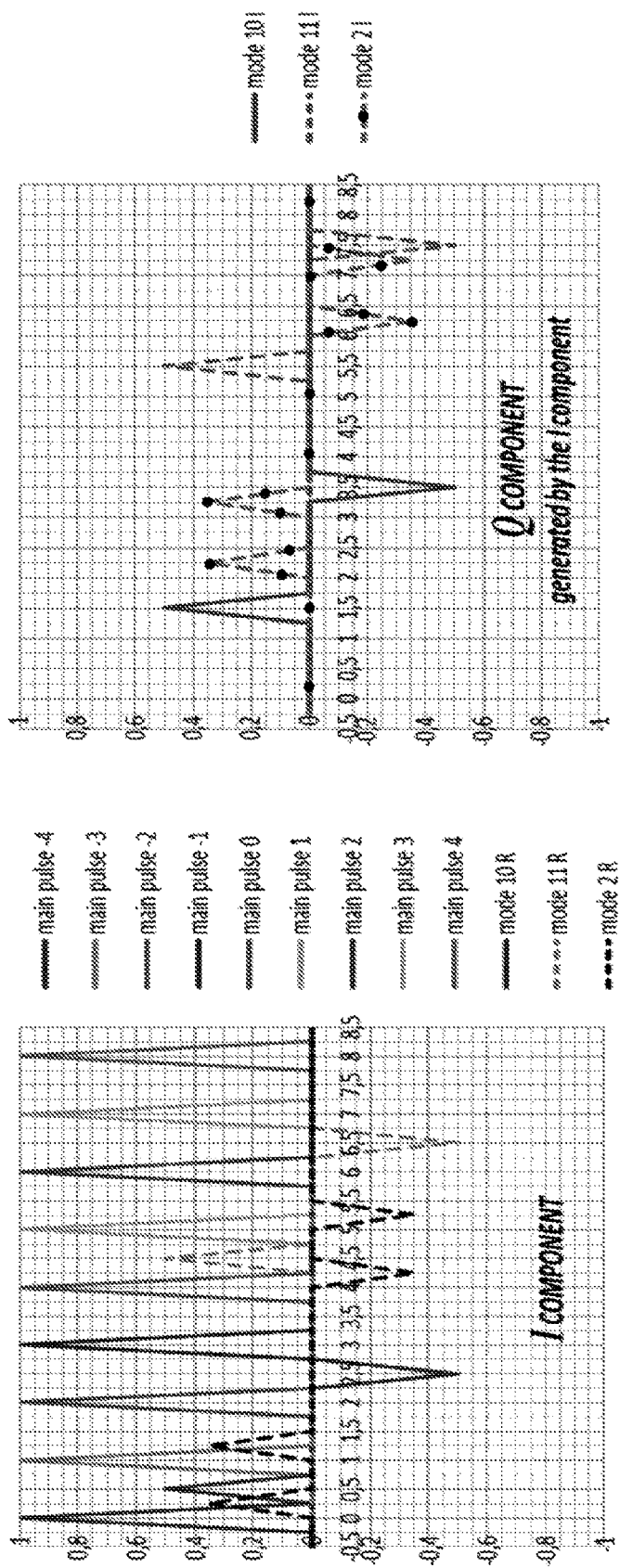
FIG. 30 shows rules for arranging symbols on different time modes.

FIG. 30 shows the rules for arranging the symbols on the different dimensions, namely the different modes, i.e., time main mode 0 (for which each pulse corresponds to, i.e., carries, an independent symbol), time twisted mode +1 (for which each symbol corresponds to, i.e., is carried by, a set of four pulses—time twisted mode −1 being omitted for the sake of illustration clarity), and time twisted mode +2 (for which each symbol corresponds to, i.e., is carried by, a set of eight pulses—time twisted mode −2 being omitted for the sake of illustration clarity).

It is important to note that no hypothesis has been made on the symbol modulation characteristics, but only on the geometrical characteristics of the channel. This implies that for recovery and tracking process there is no need of passing through the generalized matched filter.

The early-late technique is essentially a convolution feature of the symbol shape filter and the integration over a symbol time does not take into account the type of the signal present in the symbol time.

Figure 31:
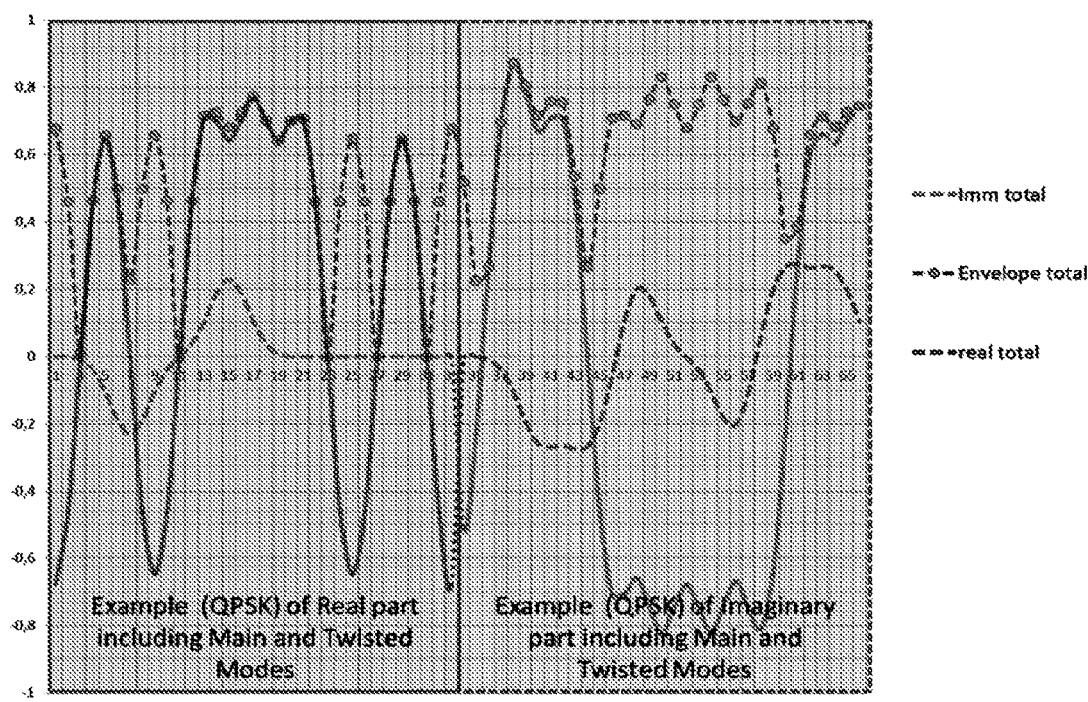
FIG. 31 shows an example of clock recovery performed by using early-late technique in presence of time modes up to N=±2.

FIG. 31 shows an example of clock recovery performed by using the early-late technique assuming the presence of time modes up to N=±2 and a correct sampling for each symbol, i.e., assuming that the sequence is forming what it has been defined as a "RF frame".

The characteristic is that, by integrating the symbol sequence, the "odd" components of each frame give a zero contribution, while the "even" components give a non-zero contribution, due to the presence of an odd number of even pulses for each sequence.

By using the early-late technique, it is therefore possible to derive a pulse sequence for the main sampling clock, but it is not possible to optimize the phasing of the clock itself, because it is not sufficient to align a single pulse timing, but the full RF frame with the proper phasing. In particular, it is not valid that the maximum of each sample on the channel I corresponds to the minimum of the channel Q. This effect is the consequence of the fact that the odd component of the cosine analytical carrier produces a non-zero result when detected by the sine carrier and vice versa. The zero value is obtained only when the full RF frame is considered.

Taking into consideration one of the output signals (component I or Q) of the Costas Loop, which recovers the frequency and the phase of the twisted wave signal without additional problems (the only aspect to be considered is that the I and Q components are not directly related to the modulated symbols), this output signal is delivered to an early-late system.

There is no knowledge at the receiver about the position in time of the RF frame but it is known its length in terms of the number of symbols composing the RF frame itself.

Assuming, for the sake of simplicity, that the twisted modes ±1 and ±2 are present in addition to the main mode, the time length of the RF frame is at least 9T (recalling that T is the symbol period).

Figure 32:
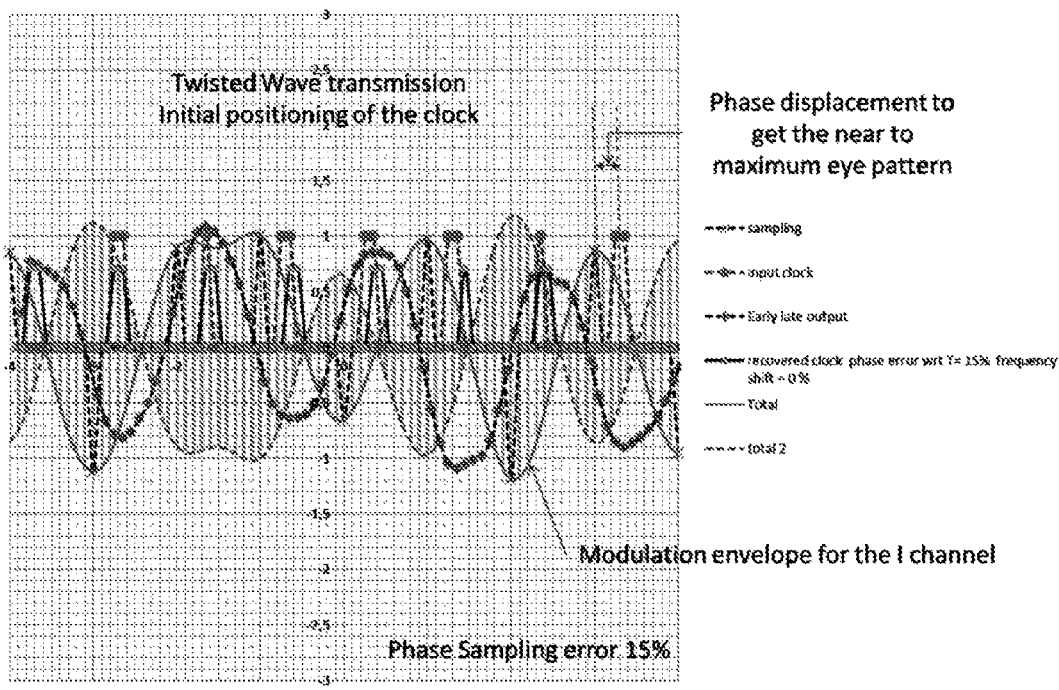
FIG. 32 shows an example of a clock recovered by using the early-late technique (assuming that main mode and twisted modes ±1 e ±2 are present) along with the transmission clock and the initial error.

In this respect, FIG. 32 shows an example of the clock recovered by using the early-late technique along with the transmission clock and the initial error.

Figure 33:
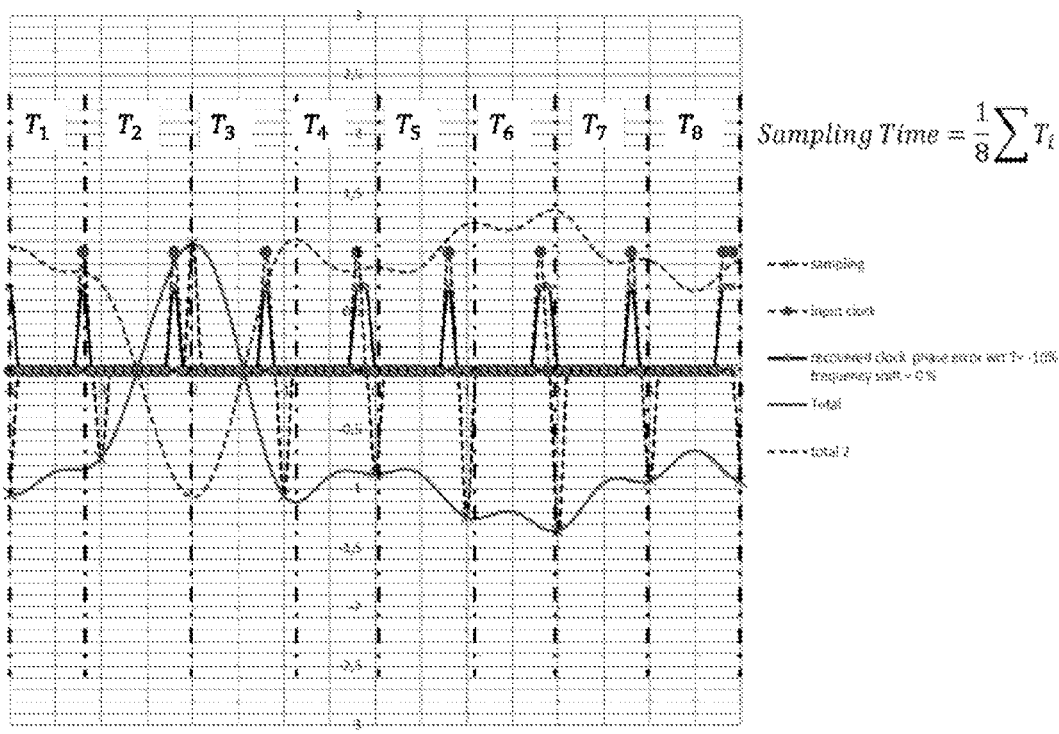
FIG. 33 shows an example of computation of an averaged clock position in the time space of an RF frame.

The search for the maximum brings to a result, where the position of the sampling pulses on the maxima does not coincide with the transmission pulse position, but averaging in the sequence. When the RF frame is phased, there result exactly the pulse positions, starting from the last, which has the maximum coincident with the pulse position; there are no twisted mode pulses in the last symbol period (in this respect see the time geometry shown in FIGS. 29 and 30). If the position of the RF frame is not achieved the procedure can be the same with an additional phase error on the pulses. FIG. 33 shows the principle of the averaging procedure.

Figure 34:
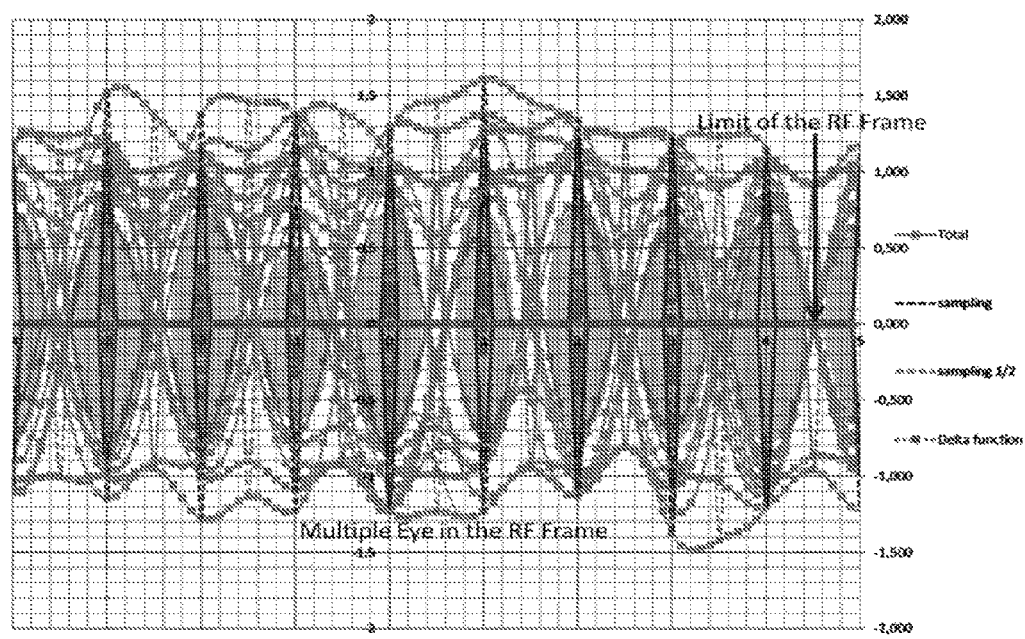
FIG. 34 shows an example of multiple eye diagram (or pattern) usable to look for the best averaged sampling time.

In general, assuming that there are 9 main mode pulses associated with the RF frame, it can be useful to take into account a multiple "eye" procedure in order to look for the best averaged sampling time, as shown in FIG. 34.

The advantage of using such a procedure is given by the possibility of identifying the positions of the initial and final ends of an RF frame (in this case comprising 9 main mode pulses), where, due to the absence of higher order mode pulses (i.e., twisted mode pulses), the crossing of the zero happen always at the same position.

Figure 35:
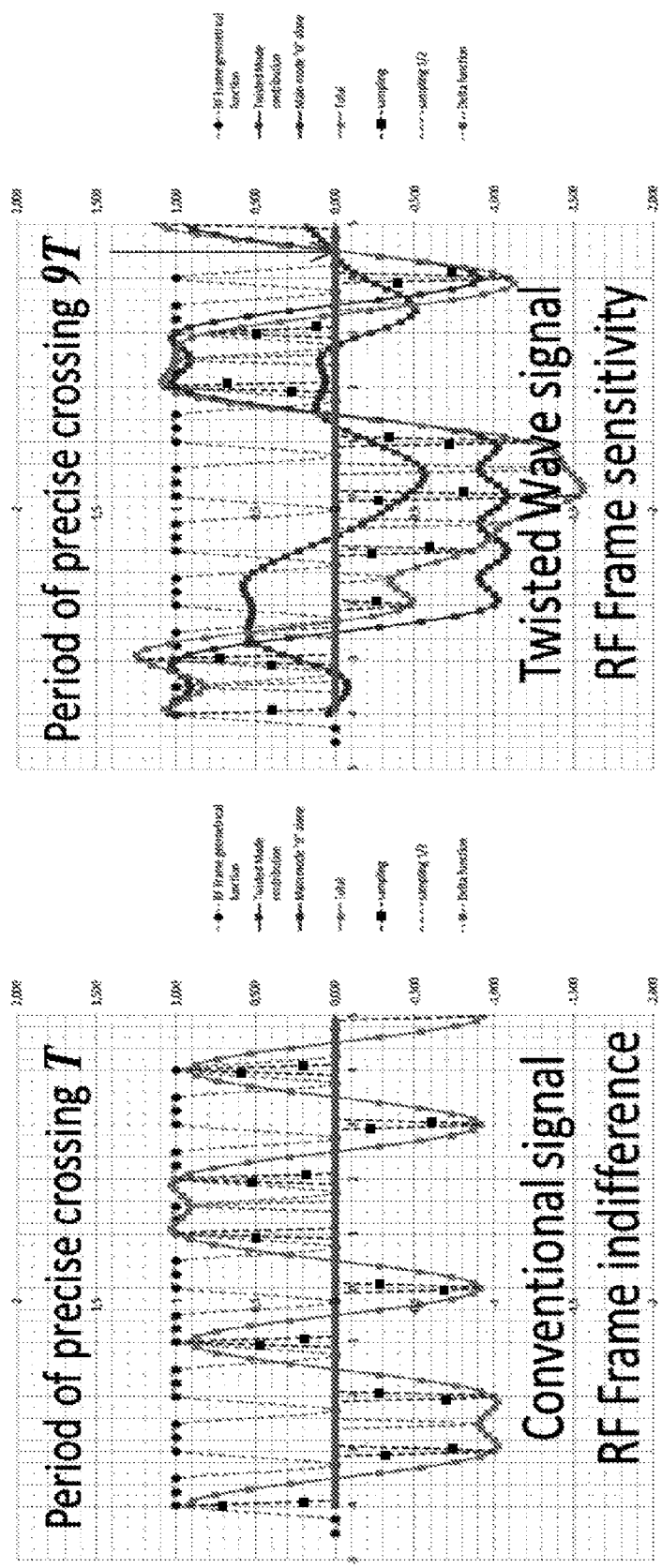
FIG. 35 shows zero-crossing pattern for twisted mode and main mode signals.

For conventional signals (i.e., main mode signals) the property of crossing the zero at the same position is given by any type of modulation having zero as averaged value (either Phase-Shift Keying (PSK) or Amplitude and Phase-Shift Keying (APSK)). In this respect, FIG. 35 shows a QPSK case, where the crossing of the zero is always at $(2k+1)T/2$, while in the case of a twisted wave signal the crossing is shifted by the presence of the twisted modes, but with the average value of the shift equal to zero, in a time window having the RF frame length and starting at the beginning of the RF frame.

In consideration of the transmission nature of the additional channel, which has been added to the conventional one, it is convenient to introduce no specific need on the digital signal for recovering and tracking the RF frame. This frame related to the correct Space Time Geometry will be called as "STG RF Frame".

Let's consider that the clock position has been defined with the procedure previously explained. An additional residual error is, anyway, present due to the fact that the last 9 symbol sequence is not the last of the RF frame. This error will be anyway small enough to enable the procedure described in the following and the final fine tuning to be carried out.

The key aspect for fine tuning is the choice of the functions for convolution (sampling the signal at kT). In fact, the simple sampling (ideally using a pulse function at the rate 1/T) cannot be used as in the conventional case. This can be used only when the transmission channel is the conventional one, but it does not consider any information on the Hilbert channel (odd channel). In order to consider the component related to the Hilbert channel, it is convenient to introduce, at the reception side, a pulse function at twice the rate 1/T (i.e., equal to 2/T), with the even samples arranged at 2kT/2 and the odd samples at (2k+1)T/2. This choice is justified by the fact that the Hilbert transform of a pulse is a double-pulse function.

Due to the fact that the pulses are mixed along the RF frame the procedure can be used to determine the exact position of the RF frame, but not to detect the value of the twisted-wave-transmitted symbols (for this scope the generalized matched filter is used).

The RF frame is characterized by having two positions along the time axis which have the minimum variation in power due to the absence of twisted modes in the first and last symbol time slots of each sequence corresponding to the RF frame.

It is clear that the sequence realization should be statistically meaningful (or, equivalently, should be properly filtered) to obtain an estimation of the RF frame synchronization with a low error on the detection probability.

Figure 36:
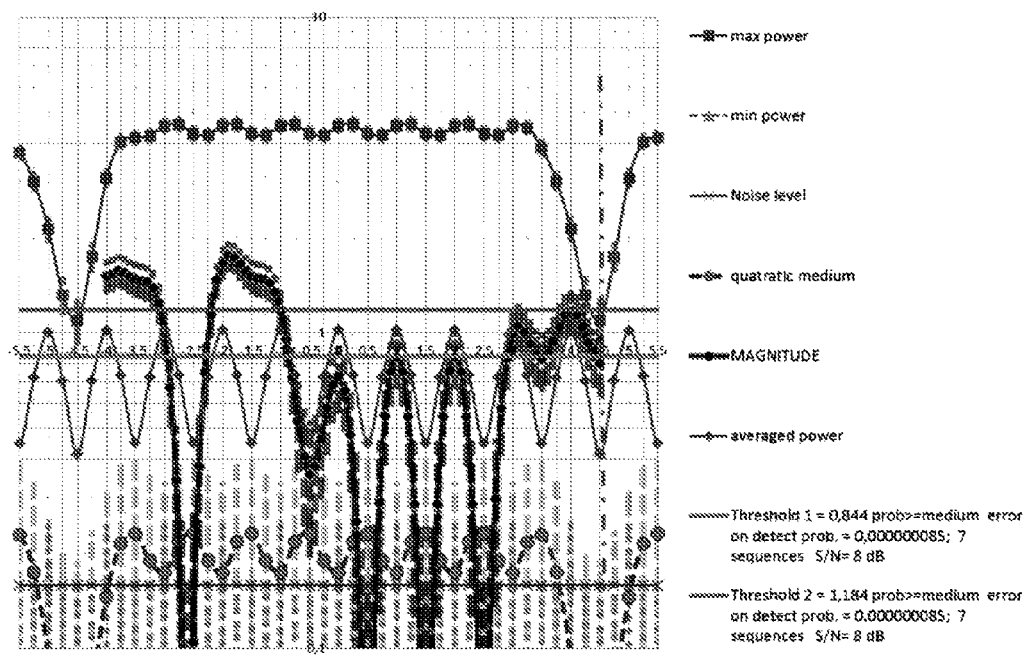
FIG. 36 shows an example of RF frame, thermal noise and of two thresholds for detecting RF frame boundaries according to an aspect of the present invention.

By considering a first threshold defining the maximum value of the sequence at the RF frame boundaries, a second threshold identifying the statistical overcrossing of the sequence in the other time points and the thermal noise, the error probability can be derived. In this respect, FIG. 36 shows an example of RF frame, thermal noise and of the two thresholds for detecting the RF frame boundaries.

In particular, taking into consideration a plurality of statistically independent sequences, the probability of not satisfying the threshold conditions at least once is given by the product of the probabilities of the single events.

The use of the early-late methodology based on the maxima optimization allows to derive a first synchronization clock, with a residual error. For the sake of simplicity, also an equivalent phase error per symbol time duration can be assumed.

Figure 37:
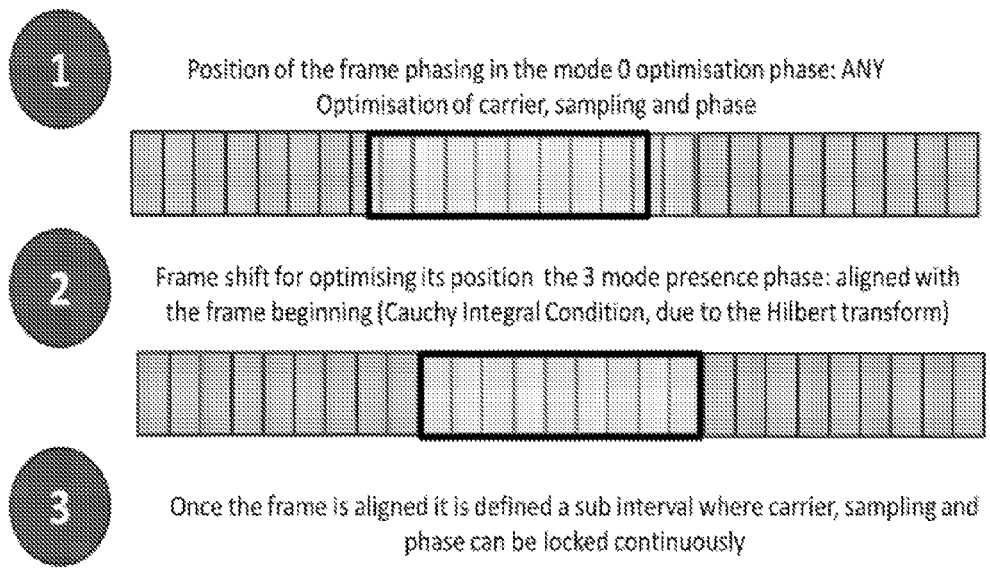
FIG. 37 schematically illustrates a logical procedure for detecting an RF frame according to an aspect of the present invention.

FIG. 37 schematically illustrates a logical procedure for detecting an RF frame according to an aspect of the present invention. In particular, the procedure shown in FIG. 37 comprises shifting a time window corresponding to the RF frame to identify the correct RF frame position. In detail, FIG. 37 shows:
  a first position of the time window in the mode 0 optimization phase; and
  a second position of the time window in the higher-mode or twisted mode optimization phase, wherein the time window is correctly aligned with the frame beginning by exploiting the information obtained by means of the aforesaid early-late methodology based on the maxima optimization (and thanks to the Cauchy Integral Condition due to the Hilbert transform).

Once, the frame is aligned, it is defined a sub-interval where carrier, sampling and phase can be locked continuously.

Taking into consideration a period larger than 9 symbols, the samples using at least a step of T/4 identify the position of the time window corresponding to the RF frame, moving from the aforesaid first position to the aforesaid second position (as shown in FIG. 37).

The procedure is then based on the selection of the right time window looking for the threshold identification corresponding to the aforesaid second position shown in FIG. 37.

The transmission channel is assumed to have a Gaussian thermal noise level. The symbols corresponding to the main mode (or conventional) signal are assumed to be modulated according to either a PSK or an APSK, their mean value being statistically equal to zero. Without loss of generality, in the following discussion a 4-PSK modulation will be considered. If there are no twisted modes, values at sampling times depend only on the number of modulation amplitude levels, while, if twisted modes are present, these values depend also on the possible combination given by the overlapping of the additional twisted modes. The number of values is given by the number of possible combinations with repetition (in case of QPSK this number being given by the well-known binomial formula); the coefficients of the twisted mode values are given by the channel filter feature and by the time shift of each mode. The same principle is applicable to all the other time samples with the exception of the RF frame boundaries for which there is a very limited contribution of the twisted modes (only the symbol tails). Therefore the variation of the values at the RF frame boundaries substantially depends only on the main mode symbol variation, for example, in the QPSK case (either for I or Q channel), on the sum of two adjacent pulses (which is equal to zero if they are opposite, or is about one if they are equal).

Figure 38:
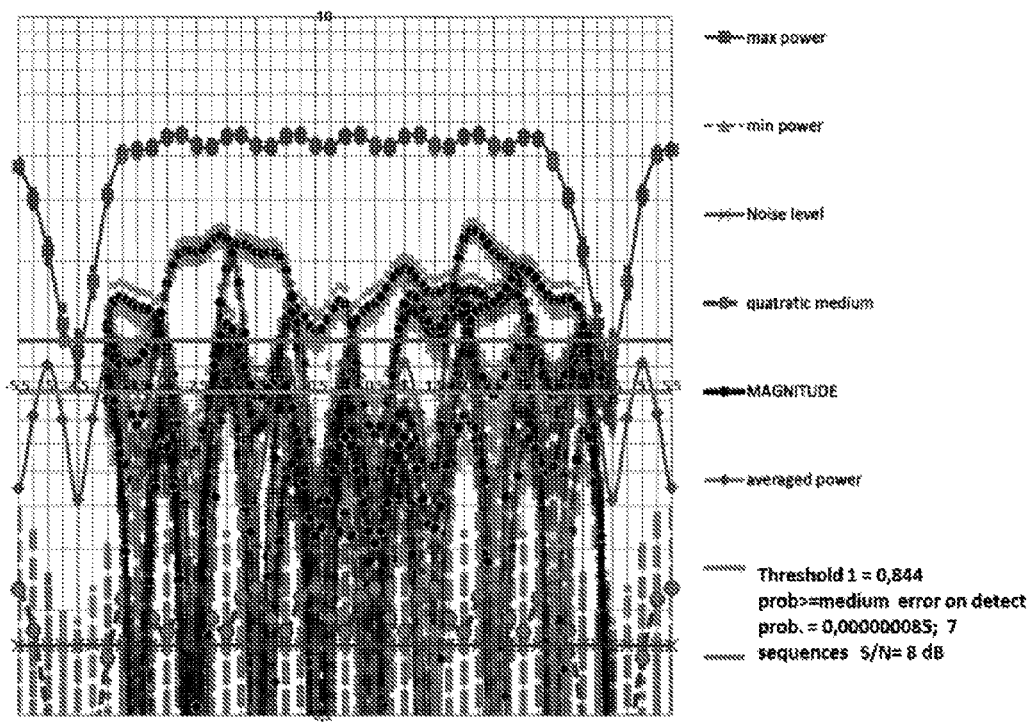
FIG. 38 shows an example of seven overlapped synchronized random sequences for which the RF frame boundaries are correctly detected.

Taking into consideration the power level and without considering the thermal noise, the probability of the maximum to be over one is zero. On the contrary, the probability of not overcrossing the average value of the signal in the other sampled points is lower than 50%. Taking into consideration a reasonable number of sequences, the probability of not identifying the boundaries of the RF frame is close to zero. In this respect, FIG. 38 shows an example of seven overlapped synchronized random sequences for which the RF frame boundaries are correctly detected. Moreover, FIG. 39 shows RF frame synchronization detection error probability computed in accordance with the RF frame synchronization detection procedure previously described.

The detection process is a kind of super eye. In fact, the zero-crossing shifts due to the presence of twisted modes are minimized once the RF synchronization is obtained.

The detection process is substantially a filtering procedure. The thermal noise is, thence, reduced by the filter characteristics. Said detection process can be applied to the components I and Q independently of each other, and their combination improves the detection probability and the detection accuracy.

Figure 39:
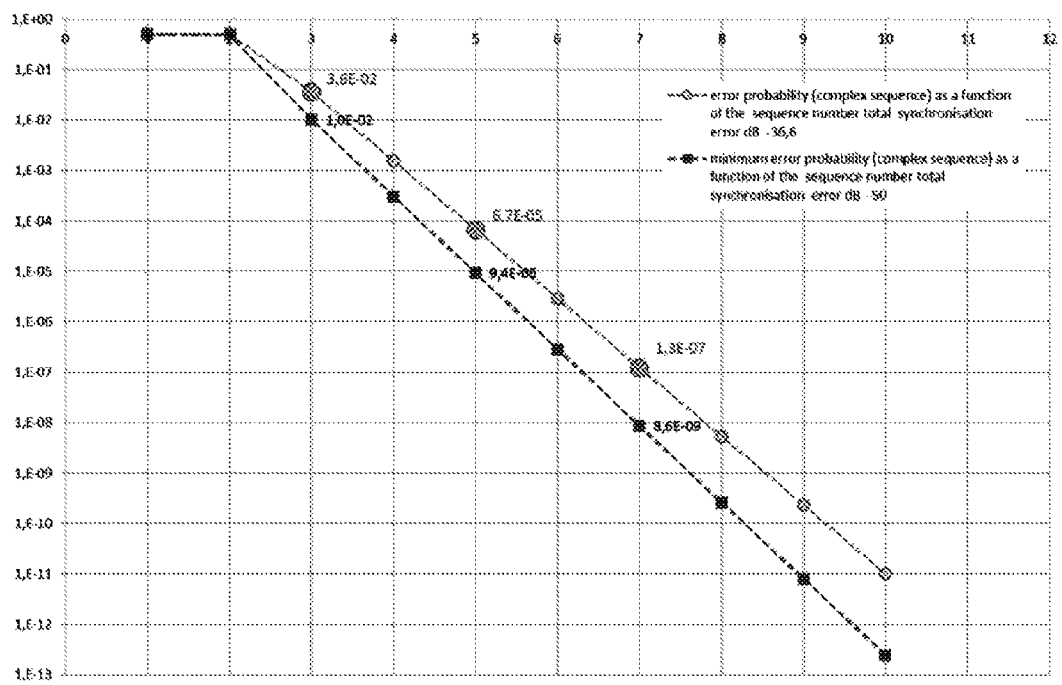
FIG. 39 shows an example of RF frame synchronization detection error probability associated with an RF frame synchronization detection procedure according to an aspect of the present invention.

For the case shown in FIG. 39, the following assumptions have been made: one hundred steps for the sampling clock period quantization and a factor of seven due to the RF frame detection. The overall phase noise is of the order of 50 dBc at the jitter level and 35 dB for the quantization level.

Once the RF frame synchronization is obtained, a fine tuning can be performed in the zone close to the RF frame boundaries with a very good accuracy and with an error lower than 25% of the sampling clock period.

The RF frame synchronization procedure generates an additional clock sequence with a repetition rate of 1/PT (recalling that P denotes the number of symbols carried by the main mode and T denotes the symbol period). This clock sequence is positioned on the time axis at $(mP+\frac{1}{2})T$ (with m=0, 1, 2, . . . ), while the main clock pulses are at kT.

In conclusion, on the assumption that time modes up to ±2 are used, the clocks used, at reception side, to characterize the twisted wave signal are:
  a main clock at kT (with, as previously described, k equal to 0, 1, 2, 3, . . . , 8) obtained by means of early-late procedure;
  a first secondary clock (which can be called as "½ clock" and is related to the twisted modes ±1) at (2k+1)T/2 (with, as previously described, k' equal to 1, 2, 3, . . . , 8) derived from the main clock;

a second secondary clock (which can be called as "¼ clock" and is related to the twisted modes ±2) at (4k'−3)T/4 derived from the main clock; and an RF frame clock derived from the time geometry of the RF frame through the procedure previously described (conveniently, analyzing at least 12 symbols for U times, where U is an average-related parameter having a predefined integer value) and associated with the main clock.

Figure 40:
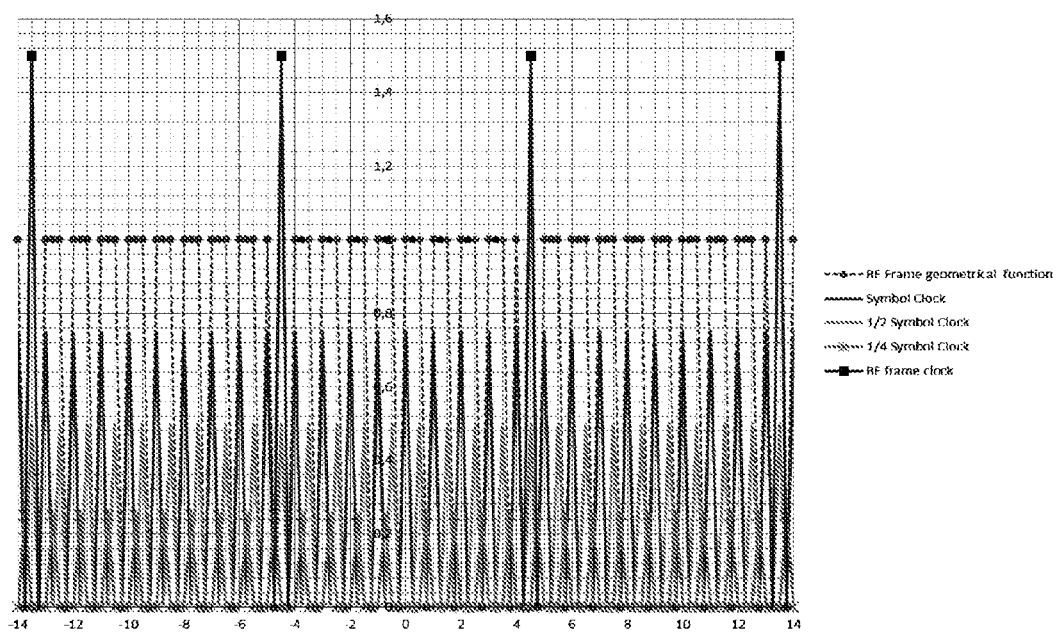
FIG. 40 shows an example of clock hierarchy according to an aspect of the present invention (on the assumption that time modes up to ±2 are used)

In this respect, FIG. 40 shows an example of clock hierarchy on the assumption that time modes up to ±2 are used. It is important to note that the clock hierarchy exists also in the absence of the main mode signal, since it is based on the RF frame geometry structure; therefore the creation of the Hilbert channel is independent of the presence of the main mode (or conventional channel).

This peculiarity is important for the characterization of the Hilbert channel to reject potential interferences present on the channel itself.

Taking into consideration a twisted wave signal, for example its in-phase component I, the total signal is the sum of three components: the real part of the main mode (or conventional) signal, the real part of the higher-order modes (i.e., twisted modes), and the component deriving from the imaginary part of the quadrature component Q due to the twisting mechanism (as, for example, shown in FIG. 31).

By sampling with the clock kT (the main mode pulses) and adding up (i.e., performing a convolution), the contribution due to the quadrature component Q is zero only when the integration is performed between the boundaries of the RF frame. Of course, the quadrature component Q is not practically separable from the in-phase component I, but the result of the convolution is an indicator of the twisted wave performance in case of errors in the synchronization mechanism or the quantization device.

Therefore, by using this function it is possible to determine, in a reasonably simple way, the performance of the twisted wave signal in presence of synchronization errors.

In the following some analyses of the overall I and Q signals will be presented. In this connection, it is worth drawing the attention on the following definitions:
I=X+y, and
Q=Y+x,
where X denotes the total real part deriving from the real part of the main mode (or conventional) signal and the real part of the higher-order modes (i.e., twisted modes);

y denotes the real part generated by the twisting of the higher-order modes (i.e., twisted modes) on the quadrature component Q;

Y denotes the total imaginary part deriving from the imaginary part of the main mode (or conventional) signal and the imaginary part of the higher-order modes (i.e., twisted modes); and x denotes the imaginary part generated by the twisting of the higher-order modes (i.e., twisted modes) on the in-phase component I.

The convolutions usable to derive the twisted wave signal performance are:

for the in-phase component I, XX (=the X component with the sampling function) and yX (=the y component with the sampling function); and, for the quadrature component Q, YY (=the Y component with the sampling function) and xY (=the y component with the sampling function).

Figure 41:
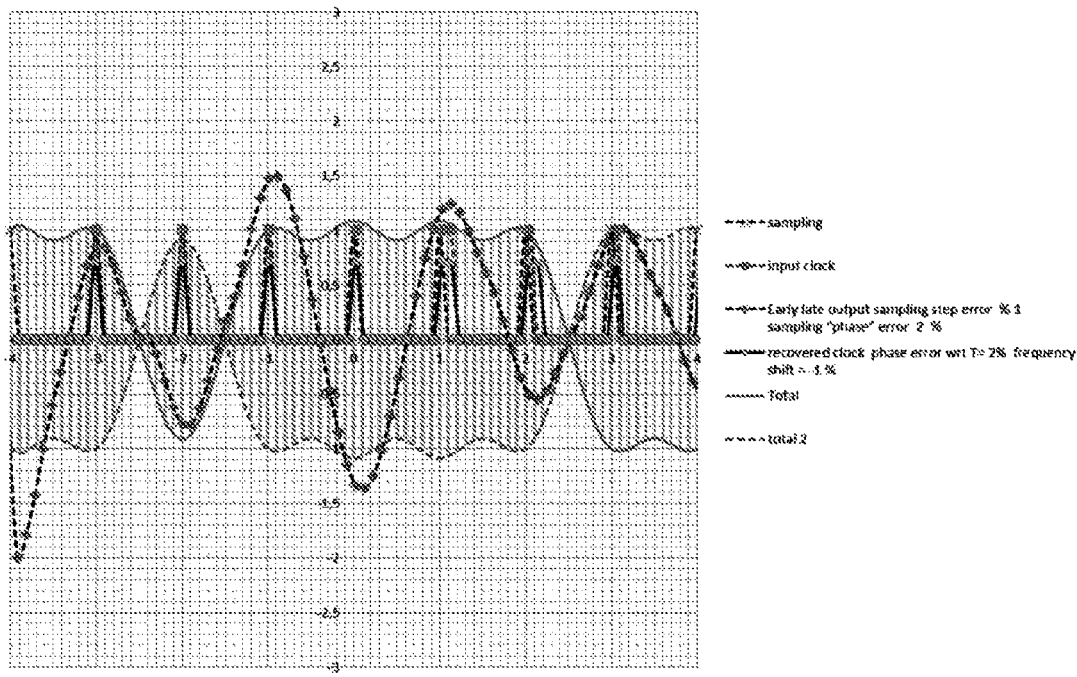
FIG. 41 shows an example of signal envelope (in the case of only nine symbols carried by the main mode) along with the transmission clock and the recovered clock.
Figure 43:
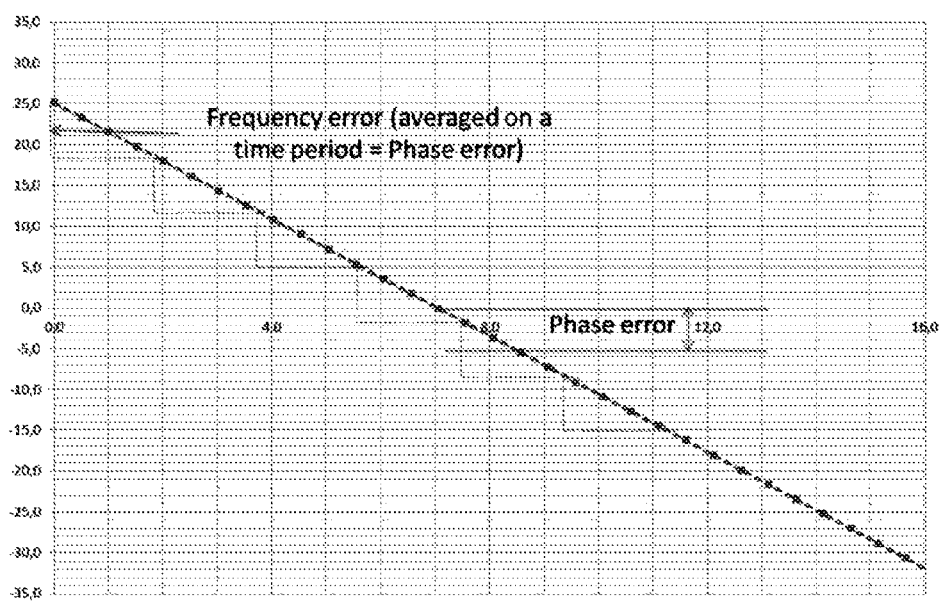
FIGS. 42 and 43 show, respectively, convolution error and corresponding error function related to the example shown in FIG. 41.
Figure 42:
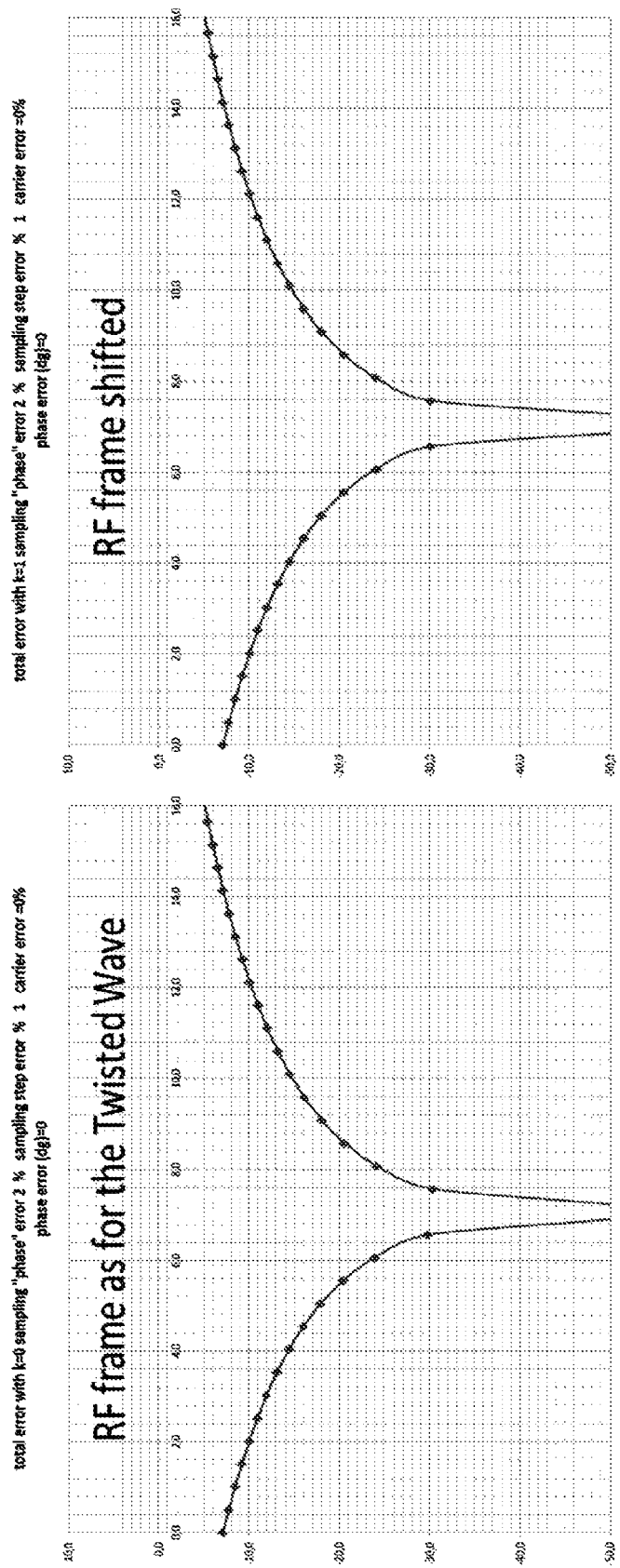

An example of the situation is shown in FIG. 41, which shows an example of signal envelope (in the case of only 9 symbols carried by the main mode) along with the transmission clock and the recovered clock. Moreover, the resulting error (yX convolution function) is shown in FIG. 42 for two different positions of the RF frame; from FIG. 42 it can be noted that the error does not change due to the absence of the twisted wave signal, from which it is inferred that convolution error for conventional (or main mode) signal is independent of the RF frame geometry. Additionally, FIG. 43 shows the corresponding error function.

The error function goes to zero, when the position of the transmission sampling and the one recovered at reception side coincide.

Therefore the technique proposed for twisted wave signal can be adopted without differences in the case of conventional signals.

The use of the early-late methodology based on the maxima optimization enables the synchronization clock to be derived with a residual error. For the sake of simplicity, an equivalent phase error per symbol time duration can be assumed.

The convolution, integrated within a period equal to 9 symbols, which does not respect the time geometry with yX≠0, will generate a residual error depending on the RF frame bad synchronization.

Figure 44:
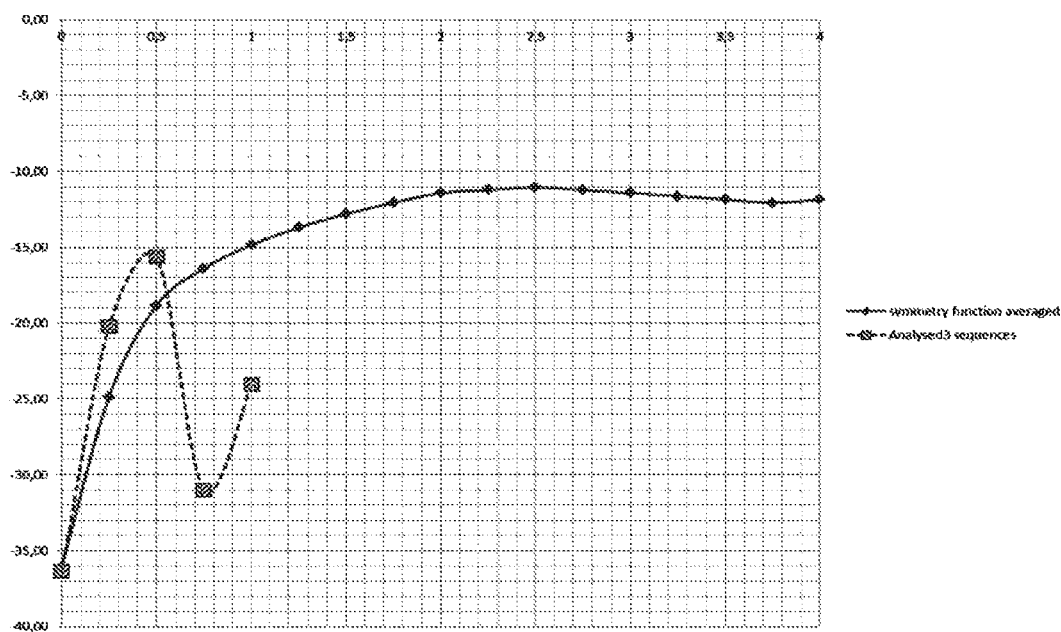
FIG. 44 shows an example of results of a convolution function applied to a twisted wave signal.

Taking into consideration the random nature of the twisted wave signal, the averaged power result is different from zero (as shown in FIG. 44, which shows averaged result for yX with respect to an RF frame origin shift, and one realization using 3 sequences with the same origin), but the specific realization can be very close to zero as well. This obliges to consider a reasonable number of RF sequences to obtain a consistent power result of the yX convolution.

It is important to note that, even if the yX convolution is close to zero in a sequence which does not correspond to the RF frame, the statistic behaviour of the function is different from the case in which the integration sequence corresponds to the RF frame. Taking into consideration the maximum sum and the minimum difference among the resulting values of the convolution function, the right RF sequence has statistically the minimum product given by:

$$(|yX_M|+|yX_m|)(|yX_M|-|yX_m|).$$

This analysis corresponds to the previously described procedure for detecting the boundaries of the RF frame.

On the assumption that the same result shall be obtained simultaneously for both the convolution functions yX and xY and that the components I and the Q of each symbol are statistically independent, the probability of detecting the wrong RF sequence is given by the product probability of the two.

The synchronization building time of the RF Frame is logically divided into three stages:

a first early-late optimization based on the search for the averaged position of the maxima; in this case the building time is similar to that one of the conventional signal early-late procedure (i.e., $t_{S\_TW}=nT_b$), but it has to be considered that, while in the conventional case the components I and Q outputted by the Costas Loop are already representative of the transmitted real and imaginary parts, in the twisted wave case it is necessary to solve the even and odd characteristics of each component (this corresponds to the additional orthogonal channel based on the Hilbert transform); therefore it is necessary to get a better quantization of the symbol time period (for example of the order of $2^7$=128=16 sequences of 8T, corresponding to 9 symbols; for conventional signals very often $2^5$−32 is used);

a detection of the right RF sequence, called STG RF Frame, which detection is based on the search for the sequence by detecting the pulse position where the statistical value of the symbol sequence is a minimum; this is made by considering an averaged value of a reasonable number of sequences, which can conveniently be of the order of 7; the time necessary for recovering the STG RF Frame is of the order of $1.5 * L_{RF\ frame} * N_{seq} = 84$ (where $L_{RF\ frame}$ denotes the length of the RF frame and $N_{seq}$ denotes the number of sequences); and a fine early-late tracking; in fact, once the sequence is selected as the STG RF Frame, the system works as in the conventional case and the clock can be taken on the track using the VCO as in the conventional mode; the advantage is that, once the RF Frame synchronization is obtained, the average value of the maxima shift in the frame is zero, assuming that the phase shift is not more than one quarter of half the period.

The above implies that the frequency stability shall be better than the conventional case, but this condition is satisfied by the need of increasing the quantization of the symbol period.

Taking into consideration that the frequency stability is given by fb/2n and that it has been considered a quantization number given by $n=2^7$ against a standard value of $n=2^5$, the twisted wave holding time is approximately twice the one of a conventional signal.

In the following some comparative results between conventional and twisted Wave signals will be presented. In this respect, it is important to note that these results do not establish effective performances, which, instead, depend on the specific technology used, the noise level, the effective sampling speed, etc.

In particular, the following TABLE I presents a comparison, at system level, between a twisted wave signal and a conventional signal for the same channel conditions. It is important to note that the numeric values contained in the TABLE I denote numbers of times of symbol period T.

TABLE I

|  | Twisted Wave Signal | Conventional Signal with standard technology | Conventional Signal with Twisted Wave technology |
|---|---|---|---|
| Carrier Building Time | 90-250 | 90-250 | 90-250 |
| Carrier Holding Time | 1150-1300 | 1150-1300 | 1150-1300 |
| Clock Building Time | 128 | 32 | 128 |
| Clock Holding Time | 320 | 160 | 640 |
| RF Frame Building Time | 84 | NA | NA |
| RF Frame Holding time | 320 | NA | NA |
| Total Building Time | 302-462 | 122-282 | 218-378 |
| Minimum Holding Time | 320 | 160 | 640 |

From the TABLE I it can be inferred that building and holding times related to twisted waves are comparable with those ones related to conventional signals. Moreover, taking into consideration that the building time is typically one in a very long sequence, the building and holding times related to twisted waves can be considered reasonably good with respect to the ones related to conventional signals.

Anyway, it is important to note that:

the technological complexity associated with twisted waves is higher than the one associated with conventional signals implemented with standard technology; while the technological complexity associated with twisted waves is the same as the one associated with conventional signals implemented with twisted wave technology and, in this case, the performances (in terms of building and holding times) of the twisted waves are very similar to the ones of conventional signals.

A twisted wave signal is made up of two components: the conventional (or main mode) signal (filtered by a Gaussian filter) and the approximation of the Hilbert transform signal based on the higher-order modes (i.e., twisted modes).

In the foregoing it has been shown that the first two phases of the acquisition and tracking procedure are usable for both conventional and twisted wave signals without major impairments. Therefore, for a traditional receiver which does not use a generalized matched filter device, the Hilbert signal, which is statistically independent of the conventional signal, is assumed to be additional noise.

In particular, a traditional receiver is capable of receiving the conventional component (i.e., main mode component) of the twisted wave signal but in presence of an additional noise.

In detail, it can be written that:

$$r(t) = s_{mode\ 0}(t) + n_T(t) + i_{TW}(t),$$

where r(t) is the received signal, $s_{mode\ 0}(t)$ is the conventional signal (i.e., main mode component), $n_T(t)$ is the thermal noise, and $i_{TW}(t)$ is the additional noise due to the additional higher-order modes (i.e. twisted modes).

The power level associated with the twisted modes up to ±N is given by $$(i_{TW})^2 = 10^{\frac{A}{10}} \sum_{n=1}^{N} \frac{1}{2^n},$$

where A denotes the attenuation due to the noise reduction in the Hilbert channel.

If all the modes are considered, the additional noise level is given by $$10^{\frac{A}{10}}.$$

Figure 45:
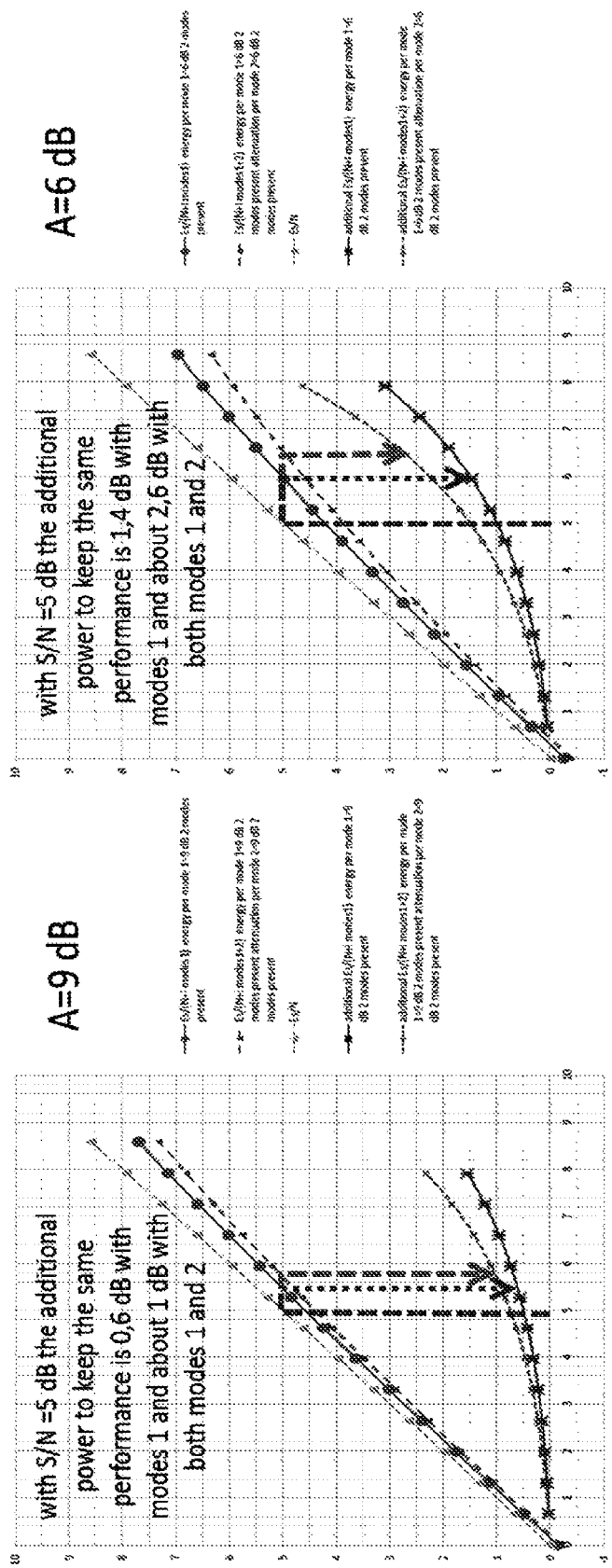
FIG. 45 shows performance degradation of a conventional receiver in presence of twisted wave signals.

In this connection, FIG. 45 shows performance degradation of a conventional receiver in presence of twisted wave signals for A=9 dB and A=6 dB. The degradation is acceptable for A=9 dB, which is the attenuation level corresponding to an increase of the twisted wave bandwidth of about 5% with respect to the minimum value given by the Nyquist condition.

The presented results are very important because they assure a good level of back compatibility with respect to the equipment and systems currently used.

Figure 46:
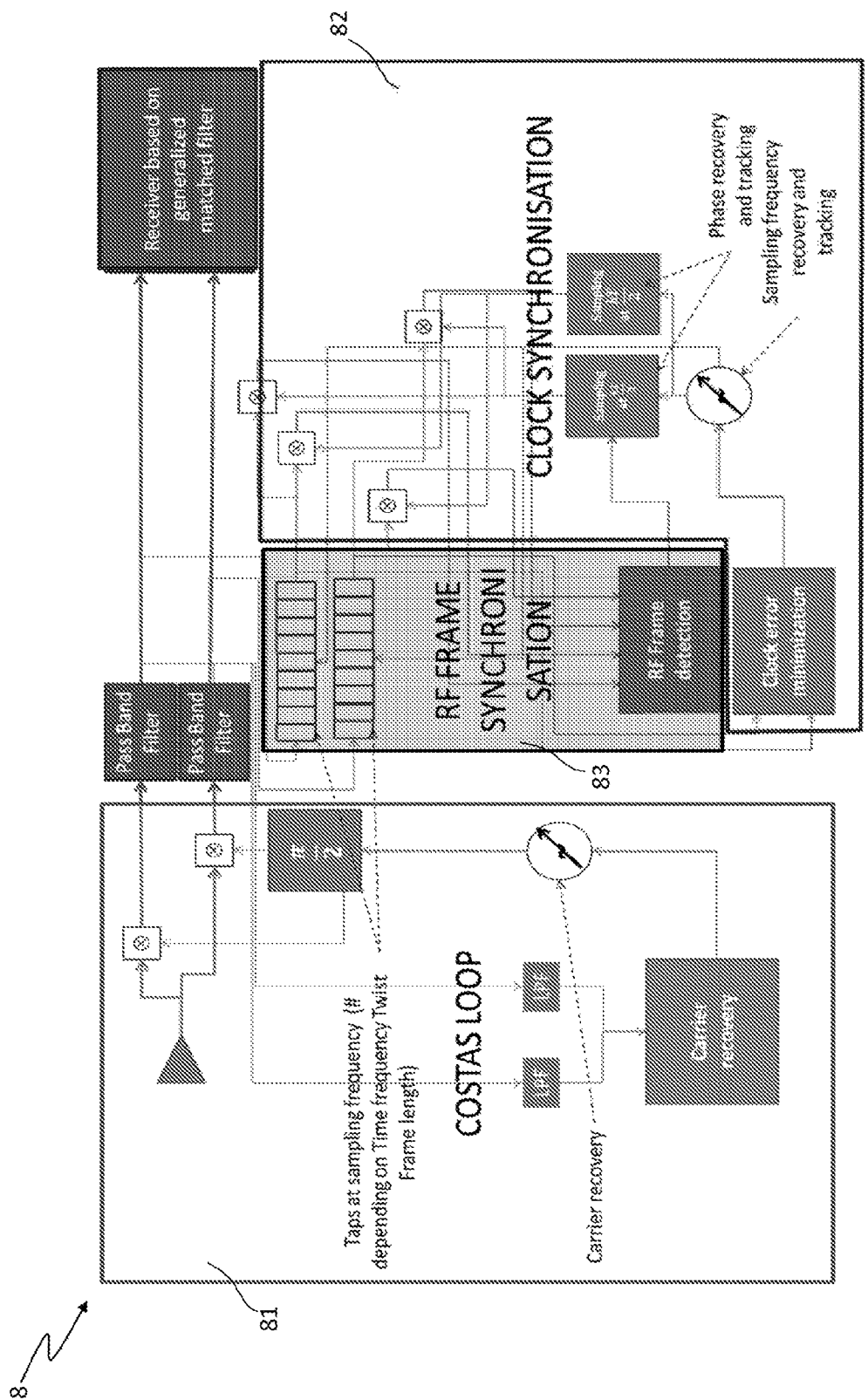
FIG. 46 schematically illustrates a system for recovering and tracking carrier, clock and RF frame synchronization at reception side according to a preferred embodiment of the present invention.

FIG. 46 shows a functional block diagram representing the architecture of a system (denoted as a whole by 8) for recovering and tracking carrier, clock and RF frame synchronization at reception side according to a preferred embodiment of the present invention.

In particular, the system 8 is design to embody:

the carrier recovery module 420 (shown in FIG. 14 and previously described) by means of a Costas-Loop-type device 81 designed to carry out carrier recovery and tracking by operating according to the teachings previously provided about recovery and tracking of the carrier of time main mode and twisted mode signals;

the clock recovery module 430 (shown in FIG. 14 and previously described) by means of an early-late-technique-based device 82 designed to carry out clock recovery and tracking by operating according to the teachings previously provided about recovery and tracking of the clock(s) of time main mode and twisted mode signals; and the frame synchronization module 440 (shown in FIG. 14 and previously described) by means of an RF frame synchronization device 83 designed to carry out RF frame synchronization recovery and tracking by operating according to the teachings previously provided about RF synchronization at reception side.

Conveniently, the Costas-Loop-type device 81 is designed to operate as the Costas Loop 6 (which is shown in FIG. 16 and whose operation has been described in detail in the foregoing), and the early-late-technique-based device 82 is designed to operate as the analogical early-late synchronizer 7 (which is shown in FIG. 23 and whose operation has been described in detail in the foregoing) or as the DPLL-based early-late synchronizer 700 (which is shown in FIG. 27 and whose operation has been described in detail in the foregoing).

Since the procedure for recovering and tracking the carrier of time main mode and twisted mode signals (through a Costas Loop), for recovering and tracking the clock(s) of time main mode and twisted mode signals (based on an early-late technique) and for recovering and tracking RF synchronization have been described in detail in the foregoing, the operation and the components of the Costas-Loop-type device 81, the early-late-technique-based device 82 and the RF frame synchronization device 83 will not be described again in order not to render the present description needlessly expatiatory.

As previously described, the Costas-Loop-type device 81 operates in one and the same way for both conventional and twisted wave signals.

The RF frame synchronization device 83 represents a new layer which is not necessary for conventional signals (since the conventional signals do not need any definition of the Space Time Geometry).

Instead, as for the early-late-technique-based device 82, further consideration will be given to clock synchronization.

In particular, the clock synchronization in the case of twisted waves should be more accurate than in the case of a conventional signal. In fact, while the components I and the Q of a conventional signal are directly associated with the transmitted symbols, in the case of twisted waves two signals are present on each of the components I and Q, namely: a first signal (i.e., a main mode signal) analogous with the conventional signal (even), and a second signal associated with the Hilbert channel (odd).

For a conventional signal the odd components are always zero and the symmetry can be reached for each symbol, while for a twisted wave signal the odd components are zero only when centered with respect to the RF frame reference system; therefore, on the assumption that twisted modes up to ±N are used, the sensitivity to errors is about $2^N$ times higher than the one in the case of a conventional signal. This implies that, on the assumption that twisted modes up to ±2 are used and that a reasonable quantization of the symbol time T for a conventional signal is 32, a reasonable quantization for the twisted waves could be 128.

Moreover, once the RF frame synchronization has been obtained, the fine clock synchronization can be driven directly by the RF frame's characteristic of having an average value of the maxima's deviation equal to zero.

Figure 47:
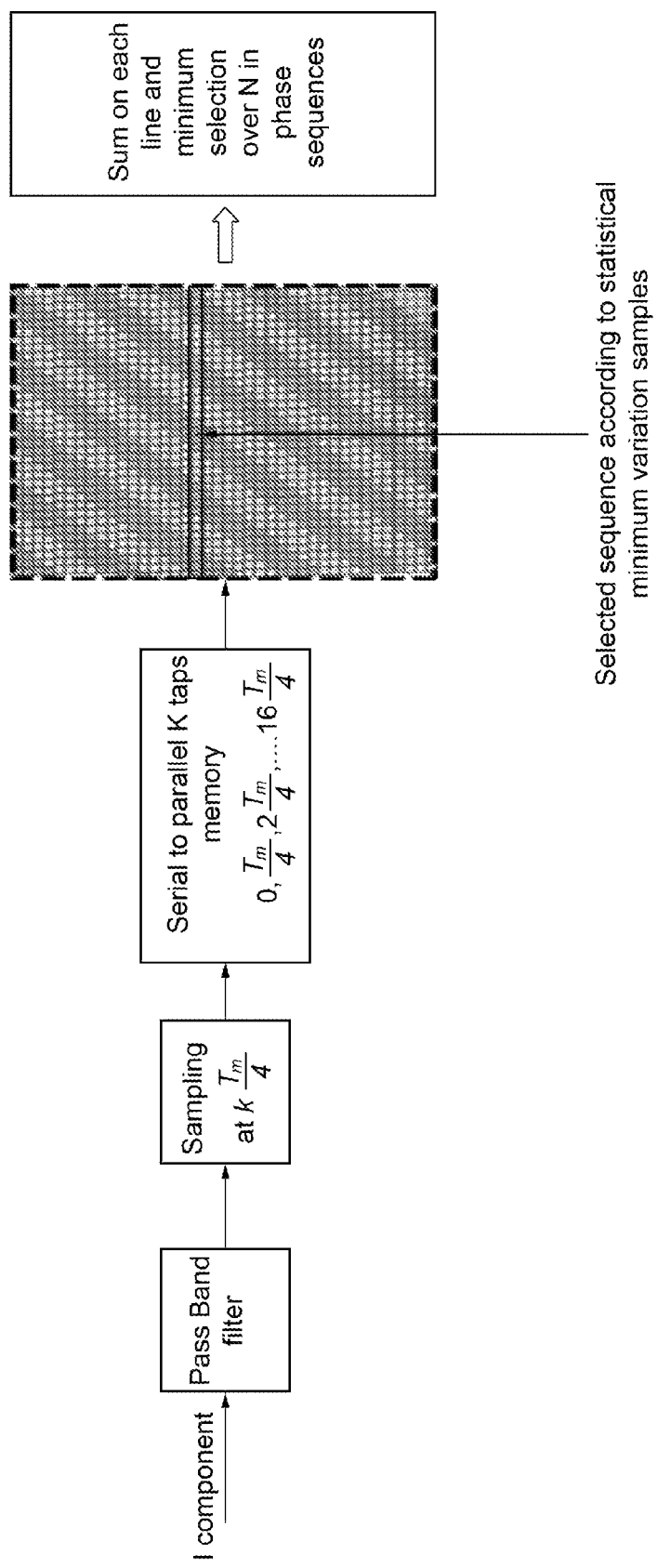
FIG. 47 schematically illustrates a procedure performed by the system of FIG. 46 for acquiring and tracking clock and RF frame synchronization.

In this connection, FIG. 47 shows a functional block diagram representing the procedure performed by the system 8 on the in-phase component I for acquiring and tracking clock and RF frame synchronization. In particular, the functional block diagram shown in FIG. 47 schematically represents the procedure performed by the system 8 and previously described in detail; therefore, no further details are provided since the functional block diagram shown in FIG. 47 is considered completely clear in view of the foregoing.

Anyway, with reference to FIG. 47, it has to be noted that a similar procedure can be conveniently used for the quadrature component Q in order to minimise the RF frame positioning detection error. In connection with FIG. 47, it is important to draw the attention to the fact that the functional block diagram shown in FIG. 47 is directly and unambiguously understandable for a skilled person. Therefore, in order not to render the present description needlessly expatiatory, in the following features and components shown in FIG. 47 will not be described since they are, as previously said, directly and unambiguously understandable for a skilled person.

In the following some experimental results of an analysis carried out by the Applicant about statistical effects of errors affecting clock and RF frame synchronization will be presented.

In particular, in said analysis one and the same QPSK modulation based on the use of a Gaussian channel filter has been considered for the main mode and the twisted modes. Moreover, the following errors have been considered to verify their impact on random information sequences:

a phase error (namely a shift of the reception clock with respect to the transmission clock) lower than 25% of the symbol period T;

a frequency error (namely a variation of the sampling period between the reception and transmission clocks) lower than 2, 5% of the symbol rate 1/T;

an RF frame synchronization error (namely a shift of the limits of the convolution function) of T/4, T/2, 3T/4, and T; and a combination of different types of error.

Figure 48:
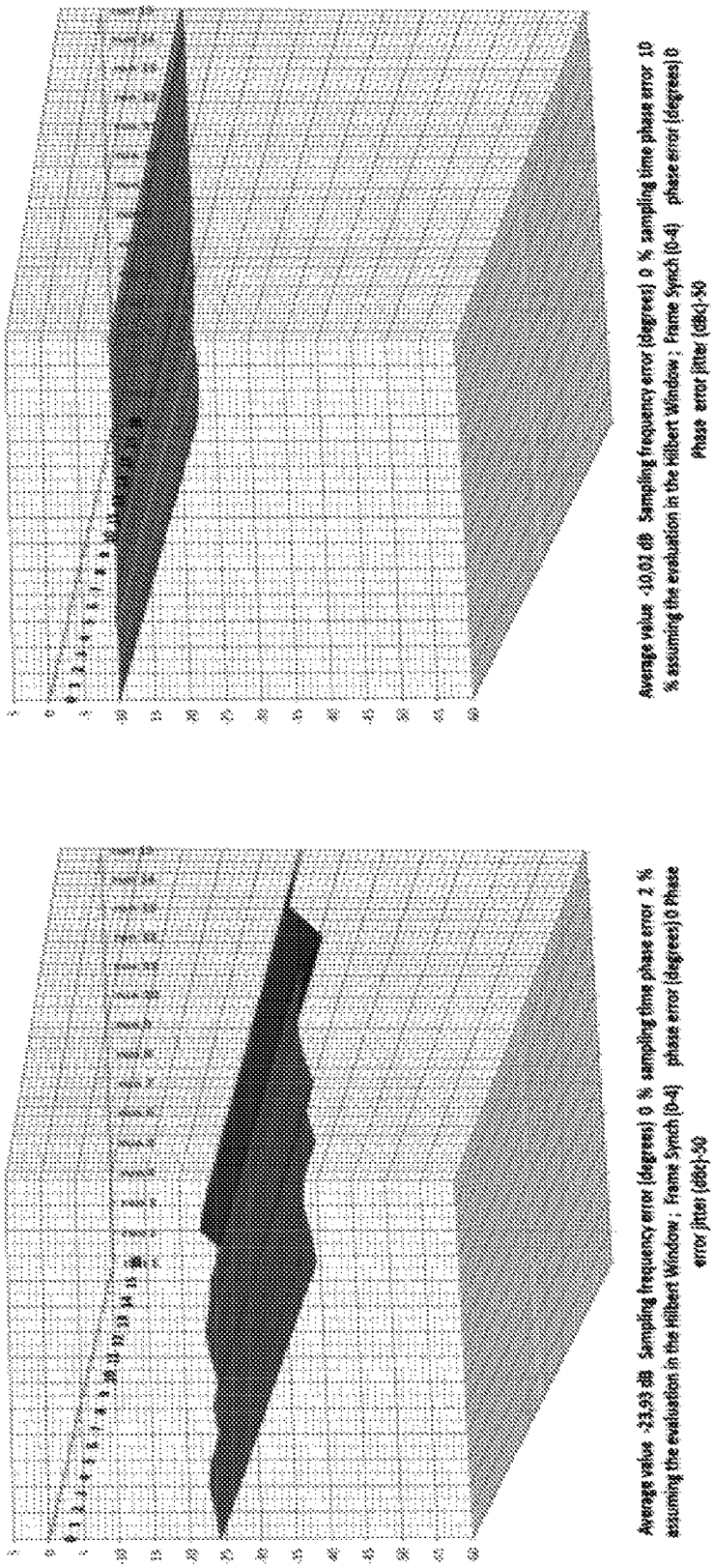
FIGS. 48-51 show experimental results of an analysis carried out by the Applicant about statistical effects of errors affecting clock and RF frame synchronization.

In detail, FIG. 48 shows the results for fifteen different sequences in the case of a phase error of 2% and 10%. As it can be noted from FIG. 48, the phase error produces an interference noise changing mainly depending on the jitter contribution.

Figure 49:
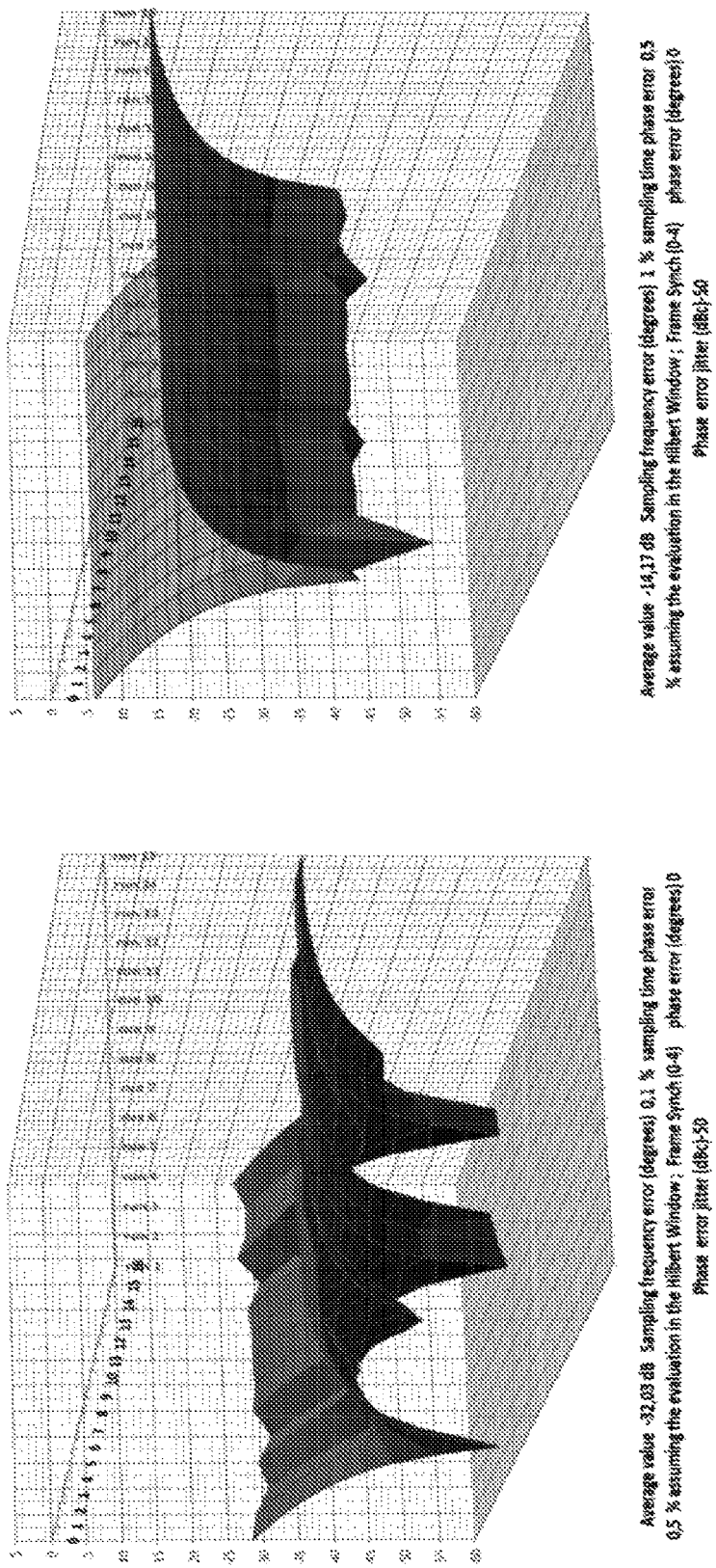

Moreover, FIG. 49 shows the results for fifteen different sequences in the case of a frequency error of 0.1% and 1%. As it can be noted from FIG. 49, the frequency error is an interference noise having a shape similar to the letter "V", changing on the peak minimum mainly depending on the jitter contribution.

Figure 50:
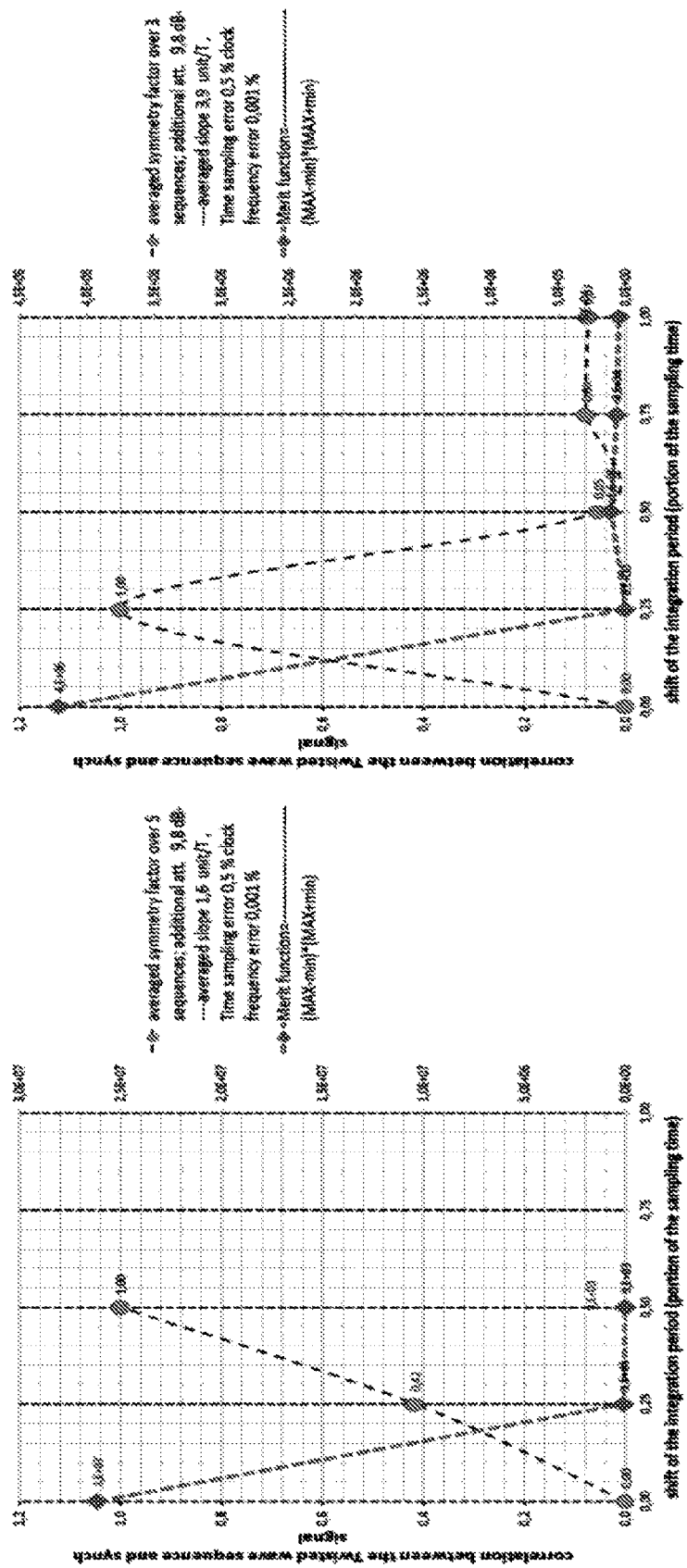

Furthermore, FIG. 50 shows results related to RF frame synchronization errors for fifteen different sequences, in particular considering, for each shift, an averaging out over three sequences and over five sequences. As it can be noted from FIG. 50, the averaging out over more sequences caused the results to be stabilized and the detection probability to increase.

Figure 51:
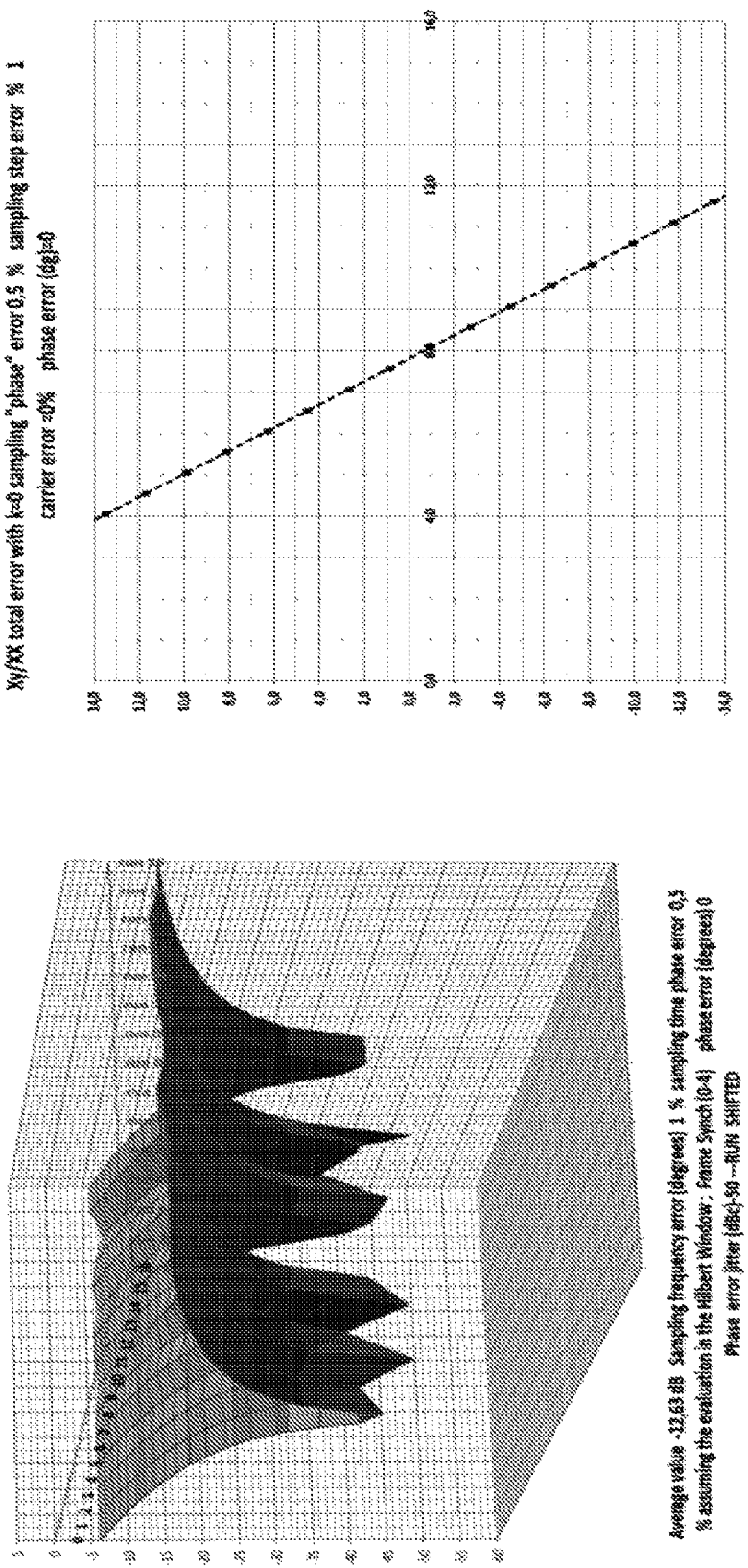

Finally, FIG. 51 shows results related to combinations of different types of errors.

As explained in the foregoing, the implementation of the time-twisted-wave-based modulation according to the present invention can be regarded as an approximation of the Hilbert transform. This fact implies, on one side, a bandwidth increase, and, on the other side, the presence of an absolute limitation on the increase in frequency reuse, which is lower than two. In this respect, the following TABLE II lists some features that are related to the time-twisted-wave-based modulation according to the present invention and which can be seen as a basis for the practical implementation of a radio communications system based on said modulation.

TABLE II

| PARAMETER | PARAMETER VALUE (considering using up to modes n = ±N) | PARAMETER APPROXIMATE VALUE FOR N = 2 |
|---|---|---|
| Frequency reuse | $\dfrac{2^{N+2}-1}{2^{N+1}+1}$ | 1.67 |
| Vestigial band rate reduction | $\dfrac{2^{N+2}+2}{2^{N+1}+3}$ | 0.95 |
| Frame length | $T_F = (2^{N+1}+1)T_S$ | $9T_S$ |
| Super Frame loss | <1% | 0.99 |
| Additional bandwidth noise (dB) | $10\log\left(\dfrac{2^{N+2}+3}{2^{N+2}+2}\right) \approx \dfrac{4.34}{2^{N+2}+2}\,\mathrm{dB}$ | 0.25 dB |
| Digitalization noise <−30 dB phase error | $\dfrac{N}{2^N - 1}$ | 9 bits |
| Maximum IFI (dB) | | <−20 dB |

Figure 52:
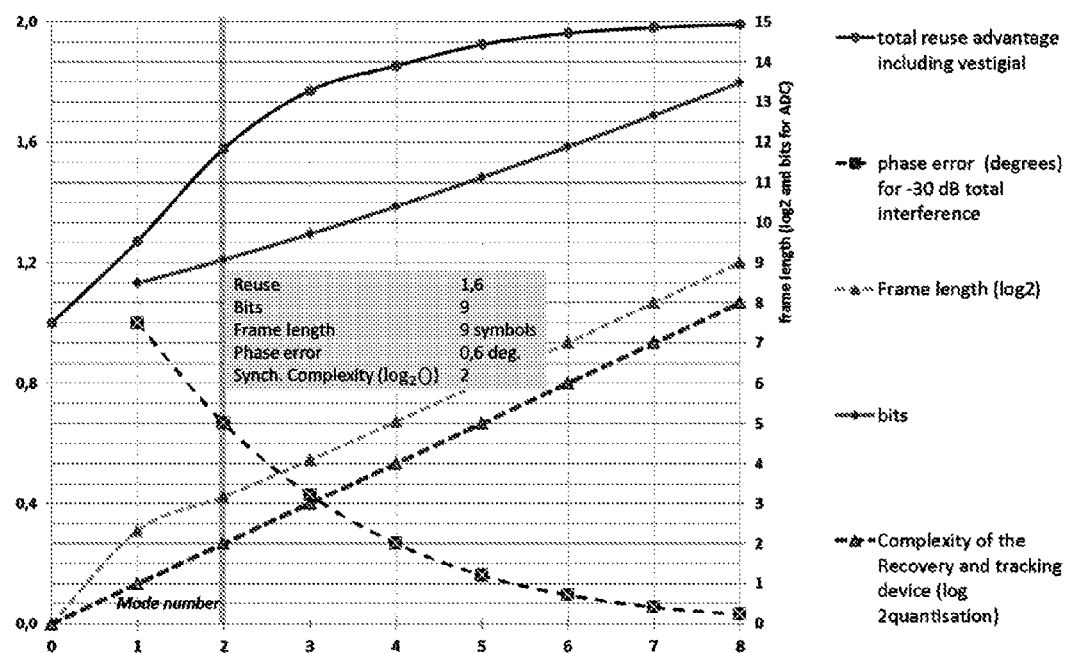
FIG. 52 schematically illustrates behaviour of some parameters related to the present invention.

Moreover, FIG. 52 schematically shows some considerations concerning best implementation criteria as a compromise between performance and implementation complexity. As shown in FIG. 52, the choice to use up to modes N=±2 or N=±3 seems to be a very good compromise between performance and implementation complexity. In particular, in case of using up to modes N=±2, the frame length is 9 symbols, the necessary number of bits is about 9, the thermal noise increase is lower than 0.2 dB, and the frequency reuse is close to 1.7.

As for practical implementation of the present invention, the multi-mode signal generation device 300 and the symbol extraction device 400 are preferably implemented by means of Field-Programmable Gate Array (FPGA), Application-Specific Integrated Circuit (ASIC), and Software Defined Radio (SDR) technologies.

In particular, the carrier recovery module 420, the clock recovery module 430 and the frame synchronization module 440 (or, equivalently, the system 8 combining the functions of said modules), are preferably implemented by means of FPGA/ASIC/SDR technologies From the foregoing, it may be immediately appreciated that the present invention allows to increase frequency reuse and transmission capacity by exploiting an original application of the Hilbert transform to digital signals.

In particular, it is worth stressing again the fact that the first aspect of the present invention relating to the use of a Gaussian filter for transmitting and receiving time twisted waves enables only one time reference to be selected in transmission and to be recovered in reception, thereby reducing the complexity of the transmitter and of the receiver.

Moreover, it is important to note that carrier, clock and RF frame synchronization recovery and tracking procedures according to the present invention, even if they exploit existing technologies, objectively represent new and inventive methodologies for recovering and tracking carrier, clock and RF frame synchronization of time twisted wave signals.

In particular, carrier, clock and RF frame synchronization recovery and tracking procedures according to the present invention enable reuse of existing tracking systems/devices to be optimized, since they exploit as far as possible existing technologies by introducing, only when strictly necessary, slight modifications.

This approach is considered very interesting and makes the transmission and reception of time twisted wave signals feasible, thereby creating a completely new theory for digital communications beyond the classical approach based on analytical signals.

Furthermore, it is worth stressing again the fact that the RF frame synchronization procedure according to the present invention does not necessarily need to be carried out on a synchronization preamble, but can be carried out on any portion of the incoming signal, thereby enabling the receiver, if RF frame synchronization is lost for any reason during a communication, to recover RF frame synchronization at any time only at the cost of losing some information.

This feature renders the present invention applicable to radio communications architectures of the point-to-multipoint type (where the use of preambles is preferably avoided), in addition to those ones of the point-to-point type (where, instead, there is not any problem with the use of preambles).

Finally, it is important to note that the present invention can be advantageously exploited, in general, in all kinds of radio communications (with frequencies comprised between a few KHz up to hundreds of GHz), and, in particular, in satellite communications and terrestrial wireless communications, such as the ones based on Long Term Evolution (LTE) and/or Worldwide Interoperability for Microwave Access (WiMAX) standards.

In conclusion, it is clear that numerous modifications and variants can be made to the present invention, all falling within the scope of the invention, as defined in the appended claims.

The invention claimed is:

1. A radio communications method comprising carrying out, by a transmitter, the following steps:
   a) generating or receiving digital symbols to be transmitted, said digital symbols having a given symbol rate associated with a corresponding symbol period;
   b) generating, every S digital symbols generated/received, a corresponding multi-mode digital signal, which
       has a predefined time length shorter than S times the symbol period,
       has a predefined bandwidth larger than the Nyquist bandwidth corresponding to the given symbol rate, and
       carries said S digital symbols by means of orbital angular momentum modes comprising
           a main mode, that is an orbital angular momentum mode with topological charge equal to zero and that carries P of said S digital symbols, and
           one or more twisted modes carrying the other S-P digital symbols, wherein each twisted mode is an orbital angular momentum mode with a respective topological charge different than zero and is time-shifted with respect to the main mode;

c) generating a multi-frame digital signal comprising successive, non-overlapped time frames, each of which has the predefined time length and carries a respective multi-mode digital signal generated; and d) transmitting a radio frequency signal carrying the multi-frame digital signal;

wherein S is an integer higher than three, and P is an integer higher than zero and lower than S;

the method further comprising carrying out, by a receiver, the following steps:

e) receiving the radio frequency signal transmitted by the transmitter;

f) processing the received radio frequency signal so as to obtain a corresponding incoming digital signal;

g) performing on the basis of the incoming digital signal carrier synchronization thereby recovering frequency and/or phase carrier used by the transmitter to generate the multi-mode digital signals,
clock synchronization thereby recovering the symbol rate and sampling time instants of the multi-mode digital signals generated by the transmitter, and
frame synchronization thereby detecting successive, non-overlapped portions of the incoming digital signal corresponding to the successive, non-overlapped time frames of the multi-frame digital signal generated by the transmitter; and h) extracting, on the basis of the carrier, clock and frame synchronizations performed, the S digital symbols respectively carried by each detected incoming digital signal portion by means of the orbital angular momentum modes.

2. The method of claim 1, wherein each twisted mode is time-shifted with respect to the main mode by a respective time amount related to said twisted mode.

3. The method according to claim 1, wherein the orbital angular momentum modes comprise a plurality of twisted modes, each of which is time-shifted with respect to the main mode and to any other twisted mode.

4. The method according to claim 1, wherein for each multi-mode digital signal generated by the transmitter:
the main mode carries the P digital symbols by means of main mode time samples with sampling period equal to the symbol period; and
the twisted mode/modes carries/carry the other S-P digital symbols by means of twisted mode time samples, wherein each twisted mode carries one or more respective digital symbols of said S-P digital symbols by means of respective twisted mode time samples with sampling period equal to the symbol period.

5. The method according to claim 1, wherein the orbital angular momentum modes comprise 2N twisted modes, each identified by a respective topological-charge-related index n, that is an integer comprised between −N and +N and different than zero; N being an integer higher than zero;
and wherein for each multi-mode digital signal generated by the transmitter:
the main mode carries the P digital symbols by means of P main mode time samples with sampling period equal to the symbol period, P being equal to $2^{N+1}+1$; and
each twisted mode n
carries $2^{N-|n|}$ respective digital symbol(s) by means of $2^{N+1}$ respective twisted mode time samples with sampling period equal to the symbol period, and is time-shifted with respect to the main mode by a respective time amount equal to $T/2^{|n|}$.

6. The method according to claim 1, wherein each multi-mode digital signal is generated by the transmitter by using a predefined Gaussian filter such that to cause said multi-mode digital signal to have the predefined bandwidth larger than the Nyquist bandwidth corresponding to the given symbol rate.

7. The method according to claim 1, wherein the multi-frame digital signal generated by the transmitter comprises:
a preamble to enable the receiver to perform frame synchronization; and
a sequence of successive, non-overlapped time frames carrying, each, a respective multi-mode digital signal generated by the transmitter.

8. The method according to claim 1, wherein the step g) includes performing the carrier synchronization by means of a phased-locked loop.

9. The method according to claim 1, wherein the step g) includes performing the carrier synchronization by means of a Costas loop.

10. The method according to claim 1, wherein the step g) includes performing the clock synchronization by implementing an early-late synchronization technique.

11. The method according to claim 1, wherein the step g) includes performing the clock synchronization by means of an early-late synchronization device based on digital phased-locked loop.

12. The method according to claim 10, wherein the step g) includes performing the clock synchronization by carrying out:
an initial rough early-late synchronization on the basis of the incoming digital signal; and
a fine early-late tracking on the basis of the frame synchronization performed.

13. The method according to claim 1, wherein the step g) includes performing the clock synchronization by:
recovering, on the basis of the incoming digital signal, the symbol rate and sampling time instants of the main mode of the multi-mode digital signals generated by the transmitter; and
recovering, from the detected symbol rate and sampling time instants of the main mode, sampling time instants of the twisted mode/modes of the multi-mode digital signals generated by the transmitter.

14. The method according to claim 1, wherein all the multi-mode digital signals generated by the transmitter have one and the same predefined time sampling structure resulting from one and the same predefined time arrangement of time samples of the orbital angular momentum modes in each multi-mode digital signal;
and wherein the step g) includes performing the frame synchronization by detecting successive, non-overlapped portions of the incoming digital signal having said predefined time sampling structure.

15. A radio communications system comprising a transmitter and a receiver; wherein the transmitter is configured to carry out the steps a), b), c) and d) of the radio communications method claimed in claim 1, and the receiver is configured to carry out the steps e), f), g) and h) of the radio communications method.

16. A system for radio communications configured to carry out the steps a), b), c) and d) of the radio communications method claimed in claim 1.

17. A hardware component comprising software code portions which are:

executable by a processor of a device or system for radio communications; and such that to cause, when executed, said device or system to carry out the steps a), b), c) and d) of the radio communications method claimed in claim 1.

18. A system for radio communications configured to:

radio communicate with another device or system configured to carry out the steps a), b), c) and d) of the radio communications method claimed in claim 1; and carry out the steps e), f), g) and h) of the radio communications method.

19. A hardware component comprising software code portions which are:

executable by a processor of a first device or system configured to radio communicate with a second device or system configured to carry out the steps a), b), c) and d) of the radio communications method claimed in claim 1; and such that to cause, when executed, said second device or system to carry out the steps e), f), g) and h) of the radio communications method.

\* \* \* \* \*